(12) United States Patent
Talwar et al.

(10) Patent No.: US 7,260,595 B2
(45) Date of Patent: Aug. 21, 2007

(54) LOGIC CIRCUIT AND METHOD FOR CARRY AND SUM GENERATION AND METHOD OF DESIGNING SUCH A LOGIC CIRCUIT

(75) Inventors: Sunil Talwar, Warwickshire (GB); Robert Jackson, Warwick (GB)

(73) Assignee: Arithmatica Limited, Oxford (GB)

( * ) Notice: Subject to any disclaimer, the term of this patent is extended or adjusted under 35 U.S.C. 154(b) by 816 days.

(21) Appl. No.: 10/714,408

(22) Filed: Nov. 14, 2003

(65) Prior Publication Data
US 2004/0153490 A1 Aug. 5, 2004

Related U.S. Application Data

(60) Provisional application No. 60/436,179, filed on Dec. 23, 2002.

(51) Int. Cl.
*G06F 7/50* (2006.01)
(52) U.S. Cl. ..................................................... 708/712
(58) Field of Classification Search ............... 708/710, 708/711, 712, 713, 714
See application file for complete search history.

(56) References Cited

U.S. PATENT DOCUMENTS

| | | | |
|---|---|---|---|
| 3,634,658 A | 1/1972 | Brown | |
| 3,711,692 A | 1/1973 | Batcher | |
| 3,757,098 A | 9/1973 | Wright | |
| 3,843,876 A | 10/1974 | Fette et al. | |
| 4,399,517 A | 8/1983 | Niehaus et al. | |
| 4,463,344 A | 7/1984 | Adler et al. | |
| 4,564,921 A | 1/1986 | Suganuma | |
| 4,592,007 A | 5/1986 | Ohhashi | |
| 4,596,256 A | 6/1986 | Ascher et al. | |

(Continued)

FOREIGN PATENT DOCUMENTS

EP  0168650  1/1986

(Continued)

OTHER PUBLICATIONS

Booth, Andrew, "A Signed Binary Multiplication Technique", Oxford University Press, Reprinted from Q.J. Mech. Appl. Math. 4:236-240, (1951),pp. 100-104.

(Continued)

*Primary Examiner*—Chuong D. Ngo
(74) *Attorney, Agent, or Firm*—Schwegman, Lundberg, Woessner and Kluth P.A.

(57) ABSTRACT

Logic circuit for generating carry or sum bit output by combining binary inputs, includes bit level carry generate and propagate function logic receiving binary inputs and generating bit level carry generate/propagate function bits for binary inputs by respectively logically AND and OR combining respective bits of binary inputs; logic generating high output if a carry is generated out of a first group of most significant bits of binary input or if carry propagate function bits for the most significant bits are all high; logic for receiving bit level carry generate and propagate function bits for binary inputs to generate high output if any of carry generate function bits for the most significant bits are high or if carry is generated out of another group of least significant bits of binary input; and logic for generating the carry or sum bit output by combining outputs of the two logics.

52 Claims, 27 Drawing Sheets

U.S. PATENT DOCUMENTS

| | | | |
|---|---|---|---|
| 4,607,176 A | 8/1986 | Burrows et al. | |
| 4,713,790 A | 12/1987 | Kloker et al. | |
| 4,831,578 A | 5/1989 | Bui | |
| 4,866,658 A | 9/1989 | Mazin et al. | |
| 4,870,609 A | 9/1989 | Yasui et al. | |
| 4,993,421 A | 2/1991 | Thornton | |
| 5,095,457 A | 3/1992 | Jeong | |
| 5,175,862 A | 12/1992 | Phelps et al. | |
| 5,187,679 A | 2/1993 | Vassiliadis et al. | |
| 5,321,752 A | 6/1994 | Iwamura et al. | |
| 5,325,320 A | 6/1994 | Chiu | |
| 5,343,417 A | 8/1994 | Flora | |
| 5,343,418 A | 8/1994 | Zinger | |
| 5,363,099 A | 11/1994 | Allen | |
| 5,475,388 A | 12/1995 | Gormish et al. | |
| 5,497,342 A | 3/1996 | Mou et al. | |
| 5,524,082 A | 6/1996 | Horstmann et al. | |
| 5,701,504 A | 12/1997 | Timko | |
| 5,712,792 A | 1/1998 | Yamashita et al. | |
| 5,717,622 A | 2/1998 | Kawamoto et al. | |
| 5,875,124 A | 2/1999 | Takahashi | |
| 5,943,250 A | 8/1999 | Kim et al. | |
| 5,964,827 A | 10/1999 | Ngo et al. | |
| 5,978,827 A | 11/1999 | Ichikawa | 708/709 |
| 5,995,029 A | 11/1999 | Ryu | |
| 6,008,668 A | 12/1999 | Saruwatari | |
| 6,023,566 A | 2/2000 | Belkhale et al. | |
| 6,035,318 A | 3/2000 | Abdallah et al. | |
| 6,173,414 B1 | 1/2001 | Zumkehr et al. | |
| 6,175,852 B1 | 1/2001 | Dhong et al. | |
| 6,223,198 B1 | 4/2001 | Oberman et al. | |
| 6,269,386 B1 | 7/2001 | Siers et al. | |
| 6,344,760 B1 | 2/2002 | Pyo | |
| 6,353,843 B1 | 3/2002 | Chehrazi et al. | |
| 6,430,251 B1 | 8/2002 | Gold | |
| 6,445,210 B2 | 9/2002 | Nojiri | |
| 6,469,541 B2 | 10/2002 | Tran et al. | |
| 6,470,443 B1 | 10/2002 | Emer et al. | |
| 6,490,608 B1 | 12/2002 | Zhu | |
| 6,577,164 B2 | 6/2003 | Tomita | |
| 6,598,061 B1 | 7/2003 | Symes et al. | |
| 6,691,143 B2 | 2/2004 | Blaker | |
| 6,700,405 B1 | 3/2004 | Hirairi | |
| 6,724,223 B2 | 4/2004 | Ichiguchi et al. | |
| 6,748,410 B1 | 6/2004 | Gressel et al. | |
| 6,882,175 B2 | 4/2005 | Motegi et al. | |
| 6,883,011 B2 | 4/2005 | Rumynin et al. | |
| 6,909,767 B2 | 6/2005 | White | |
| 6,938,061 B1 | 8/2005 | Rumynin et al. | |
| 7,042,246 B2 | 5/2006 | Talwar et al. | |
| 7,136,888 B2 | 11/2006 | Rumynin et al. | |
| 7,139,788 B2 | 11/2006 | Talwar et al. | |
| 7,170,317 B2 | 1/2007 | White | |
| 2001/0010051 A1 | 7/2001 | Oberman et al. | |
| 2002/0026465 A1 | 2/2002 | Rumynin et al. | |
| 2002/0078110 A1 | 6/2002 | Rumynin et al. | |
| 2002/0138538 A1 | 9/2002 | Talwar et al. | |
| 2003/0016055 A1 | 1/2003 | Oodaira et al. | |
| 2003/0120694 A1 | 6/2003 | Qi | |
| 2004/0225705 A1 | 11/2004 | Rumynin | |
| 2004/0236814 A1 | 11/2004 | White | |
| 2005/0144217 A1 | 6/2005 | Parhi et al. | |

FOREIGN PATENT DOCUMENTS

| | | |
|---|---|---|
| EP | 0309292 | 3/1989 |
| EP | 0442356 | 8/1991 |
| EP | 0741354 | 11/1996 |
| EP | 0947914 A1 | 10/1999 |
| EP | 0992882 A2 | 4/2000 |
| FR | 2475250 | 8/1981 |
| GB | 2016181 | 9/1979 |
| GB | 2062310 | 5/1981 |
| GB | 2263002 | 7/1993 |
| GB | 2318892 | 5/1998 |
| GB | 2365636 | 2/2002 |
| GB | 2365637 | 2/2002 |
| JP | 8212057 | 8/1996 |
| WO | WO-99/22292 | 5/1999 |
| WO | WO-02/12995 | 2/2002 |
| WO | WO-03052583 A2 | 6/2003 |

OTHER PUBLICATIONS

Chakraborty, S., et al., "Synthesis of Symmetric Functions for Path-Delay Fault Testability", *12th International Conference on VLSI Design*, (1999),pp. 512-517.

Dadda, L., "On Parallel Digital Multipliers", *Associazione Elettrontecnia ed Elettronica Italiana*, Reprinted from Alta Freg. 45:574-580, (1976),pp. 126-132.

Dadda, L., "Some Schemes for Parallel Multipliers", *Assocciazione Elettrotenica ed Elettronica Italiana*, Reprinted from Alta Freg. 34:349-356, (9165),pp. 118-125.

De Micheli, G., "Optimal State Assignment for Finite State Machines", *IEEE Transactions on Computer-Aided Design*, vol. CAD-4 (3), (Jul. 1985),pp. 269-285.

Debnath, D., "Minimization of AND-OR-EXOR Three-Level Networks with AND Gate Sharing", *IEICE Trans. Inf. & Syst.*, E80-D, 10, (1997),pp. 1001-1008.

Drechsler, R., "Sympathy: Fast Exact Minimization of Fixed Polarity Reed-Muller Expressions for Symmetric Functions", *IEEE ED&TC 1995, Proceedings European Design and Test Conference*, (Mar. 6-9, 1995),91-97.

Fleisher, H, "Combinatorial Techniques for Performing Arithmetic and Logical Operations", *IBM Research Center, RC-289, Research Report*, (Jul. 18, 1960),22 pages.

Flynn, M, "Advanced Computer Arithmatic Design", *John Wiley & Sons 2001*, (2001),46-59.

Foster, Caxton, et al., "Counting Responders in an Associative Memory", *The Institute of Electrical and Electronics Engineers, Inc.*, Reprinted, with permission, from IEEE Trans. Comput. C-20:1580-1583,(1971),pp. 86-89.

Hekstra, et al., "A Fast Parallel Multiplier Architecture", *IEEE International Symposium on Circuits and Systems: Institute of Electrical and Electronic Engineers*, c1977-c1996, 20v. :ill. :28cm, (1992),2128-2131.

Ho, I., "Multiple Addition by Residue Threshold Functions and Their Representation By Array Logic", *The Institute of Electrical and Electronics Engineers, Inc.*, Reprinted, with permission from IEEE Trans. Comput. C-22:762-767, (1973),pp. 80-85.

Jones, Robert, et al., "Parallel Counter Implementation", *Conf. Rec. 26th Asilomar Conf. Signals, Systems & Computers*, vol. 1, ISBN 0-8186-3160-0,(1992),pp. 381-385.

Koc, C, "High-Speed RSA Implementation", available at ftp://ftp.rsasecurity.com/pub/pdfs/tr201.pdf., Version 2.0,(Nov. 1994), 73 pages.

Koc, C, "RSA Hardware Implementation", available at ftp://ftp.rsasecurity.com/pub/pdfs/tr801.pdf., Version 1.0,(Aug. 1995),30 pages.

Monteiro, J., et al., "Bitwise Encoding of Finite State Machines", *Proceedings of the 7th International Conference on VLSI Design*, (Jan. 1994),pp. 379-382.

Nienhaus, H., "Efficient Multiplexer Realizations of Symmetric Functions", *IEEE*, (1981),pp. 522-525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2,(1995),292-301.

Swartzlander, Jr., E E., "Parallel Counters", *IEEE Transactions on Computers*, C-22(11), (Nov. 1973), 1021-1024.

Vassiliadis, S., "7/2 Counters and Multiplication with Threshold Logic", *IEEE*, (1997),pp. 192-196.

Villa, Tiziano, et al., "NOVA: State Assignment of Finite State Machines for Optimal Two-Level Logic Implementation", *IEEE Transactions on Computer-Aided Design*, vol. 9, No. 9,(Sep. 1990),905-924.

Wallace, C., "A Suggestion for a Fast Multiplier", *IEEE Transactions on Electronic Computers*, vol. EC-13,(1964),pp. 14-17.

Zuras, D, et al., "Balanced delay trees and combinatorial division in VLSI", *IEEE Journal of Solid State Circuits*, SC-21, IEEE Inc, New York, vol. SC-21, No. 5,(1986),814-819.

Bedrij, O. J., "Carry-Select Adder", *IRE Trans.*, EC-11, (Jun. 1962), 340-346.

Knowles, S., "A Family of Adders", *Proc. 14th IEEE Symp. on Computer Arithmetic*, (1999), 30-34.

Kogge, P. M., et al., "A Parallel Algorithm for the Efficient Solution of a General Class of Recurrence Equations", *IEEE Trans. Computers*, vol. C-22, No. 8, (Aug. 1973), 786-793.

Ladner, Richard E., et al., "Parallel Prefix Computation", *Journal of ACM*, vol. 27, No. 4, (Oct. 1980), 831-838.

Ling, Huey, "High-Speed Binary Adder", *IBM Journal of Research and Development*, vol. 25, No. 3, (1981), 156-166.

Sklansky, J., "Conditional-Sum Addition Logic", *IRE Trans., EC-9*, (Jun. 1990), 226-231.

Weinberger, A., et al., "A Logic for High-Speed Addition", *Nat. Bur. Stand. Circ.*, 591, (1958), 3-12.

"PCT International Search Report relating to PCT/GB2004/000135", (Jun. 17, 2004),4 Pages.

"United Kingdom Search Report relating to Great Britain Patent Application No. GB0405653.7", (Jul. 7, 2004), 3 Pages.

"United Kingdom Search Report relating to Great Britain Patent Application No. GB0400799.3", (Jun. 23, 2004), 1 Page.

Tietze, U., et al., "Halbleiterschaltungstechnik", (1993),226-227, 273-276.

"PCT international Search Report relating to PCT/GB 03/05489", (Sep. 15, 2004),4 Pages.

"United Kingdom Search Report relating to Great Britain Patent Application No. GB0326611.1", (Mar. 29, 2004),1 Page.

Nicholson, J. O., "Parallel-Carry Adders Listing Two-Bit Covers", *IBM Technical Disclosure Bulletin*, 22(11), (Apr. 1980),5036-5037.

Ong, S., et al., "A Comparison of ALU Structures for VLSI Technology", *Proceedings, 6th Symposium on Computer Arithmetic (IEEE)*, (1983),10-16.

Schmookler, M. S., et al., "Group-Carry Generator", *IBM Technical Disclosure Bulletin*, 6(1), (Jun. 1963),77-78.

Weinberger, A., "Extension of the Size of Group Carry Signals", *IBM Technical Disclosure Bulletin*, 22(4), (Sep. 1979),1548-1550.

Weinberger, A., "Improved Carry-Look-Ahead", *IBM Technical Disclosure Bulletin*, 21(6), (Nov. 1978),2460-2461.

Hashemian, R., "A Fast Carry Propagation Technique for Parallel Adders", *Proceedings of the 33rd Midwest Symposium on Circuits and Systems*, (1990),456-459.

"Communication Pursuant to Article 96(2) EPC, for application No. EP 02 722 402.1, date mailed Jun. 6, 2005", 3 Pages.

Eldridge, S. E., et al., "Hardware Implementation of Montgomery's Modular Multiplication Algorithm", *IEEE Transactions on Computers*, 42(6), (1993), 693-699.

Freking, W. L., et al., "Parallel Modular Multiplication With Application to VLSI RSA Implementation", *Proceedings of 1999 the IEEE International Symposium on Circuits and Systems*, vol. 1, (1999), 490-495.

Marnane, W. P., "Optimised Bit Serial Modular Multipler for Implementation on Field Programmable Gate Arrays", *Electronics Letters*, 34(8), (1998), 738-739.

Orup, H., "Simplifting Quotient Determination in High-Radix Modular Multiplication", *IEEE Proceedings of the 12th Symposium on Computer Arithmetic*, vol. SYMP, 12, (1995), 193-199.

Song, Paul J., et al., "Circuit and Architecture Trade-offs for High-Speed Multiplication", *IEEE Journal of Solid-State Circuits*, vol. 26, No. 9, (Sep. 1991), 1184-1198.

Tenca, et al., "High-Radix Design of a Scalable Modular Multiplier", *Cruptographic Hardware & Embedded Systems. 3rd Inter. Workshop, CHES 2001, Pro., Lecture Notes in Computer Science*, 2162, (May 14, 2001), 185-201.

Tsai, W.-C., et al., "Two Systolic Architectures for Modular Multiplication", *IEEE Transactions on VLSI Systems*, vol. 8(1), (2000), 103-107.

Zimmermann, Reto, "Low-Power Logic Styles: CMOS Versus Pass-Transistor Logic", *IEEE Journal of Solid-State Circuits*, 32(7), (Jul. 1997), 1079-1090.

LOGIC CIRCUIT AND METHOD FOR CARRY AND SUM GENERATION AND METHOD OF DESIGNING SUCH A LOGIC CIRCUIT

This application claims priority under 35 U.S.C. 119(e) from U.S. Provisional Application Serial No. 60/436,179 filed Dec. 23, 2002, the specification of which is incorporated herein by reference and made a part hereof.

FIELD OF INVENTION

The present invention relates to a method and apparatus for use in logic circuits, and in particular, to a method and apparatus for generating a carry or sum bit by combining two binary inputs.

BACKGROUND OF THE INVENTION

Addition of two binary numbers is a fundamental operation used in many electronic circuits. For example, binary addition is used in integer arithmetic-logic units, and also, all the floating-point operations use integer addition in their calculations. Memory accesses require integer addition for address generation, branches use addition for forming instruction addresses, and for making greater-than or less-than comparisons. Thus, many modern circuits contain several integer adders, many of which may appear on frequency-limiting paths.

In an addition of two numbers, the digit in each column of the first number is added to the digit in the corresponding column of the second number, and any carry digit resulting from the previous column is also added, in order to obtain the value of the sum in each column. Thus, for two n-bit binary numbers $a=a_{n-1} \ldots a_1 a_0$ and $b=b_{n-1} \ldots b_1 b_0$, their sum is the n+1 bit number given by $s=s_n \ldots s_1 s_0$, where:

$$s_n = c_n$$

$$s_i = a_i \oplus b_i \oplus c_i$$

$$c_{i+1} = a_i b_i + c_i (a_i + b_i)$$

where $c_k$ is the carry into position k, + denotes logical OR, proximity denotes Logical AND and $\oplus$ denotes Exclusive OR.

The carry bit into any chosen column can be generated from two logical functions called Generate and Propagate. The bit level Generate function $g_i$ indicates whether a carry is generated by a particular column in the addition. The function $g_i$ is true if a carry is generated at column i. The bit-level propagate function $p_i$ indicates whether any carry for a particular column will be propagated on to the next column. The function $p_i$ is true if carry into column i is propagated into column i+1. The bit level generate and propagate functions can be constructed from the bits in column i of the two numbers to be added, as follows:

$$g_i = a_i b_i$$

$$p_i = a_i + b_i$$

Thus, in the addition of $a=a_{n-1} \ldots a_1 a_0$ and $b=b_{n-1} \ldots b_1 b_0$, the carry into the j+1'th column is given by:

$$G_{j:0} = c_{j+1} = g_j + p_j g_{j-1} + p_j p_{j-1} g_{j-2} + \ldots + p_j p_{j-1} \ldots p_1 g_0$$

FIG. 1 shows an implementation of a circuit to generate $G_{j:0}$ based on the above equation. However, the circuit of FIG. 1 is not a practical circuit to realize for large values of j. It is an OR of j+1 AND-terms, the largest of the AND gates also having j+1 inputs. Moreover, the fan-out of the p's is very large, $p_j$ having a fan-out of j.

High speed practical implementations realize the carry function in a tree like structure. A prior art method is known as parallel prefix and will now be illustrated (S Knowles, "A Family of Adders", Proc, $14^{th}$ IEEE Symp. On Computer Arithmetic, pp 30-44, 1999). The parallel prefix method uses bit-level generate and propagate functions to construct Group Generate and Group Propagate functions.

$$G_{j:k} = g_j + p_j g_{j-1} + p_j p_{j-1} g_{j-2} + \ldots + p_j p_{j-1} \ldots p_{k+1} g_k$$

$$P_{j:k} = p_j p_{j-1} \ldots p_{k+1} p_k$$

The function $G_{j:k}$ is true if the group of bits from k to j generates a carry and the function $P_{j:k}$ is true if the group of bits from k to j propagates a carry coming into that group into the next group.

The parallel prefix method uses Group Generate and Group Propagate functions of smaller sized groups to construct the Group Generate and Group Propagate functions of a larger group. A large group of bits from i to j is divided into 2 groups say from i to k−1 and k to j. The larger group generates a carry if either the most significant group generates a carry or the least significant group generates a carry and the most significant group propagates this carry. This is illustrated in FIG. 2. In logical notation this can be expressed as.

$$G_{j:0} = G_{j:k} + P_{j:k} G_{k-1:0}$$

The Group Propagate function of a large group can be constructed from Group Propagate functions of smaller groups:

$$P_{j:i} = P_{j:k} P_{k-1:i}$$

These two constructions allow the Group Generate of a larger group to be formed recursively from smaller groups, which themselves are formed from even smaller groups and so on.

This method allows for the construction of $G_{j:i}$ in $\lceil \log_2(j-i) \rceil$ levels, once the bit-level generate and propagate functions have been formed.

It is possible to form the Group Generate of a large group in fewer levels still. If the large group i to j is divided into 3 groups say, i to k'−1, k' to k"−1, and k" to j then:

$$G_{j:i} = G_{j:k''} + P_{j:k''} G_{k''-1:k'} + P_{j:k''} P_{k''-1:k'} G_{k'-1:i}$$

The drawback of this method is that although fewer combining levels are needed, the gates at each combining level are more complex and the fan-out on the Group Generate and Group Propagate functions increases. Both of these impact heavily on the delay of the circuit. This situation is further exasperated when all the carries for an adder need to be constructed.

The following is an example of the parallel prefix method for a 9-bit addition, using base 3. A circuit diagram for this example is shown in FIG. 3.

Given two 9-bit numbers $a=a_8 a_7 \ldots a_1 a_0$ and $b=b_8 b_7 \ldots b_1 b_0$, we form 3-bit groups $a_8 a_7 a_6$, $a_5 a_4 a_3$, $a_2 a_1 a_0$ for a and $b_8 b_7 b_6$, $b_5 b_4 b_3$, $b_2 b_1 b_0$ for b.

Then the generate and propagate functions for each group are $$G_{8:6} = g_8 + p_8 g_7 + p_8 p_7 g_6, \quad P_{8:6} = p_8 p_7 p_6$$

$$G_{5:3} = g_5 + p_5 g_4 + p_5 p_4 g_3, \quad P_{5:3} = p_5 p_4 p_3$$

$$G_{2:0} = g_2 + p_2 g_1 + p_2 p_1 g_0, \quad P_{2:0} = p_2 p_1 p_0$$

These Group functions are now combined to form:

$$G_{8:0}=G_{8:6}+P_{8:6}G_{5:3}+P_{8:6}P_{5:3}G_{2:0}$$

The other carries could be constructed in the following manner:

$$G_{7:0}=G_{7:6}+P_{7:6}G_{5:3}+P_{7:6}P_{5:3}G_{2:0}$$

$$G_{6:0}=G_{6:6}+P_{6:6}G_{5:3}+P_{6:6}P_{5:3}G_{2:0}$$

$$G_{5:0}=G_{5:3}+P_{5:3}G_{2:0}$$

$$G_{5:0}=G_{5:3}+P_{5:3}G_{2:0}$$

$$G_{4:0}=G_{4:3}+P_{4:3}G_{2:0}$$

$$G_{2:0}=g_2+p_2g_1+p_2p_1g_0$$

$$G_{1:0}=g_1+p_1g_0$$

$$G_{0:0}=g_0$$

An improved prior art technique for determining the carry bits is the Ling method (H. Ling, "High Speed Binary Adder", IBM Journal of Research and Development, Vol 25, No 3, pp 156-166, 1981). Ling observed a variation of the above, which allows for a small speed up on the parallel prefix method. He observed that if the delay of the carry term $G_{j:i}$ could be reduced by increasing the delay of some other term, the overall delay will be reduced as long as the carry term is still on the critical path. Ling observed that every term in $$G_{j:i}=g_j+p_jg_{j-1}+p_jp_{j-1}g_{j-2}+\cdots+p_jp_{j-1}\cdots p_{i+1}g_i$$

contains $p_j$ except for the very first term, which is simply $g_j$. However, $G_{j:i}$ can still be simplified by noting that $$g_k=p_kg_k$$

Therefore $p_j$ can be factored out of $G_{j:i}$ to create a pseudocarry $H_{j:i}$, where $$G_{j:i}=p_jH_{j:i}$$

$$H_{j:i}=g_j+G_{j-1:i}$$

The function $H_{j:i}$ is a little simpler than the function $G_{j:i}$. The fan-in of the OR gate for $H_{j:i}$ and $G_{j:i}$ is the same but the fan-in of each AND-gate is reduced by 1. This is illustrated in FIG. 4. Ling also observed that the pseudocarry $H_{j:i}$ of a large group could be constructed from the pseudocarries $H_{j:k}$ and $H_{k-1:i}$ of smaller groups:

$$H_{j:i} = g_j + G_{j-1:i} = g_j + G_{j-1:k} + P_{j-1:k}G_{k-1:1}$$
$$= [g_j + G_{j-1:k}] + P_{j-1:k}p_{k-1}[g_{k-1} + G_{k-2:i}]$$
$$= H_{j:k} + P_{j-1:k-1}H_{k-1:i}$$

This provides a method for constructing the pseudocarry of a large group in terms of pseudocarries of smaller groups, which can be constructed from the pseudocarries of yet still smaller groups.

As in the parallel prefix case more than two pseudocarries can be combined to form the pseudo carry of a large group:

If the large group i to j is divided into 3 groups say, i to k'−1, k' to k"−1, and k" to j then:

$$G_{j:i}=p_jH_{j:i}$$

$$H_{j:i}=g_j+G_{j-1:i}$$

$$G_{j-1:i}=G_{j-1:k''}+P_{j-1:k''}G_{k''-1:k'}+P_{j-1:k''}P_{k''-1:k'}G_{k'-1:i}$$

$$G_{k''-1:k'}=p_{k''-1}H_{k''-1:k'}$$

$$G_{k'-1:i}=p_{k'-1}H_{k'-1:i}$$

$$H_{j:i}=H_{j:k''}+P_{j-1:k''-1}H_{k''-1:k'}+P_{j-1:k''-1}P_{k''-2:k'-1}H_{k'-1:i}$$

This method still suffers the same problems as the parallel prefix method, that is, more complex gates. Note that $H_{j:i}$ has the form $H_2+P_2H_1+P_2P_1H_0$, which is exactly the same as that of the Group generate function $G_2+P_2G_1+P_2P_1G_0$ in the parallel prefix method, and higher fan-out is the also the same. Ling's method will now be illustrated by way of example.

The following is an example of a 9-bit Ling adder, which is illustrated in FIG. 5a.

$$G_{8:0}=G_{8:6}+P_{8:6}G_{5:3}P_{8:6}P_{5:3}G_{2:0}=p_8H_{8:0}$$

$$H_{8:0}=H_{8:6}+P_{7:5}H_{5:3}+P_{7:5}P_{4:2}H_{2:0}$$

The pseudocarry functions are:

$$H_{8:6}=g_8+g_7+p_7g_6$$

$$H_{5:3}=g_5+g_4+p_4g_3$$

$$H_{2:0}=g_2+g_1+p_1g_0$$

Note that at the first level, the highest complexity function for Ling has the form $H_2+H_1+P_1H_0$, where as for parallel prefix this is $G_2+P_2G_1+P_2P_1G_0$.

But the complexity of $H_{8:0}$ is the same as $G_{8:0}$, both being of the form A+BC+DEF. One may try to combine $P_{7:5}P_{4:2}$ and thus reduce the complexity of the second level to A+BC+DE, but $$P_{7:5}P_{4:2}=P_{7:2}=p_7p_6p_5p_4p_3p_2$$

which is an AND of 6 terms and generally slower to calculate than $$H_{2:0}=g_2+g_1+p_1g_0$$

The Ling adder does have the problem that to produce the actual carry out the logical AND of $p_j$ and $H_{j:i}$ needs to be formed which would impact the delay. This extra delay can however be eliminated by noting that the critical path for a n-bit adder is in producing the n−1 th bit which can be expressed as:

$$S_{n-1} = a_{n-1} \oplus b_{n-1} \oplus G_{n-2:0}$$
$$= a_{n-1} \oplus b_{n-1} \oplus p_{n-2}H_{n-2:0}$$

But $p_{n-2}$ can be computed faster than $H_{n-2:0}$ and so a multiplexer can be used. This is shown in FIG. 5b.

$$S_{n-1}=(a_{n-1}\oplus b_{n-1}\oplus p_{n-2})H_{n-2:0}+(a_{n-1}\oplus b_{n-1})H_{n-2:0}^c$$

Although Ling's method is better than the parallel prefix method, it nevertheless has a number of shortcomings. It parallelizes the computation of $G_{j:i}$ as $p_jH_{j:i}$, but one of the functions, $p_j$, is a very simple bit level propagate while the other function, $H_{j:i}$, is much more complex and so the parallelization is very limited. This parallelization, $G_{j:i}=p_jH_{j:i}$ cannot be extended to more than two functions, that is no method is provided to parallelize $G_{j:i}$ as XYZ etc. Ling's method allows for the speed of the first level only (compared to the parallel prefix method) and even this is very limited allowing for at most a reduction in the fan-in of the AND gates at the first level by at most 1. It offers no advantage over parallel prefix method when combining Group functions, in terms of the complexity of the gates and the fan out of Group functions.

The first drawback of Ling's approach is that although the carry function $G_{j:i}=p_j H_{j:i}$ is broken down as a combination of two simpler functions, which can be computed in parallel, one of the functions is a very simple $p_j=a_j+b_j$ while the second is much more complex. Thus the impact on the delay in calculating the carry is very small.

A further prior art technique for generating carry bits is described in U.S. Pat. No. 5,964,827 (IBM Corporation). The IBM technique involves generating $G_{3:0}$ by factorising $p_3 p_2$ out of the expression for $G_{3:0}$. The result is:

$$G_{3:0}=g_3+p_3 p_2[g_2+g_1+p_1 g_0]=[g_3+p_3 p_2][g_3+g_2+g_1+p_1 g_0]$$

The function $G_{15:0}$ is then determined using a similar factorisation involving a group function, giving:

$$G_{15:0}=[G_{15:12}+P_{15:12}P_{11:8}][G_{15:12}+G_{11:8}+G_{7:4}+P_{3:0}G_{3:0}].$$

The IBM method provides the advantage that the above factorisation reduces all AND gates to only two inputs. This is particularly useful in dynamic logic implementations because AND gates slow down significantly as the number of inputs is increased. Thus, the aim of the IBM idea is to reduce the number of inputs to a minimum for each AND gate. This can be achieved by combining only four bits at each level to produce a group generate function or a carry, and performing the above factorisation, in which each AND gate has only two inputs. In this type of technology, it is not as crucial to limit the number of inputs on an OR gate. However in the IBM method, the generate function is fully calculated at each stage by performing an AND operation between the two terms in brackets. This is unnecessary, and slows down the circuit.

SUMMARY OF THE INVENTION

The present invention uses reduced generate logic which is simpler logic than the generate logic i.e. less logic is required and the computation is faster. The output of generate logic indicates if a carry will be generated out of a group of input bits. The output of reduced generate logic for a group of input bits, partitioned into at least one most significant bit, and at least one least significant bit, is the logical OR of a generate logic for the least significant bits and logic for performing a function X for the most significant bits. X represents a function which is high if a carry is generated out of the most significant bits, low if no carry is generated at any bit position in the most significant bits, and in a don't care state if a carry is generated at some bit position in the most significant bits but no carry is generated out of the most significant bits.

One aspect of the present invention provides a method and apparatus for forming reduced generate logic for a group of input bits using at least one reduced generate output for at least one subgroup of the group of input bits, at least one reduced generate logic generating an output based on an X function using at least two most significant input bits.

One aspect of the present invention provides a method and apparatus for carry generation in which logic is arranged in levels of logic in which each level computes reduced generate functions, and lower levels compute reduced generate functions from reduced generate functions at higher levels, wherein at least one of the reduced generate functions has an X component ranging over at least two bits. The levels are preferable levels in a tree structure.

Another aspect provides a logic circuit for generation of a carry bit output by combining two sets of binary inputs, the logic circuit comprising first logic for receiving a plurality of bits of the binary inputs and for generating at least one intermediate output; final logic for receiving at least one intermediate output of the first logic and for generating the carry bit output; wherein said final logic is arranged to generate the carry bit output using a reduced generate function for a group of bits of the binary inputs and at least one intermediate output from said first logic at least one of which is generated as a reduced generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein first logic and/or said final logic is arranged to use a reduced generate function in which the group or sub-group of bits of the binary inputs is partitioned so that said at least one most significant bit comprises at least two most significant bits.

Another aspect provides a logic circuit for generation of a sum bit output by combining two sets of binary inputs, the logic circuit comprising first logic for receiving a plurality of bits of the binary inputs and for generating at least one intermediate output; final logic for receiving at least one intermediate output of the first logic and for generating the sum bit output; wherein said final logic is arranged to generate the sum bit output using a reduced generate function for a group of bits of the binary inputs and at least one intermediate output from said first logic at least one of which is generated as a reduced generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein first logic and/or said final logic is arranged to use a reduced generate function in which the group or sub-group of bits of the binary inputs is partitioned so that said at least one most significant bit comprises at least two most significant bits.

In this aspect of the present invention, the sum bit is calculated directly using the reduced generate function, rather than generating the carry and logically exclusive OR combining the carry bit with the exclusive OR combination of input bits. In one embodiment the final logic includes at least one multiplexer.

Another aspect provides a logic circuit for generation of a carry bit output by combining two sets of binary inputs, the logic circuit comprising a first level of logic comprising a plurality of logic units, each logic unit for receiving a plurality of bits of the binary inputs and for generating an intermediate output; at least one further level of logic including a final level of logic for receiving outputs of at least one previous level of logic and comprising at least one logic unit for receiving the intermediate outputs from at least one logic unit of at least one previous level and for generating an intermediate output; and output logic for generating the carry bit output using at least one of the intermediate outputs from the final level of logic; wherein at least one logic unit of at least one level of logic is arranged to generate an intermediate output as a reduced generate function for a group of bits of the binary inputs using intermediate outputs from at least one higher level at least one of which is generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one level of logic is arranged to generate an intermediate output as a reduced generate function in which the group or sub-group of bits of the binary inputs for said at least one logic unit is partitioned so that said at least one most significant bit comprises at least two most significant bits.

In one embodiment further logic is provided for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and the intermediate output of said final level generated as a reduced generate function for a group of bits.

A second aspect provides a logic circuit for generation of a sum bit output by combining two sets of binary inputs, the logic circuit comprising a first level of logic comprising a plurality of logic units, each logic unit for receiving a plurality of bits of the binary inputs and for generating an intermediate output; at least one further level of logic including a final level of logic for receiving outputs of at least one previous level of logic and comprising at least one logic unit for receiving the intermediate outputs from at least one logic unit of at least one previous level and for generating an intermediate output; and output logic for generating the sum bit output using at least one of the intermediate outputs from the final level of logic; wherein at least one logic unit of at least one level of logic is arranged to generate an intermediate output as a reduced generate function for a group of bits of the binary inputs using intermediate outputs from at least one higher level at least one of which is generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one level of logic is arranged to generate an intermediate output as a reduced generate function in which the group or sub-group of bits of the binary inputs for said at least one logic unit is partitioned so that said at least one most significant bit comprises at least two most significant bits.

In this aspect of the present invention, the sum bit is calculated directly using the reduced generate function, rather than generating the carry and logically exclusive OR combining the carry bit with the exclusive OR combination of input bits. In one embodiment the output logic comprises a multiplexer.

In one embodiment further logic is provided for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and the intermediate output of said final level generated as a reduced generate function for a group of bits.

Another aspect provides a logic circuit for generation of a carry bit output by combining two sets of binary inputs, the logic circuit comprising a first level of logic comprising a plurality of logic units, each logic unit for receiving a plurality of bits of the binary inputs and for generating an intermediate output; at least one further level of logic for receiving outputs of at least one previous level of logic and comprising at least one logic unit for receiving the intermediate outputs from at least one logic unit of the at least one previous level and for generating an intermediate output; a final level of logic for receiving at least one of the intermediate outputs of at least one previous level of logic and comprising at least one logic unit for receiving the intermediate outputs from at least one logic unit of the at least one previous level of logic and for generating the carry bit output; wherein at least one logic unit of at least one of said further levels of logic is arranged to generate an intermediate output as a reduced generate function for a group of bits of the binary inputs using intermediate outputs from at least one higher level, at least one of said intermediate outputs being generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one of said first or further levels of logic is arranged to generate an intermediate output as a reduced generate function in which the group or sub-group of bits of the binary inputs for said at least one logic unit is partitioned so that said at least one most significant bit comprises at least two most significant bits.

Another aspect provides a logic circuit for generation of a sum bit output by combining two sets of binary inputs, the logic circuit comprising a first level of logic comprising a plurality of logic units, each logic unit for receiving a plurality of bits of the binary inputs and for generating an intermediate output; at least one further level of logic for receiving at least one of the intermediate outputs of at least one previous level of logic and comprising at least one logic unit for receiving the intermediate outputs from at least one logic unit of the at least one previous level and for generating an intermediate output; a final level of logic for receiving outputs of at least one previous level of logic and comprising at least one logic unit for receiving the intermediate outputs from at least one logic unit of the at least one previous level of logic and for generating the sum bit output; wherein at least one logic unit of at least one of said further levels of logic is arranged to generate an intermediate output as a reduced generate function for a group of bits of the binary inputs using intermediate outputs from at least one higher level, at least one of said intermediate outputs being generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one of said first or further levels of logic is arranged to generate an intermediate output as a reduced generate function in which the group or sub-group of bits of the binary inputs for said at least one logic unit is partitioned so that said at least one most significant bit comprises at least two most significant bits.

In this aspect of the present invention, the sum bit is calculated directly using the reduced generate function, rather than generating the carry and logically exclusive OR combining the carry bit with the exclusive OR combination of input bits. In one embodiment the final level of logic includes at least one multiplexer.

Another aspect provides a logic circuit for generation of a carry bit output by combining two sets of binary inputs, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the carry bit output; wherein at least one logic unit of at least one of said first logic is arranged to generate an intermediate output as a reduced generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of said first logic is arranged to generate an intermediate output for receipt by said final logic as a reduced generate function in which the group of bits of the binary inputs for said at least one logic unit is partitioned so that said at least one most significant bit comprises at least two most significant bits.

Another aspect provides a logic circuit for generation of a sum bit output by combining two sets of binary inputs, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the sum bit output; wherein at least one logic unit of at least one of said first logic is arranged to generate an intermediate output as a reduced generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of said first logic is arranged to generate an intermediate output for receipt by said final logic as a reduced generate function in which the group of bits of the binary inputs for said at least one logic unit is partitioned so that said at least one most significant bit comprises at least two most significant bits.

In this aspect of the present invention, the sum bit is calculated directly using the reduced generate function, rather than generating the carry and logically exclusive OR combining the carry bit with the exclusive OR combination of input bits. In one embodiment the final logic includes at least one multiplexer.

Another aspect of the present invention provides a logic circuit for generation of a carry bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits of said binary input; and combining logic for generating the carry bit output by combining outputs of said first and second logic.

Another aspect of the present invention provides a logic circuit for generation of a sum bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits of said binary input; and combining logic for generating the sum bit output by combining outputs of said first and second logic.

In this aspect of the present invention, the sum bit is calculated directly rather than generating the carry and logically exclusive OR combining the carry bit with the exclusive OR combination of input bits. In one embodiment the combining logic includes at least one multiplexer.

In one embodiment of the present invention, the first logic comprises a plurality of first logic modules, each for receiving bit level carry generate and propagate function bits for subgroups of the first group of at least three most significant bits of the binary inputs to generate a high output if a carry is generated for the subgroup of most significant bits of the binary input or if the carry propagate function bits for the subgroup of most significant bits are all high.

In one embodiment, the second logic comprises a plurality of logic modules for receiving subgroups of the second group of least significant bits of the binary input to generate a carry for each of the subgroups and combining logic for combining the generated carrys.

Another aspect of the present invention provides a logic circuit for generation of a carry bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits of said binary inputs and a function B which is high if a carry is generated at any bit position in the most significant bits; and combining logic for generating the carry bit output by combining outputs of said first and second logic.

Another aspect of the present invention provides a logic circuit for generation of a sum bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits of said binary inputs and a function B which is high if a carry is generated at any bit position in the most significant bits; and combining logic for generating the sum bit output by combining outputs of said first and second logic.

In this aspect of the present invention, the sum bit is calculated directly rather than generating the carry and logically exclusive OR combining the carry bit with the exclusive OR combination of input bits. In one embodiment the combining logic includes at least one multiplexer.

Another aspect of the present invention provides a binary adder circuit comprising the logic circuit as hereinabove described, and including addition logic comprising exclusive OR logic and multiplexer for determining an addition result including the carry bit for the binary inputs Another aspect of the present invention provides a comparison logic circuit for comparing two binary inputs comprising the logic circuit as hereinabove described, and including logic for using the carry bit to indicate whether one binary input represents a binary number less than or more than another binary number represented by the other binary input.

The present invention also encompasses the use of reduced modified generate logic (D) which is simpler logic than modified generate logic. Modified generate logic indicates if a carry is generated out of the addition of inputs plus one. This enables the logic unit D to be broken down and computed in a parallel fashion.

Another aspect provides a logic circuit for generation of a carry bit output by adding two sets of binary inputs plus one, the logic circuit comprising first logic for receiving a plurality of bits of the binary inputs and for generating at least one intermediate output; final logic for receiving at least one intermediate output of the first logic and for generating the carry bit output; wherein said final logic is arranged to generate the carry bit output using a reduced modified generate function for a group of bits of the binary inputs and at least one intermediate output from said first logic at least one of which is generated as a reduced generate function or a reduced modified generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; wherein said final logic is arranged to use a reduced modified generate function in which the group or sub-group of bits of the binary inputs is partitioned so that said at least one most significant bit comprises at least two most significant bits and/or said first logic is arranged to generate at least one intermediate output as a reduced generate function or a reduced modified generate function in which the group or sub-group of bits of the binary inputs is partitioned so that said at least one most significant bit comprises at least two most significant bits.

In another aspect of the present invention the sum bit for two inputs plus one can similarly be computed.

In one embodiment the reduced modified generate function uses a hyper propagate function (PD) for the group of bits, the hyper propagate function comprises a logical AND combination of the modified generate function (D) for at least one least significant bit of the group of bits and a propagate function (P) for at least one most significant bit of the group of bits, and the propagate function is high if a carry into a group of bits would be propagated out of the group of bits. Thus in this embodiment the function D is parallelised. The hyper propagate function PD can be further parallelised by using at least one hyper propagate function for a sub-group of bits.

Another aspect provides a logic circuit for generation of a carry bit output by combining two sets of binary inputs plus one, the logic circuit comprising a first level of logic comprising a plurality of logic units, each logic unit for receiving a plurality of bits of the binary inputs and for generating an intermediate output; at least one further level of logic including a final level of logic for receiving outputs of at least one previous level of logic and comprising at least one logic unit for receiving the intermediate outputs from at least one logic unit of at least one previous level and for generating an intermediate output; and output logic for generating the carry bit output using at least one intermediate output from the final level of logic; wherein at least one logic unit of at least one level of logic is arranged to generate an intermediate output as a reduced generate function or a reduced modified generate function for a group of bits of the binary inputs using intermediate outputs from at least one higher level at least one of which is generated as a reduced generate function or reduced modified generate function group of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of at least one level of logic is arranged to generate an intermediate output as a reduced generate function or reduced modified generate function in which the group or sub-group of bits of the binary inputs for said at least one logic unit is partitioned so that said at least one most significant bit comprises at least two most significant bits.

In another aspect of the present invention the sum bit for two inputs plus one can similarly be computed.

In one embodiment further logic is provided for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and the intermediate output of said final level generated as a reduced modified generate function for a group of bits.

Another aspect provides a logic circuit for generation of a carry bit output by combining two sets of binary inputs plus one, the logic circuit comprising a first level of logic comprising a plurality of logic units, each logic unit for receiving a plurality of bits of the binary inputs and for generating an intermediate output; at least one further level of logic for receiving at least one intermediate output of at least one previous level of logic and comprising at least one logic unit for receiving the intermediate outputs from at least one logic unit of the at least one previous level and for generating an intermediate output; a final level of logic for receiving outputs of at least one previous level of logic and comprising at least one logic unit for receiving the intermediate outputs from at least one logic unit of the at least one previous level of logic and for generating the carry bit output; wherein at least one logic unit of at least one of said further levels of logic is arranged to generate an intermediate output as a reduced generate function or a reduced modified generate function for a group of bits of the binary inputs using at least one intermediate output from at least one higher level, at least one of said intermediate outputs being generated as a reduced generate function or a reduced modified generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of at least one of said first or further levels of logic is arranged to generate an intermediate output as a reduced generate function or reduced modified generate function in which the group or sub-group of bits of the binary inputs for said at least one logic unit is partitioned so that said at least one most significant bit comprises at least two most significant bits.

In another aspect of the present invention the sum bit for two inputs plus one can similarly be computed.

Another aspect provides a logic circuit for generation of a carry bit output by combining two sets of binary inputs plus one, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the carry bit output; wherein at least one logic unit of at least one of said first logic is arranged to generate an intermediate output as a reduced generate function or a reduced modified generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of said first logic is arranged to generate an intermediate output for receipt by said final logic as a reduced generate function or a reduced modified generate function in which the group of bits of the binary inputs for said at least one logic unit is partitioned so that said at least one most significant bit comprises at least two most significant bits.

In another aspect of the present invention the sum bit for two inputs plus one can similarly be computed.

Another aspect of the present invention provides a logic circuit for generation of a carry bit output by combining two sets of binary inputs plus one, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits plus one of said binary input; and combining logic for generating the carry bit output by combining outputs of said first and second logic.

In another aspect of the present invention the sum bit for two inputs plus one can similarly be computed.

In one embodiment of the present invention, the first logic comprises a plurality of first logic modules, each for receiving bit level carry generate and propagate function bits for subgroups of the first group of at least three most significant bits of the binary inputs to generate a high output if a carry is generated for the subgroup of most significant bits of the binary input or if the carry propagate function bits for the subgroup of most significant bits are all high.

In one embodiment, the second logic comprises a plurality of logic modules for receiving subgroups of the second group of least significant bits of the binary input to generate a carry for each of the subgroups and combining logic for combining the generated carrys.

Another aspect of the present invention provides a logic circuit for generation of a carry bit output by combining two sets of binary inputs plus one, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits plus one of said binary inputs and a function B which is high if a carry is generated at any bit position in the most significant bits; and combining logic for generating the carry bit output by combining outputs of said first and second logic.

In another aspect of the present invention the sum bit for two inputs plus one can similarly be computed.

Another aspect of the present invention provides a logic circuit for generation of a carry bit output by combining two sets of binary inputs, the logic circuit comprising logic for receiving a plurality of bits of the binary inputs and for generating the carry bit output; wherein said logic is arranged to generate the carry bit output as the logical AND of a generate function G for at least one most significant bit, a reduced modified generate function for the said at least one most significant bit and at least one middle bit of the binary inputs and a reduced generate function for said at least one middle bit and at least one least significant bit of the binary inputs; wherein said reduced generate function is the logical OR of a generate function G for the at least one least significant bit and a function X for the at least one most significant bit and the at least one middle bit, where the generate function for the at least one least significant bit is high if a carry is generated out of the at least one least significant bit and low if not, and X is a function which is high if a carry is generated out of the at least one most significant bit and said at least one middle bit, low if no carry is generated at any bit position in the at least one most significant bit and said at least one middle bit, and in a don't care state if a carry is generated at some bit position in the at least one most significant bit and said at least one middle bit but no carry is generated out of the at least one most significant bit and said at least one middle bit; said reduced modified generate function is the logical OR of a modified generate function D for the at least one middle bit and the function X for the most significant bits, where the modified generate function D for the at least one middle bit is high if a carry is generated on adding the at least one middle bit plus one and low if not.

Another aspect of the present invention provides a logic circuit for generation of a carry bit output D by combining two sets of binary inputs plus 1, the logic circuit comprising logic for receiving a plurality of bits of the binary inputs and for generating the carry bit output; wherein said logic is arranged to generate the carry bit output as the logical AND of a modified generate function D for at least one most significant bit, a first reduced modified generate function for the said at least one most significant bit and at least one middle bit of the binary inputs and a second reduced modified generate function for said at least one middle bit and at least one least significant bit of the binary inputs; wherein said second reduced modified generate function is the logical OR of a modified generate function for the at least one least significant bit and a function X for the at least one most significant bit and the at least one middle bit, where the modified generate function for the at least one least significant bit is high if a carry is generated out of the at least one least significant bit plus one and low if not, and X is a function which is high if a carry is generated out of the at least one most significant bit and said at least one middle bit, low if no carry is generated at any bit position in the at least one most significant bit and said at least one middle bit, and in a don't care state if a carry is generated at some bit position in the at least one most significant bit and said at least one middle bit but no carry is generated out of the at least one most significant bit and said at least one middle bit; said first reduced modified generate function is the logical OR of a modified generate function for the at least one middle bit and the function X for the most significant bits, where the modified generate function for the at least one middle bit is high if a carry is generated on adding the at least one middle bit plus one and low if not.

Another aspect of the present invention provides a method of designing a logic circuit for generating a carry bit or sum bit from the combination of two j-bit binary inputs, the method comprising: performing a first parallelisation of the function $G_{j-1:0}$ for generating the carry in accordance with a first relationship $G_{a:c}=D_{a:b}(X_{a:b}+G_{b-1:c})$ to generate a parallelised function $D_{j-1:k}(X_{j-1:k}+G_{k-1:0})$, where G represents a generate function for a group of bits from j−1 to 0 or from k−1 to 0, D represents a logical OR of a generate function and a propagate function for a group of bits from j−1 to k, and X represents a function which is high if a carry is generated out of the j−1 to k bits, low if no carry is generated at any bit position in the j−1 to k bits, and in a don't care state if a carry is generated at some bit position in the j−1 to k bits but no carry is generated out of the j−1 to k bits; performing a second parallelisation of the generate function of the parallelised function using a parallel prefix method to generate a further parallelised function; and designing a logic circuit in accordance with the further parallelised function.

In one embodiment the method includes performing a further parallelisation of the further parallelised function using the first relationship to parallelise the generate function for a group of least significant bits.

In one embodiment the method includes performing a further parallelisation of the further parallelised function using a parallel prefix method to parallelise the further parallelised generate function for a group of least significant bits.

In one embodiment the method includes repeatedly performing further parallelisations of the further parallelised function using alternately the first relationship and a parallel prefix method to parallelise the generate function for a group of least significant bits.

In one embodiment the method includes performing a parallelisation of D using a third relationship $D_{a:c}=D_{a:b}(X_{a:b}+D_{b-1:c})$ to generate a further parallelised function for use in the logic design.

In one embodiment the method includes performing a further parallelisation of D in the further parallelised function using a parallel prefix method.

In one embodiment the method includes repeatedly performing further parallelisations of D in the further parallelised function using alternately the third relationship and a parallel prefix method to parallelise D.

In one embodiment of the present invention the method includes using at least one multiplexer in conjunction with logic for performing the further parallelised functions.

The present invention allows for a greater degree of parallelisation than in either Ling or IBM, thus speeding up the computation of carry and/or sum bits.

Embodiments of the present invention will now be described, by way of example only, with reference to the accompanying drawings, in which:

DETAILED DESCRIPTION OF THE INVENTION

As a first embodiment to the invention there is disclosed a method which allows for the carry to be formed as a combination of functions, which can be computed in parallel, each of which is more complex than a simple single bit-level propagate.

An embodiment of the invention will now be illustrated by way of example. Consider $$G_{4:0}=g_4+p_4g_3+p_4p_3g_2+p_4p_3p_2g_1+p_4p_3p_2p_1g_0$$

Ling's approach breaks this as $$G_{4:0}=p_4[g_4+g_3+p_3g_2+p_3p_2g_1+p_3p_2p_1g_0]$$

The inventors have observed that the delay of the carry term can be reduced significantly by increasing the delay of some other term by more than a simple bit-level propagate. For example:

$$G_{4:0}=[g_4+p_4p_3][g_4+g_3+g_2+p_2g_1+p_2p_1g_0]$$

$$G_{4:0}=[g_4+p_4g_3+p_4p_3p_2][g_4+g_3+g_2+g_1+p_1g_0]$$

The inventors have further observed that the delay of the carry term can be reduced significantly by increasing the delay of some other terms, rather than just one. For example:

$$G_{4:0}=p_4[g_4+p_3][g_4+g_3+g_2+p_2g_1+p_2p_1g_0]$$

$$G_{4:0}=p_4[g_4+g_3+p_3p_2][g_4+g_3+g_2+g_1+p_1g_0]$$

$$G_{4:0}=[g_4+p_4p_3][g_4+g_3+p_2][g_4+g_3+g_2+g_1+p_1g_0]$$

In the following a Logic unit indicating carry generation from addition of 2 numbers $a_j \ldots a_k$ and $b_j \ldots b_k$ plus 1 will be denoted by:

$$D_{j:k}=G_{j:k}+P_{j:k}$$

The inventors have observed that in general $$G_{j:0}=D_{j:k}[X_{j:k}+G_{k-1:0}]$$

Figure 1:
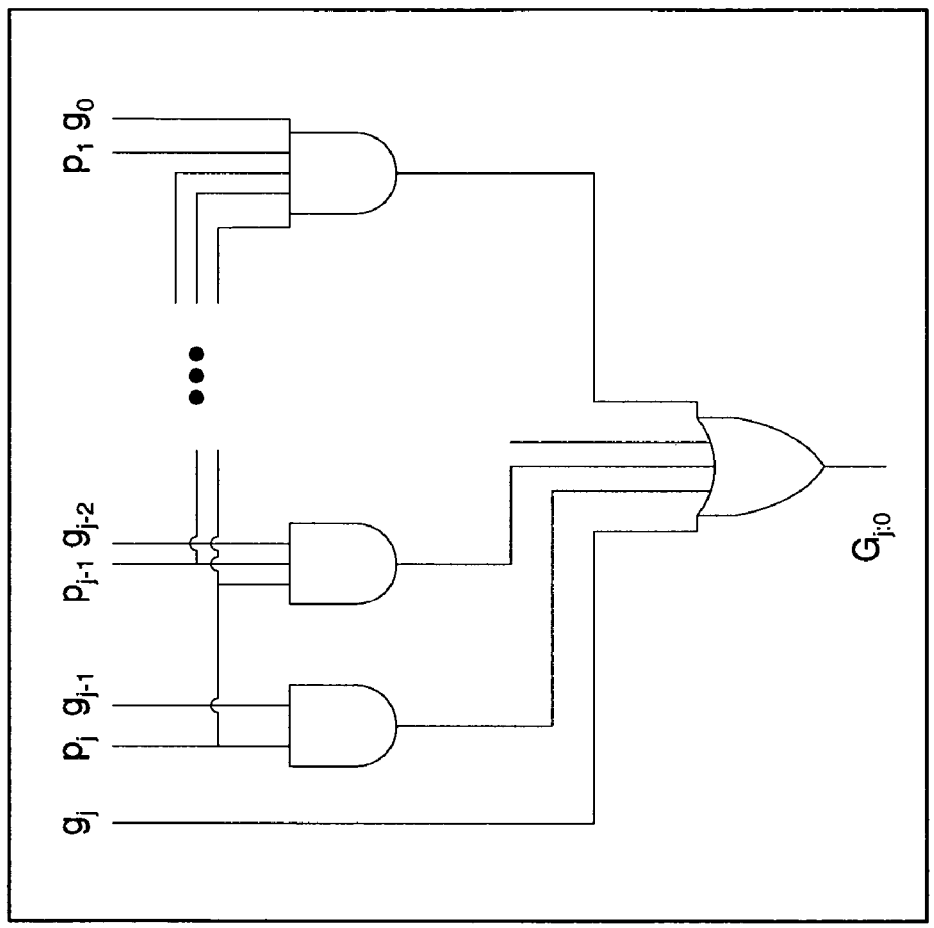
FIG. 1 shows a prior art logic circuit for generating a carry bit using single bit generate and single bit propagate functions.
Figure 2:
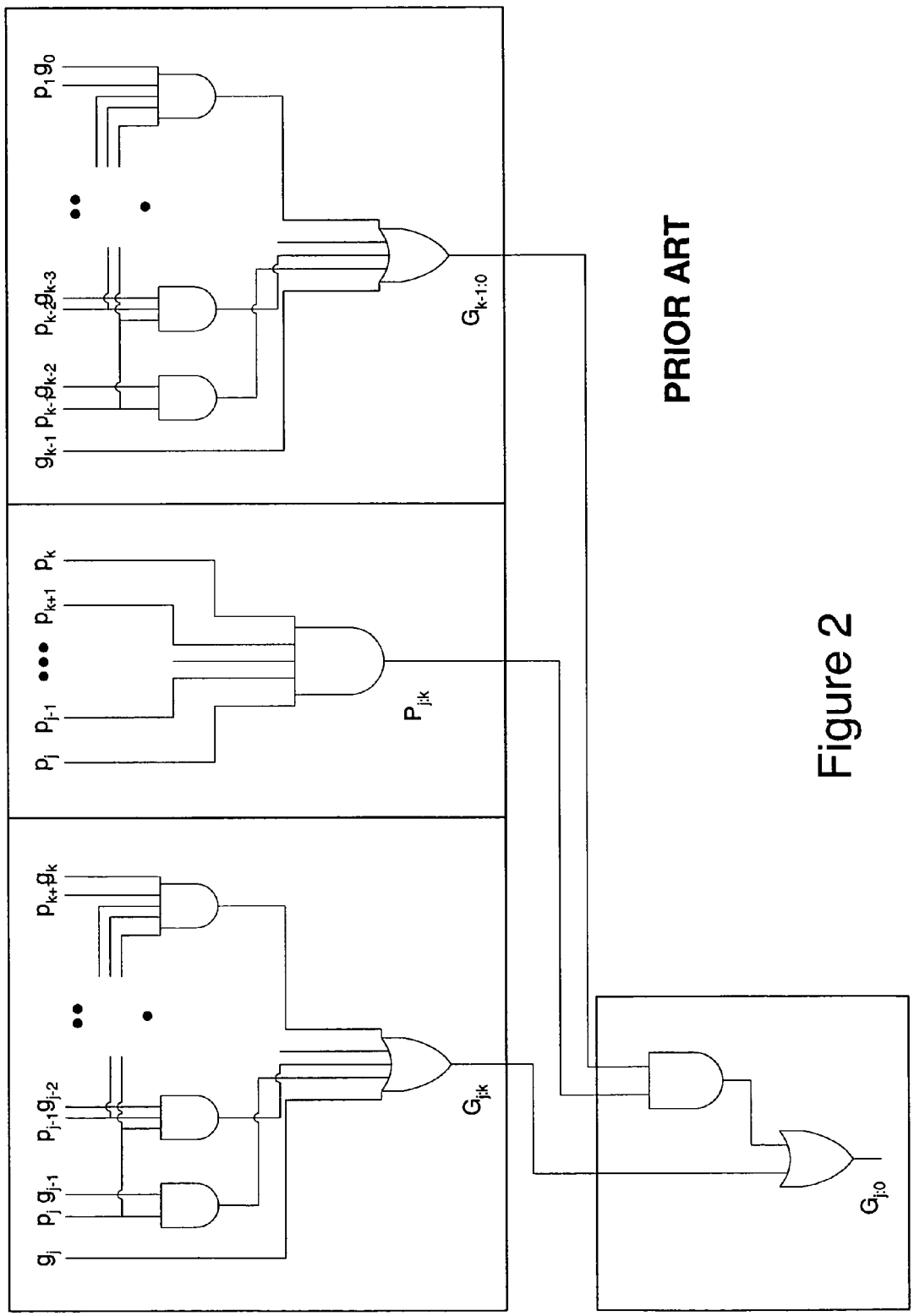
FIG. 2 shows a prior art logic circuit for generating a carry bit using the Parallel Prefix Method.
Figure 3:
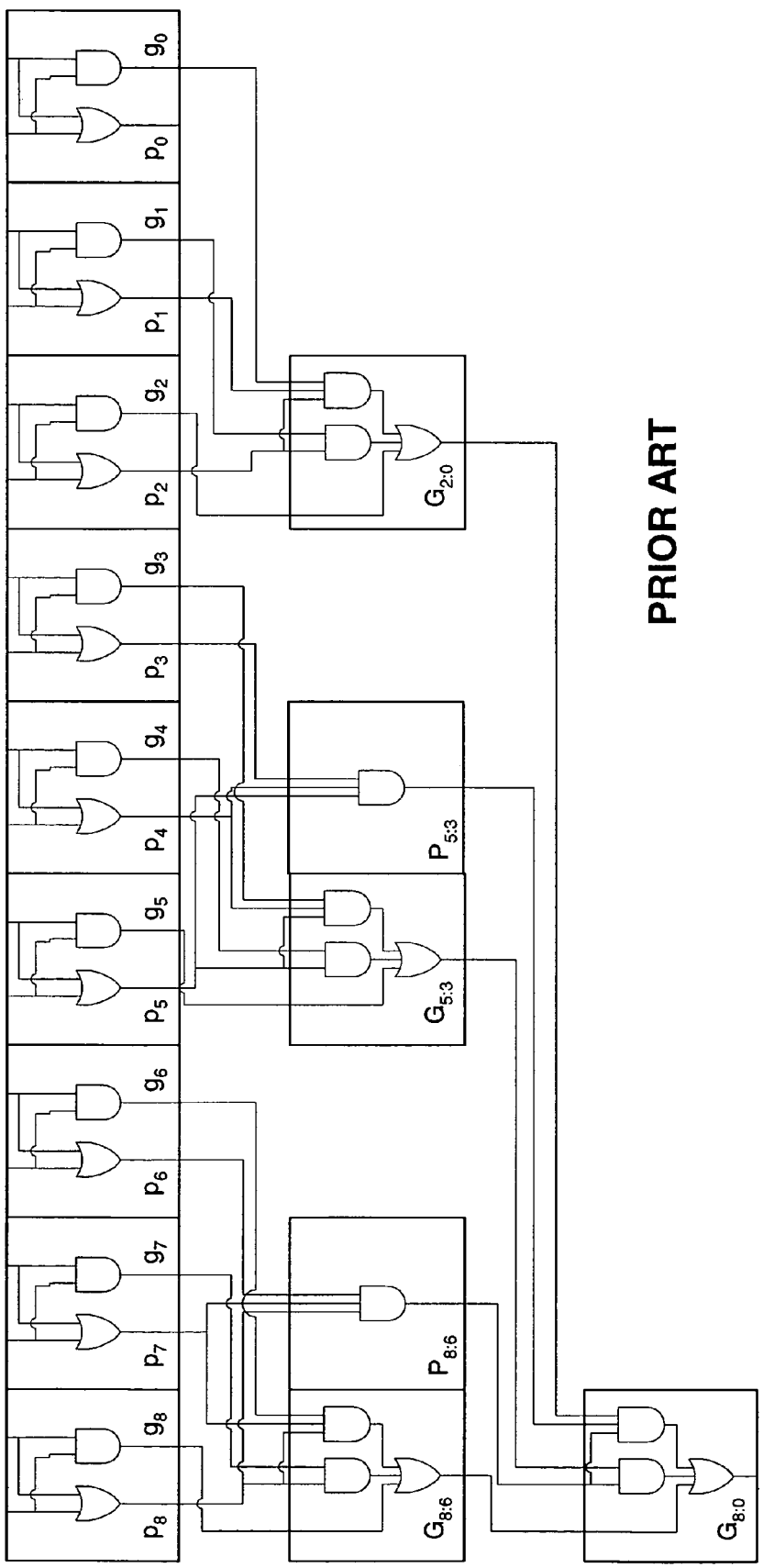
FIG. 3 shows a prior art logic circuit for generating the most significant carry bit in a 9 bit addition, using the base 3 Parallel Prefix method.
Figure 4:
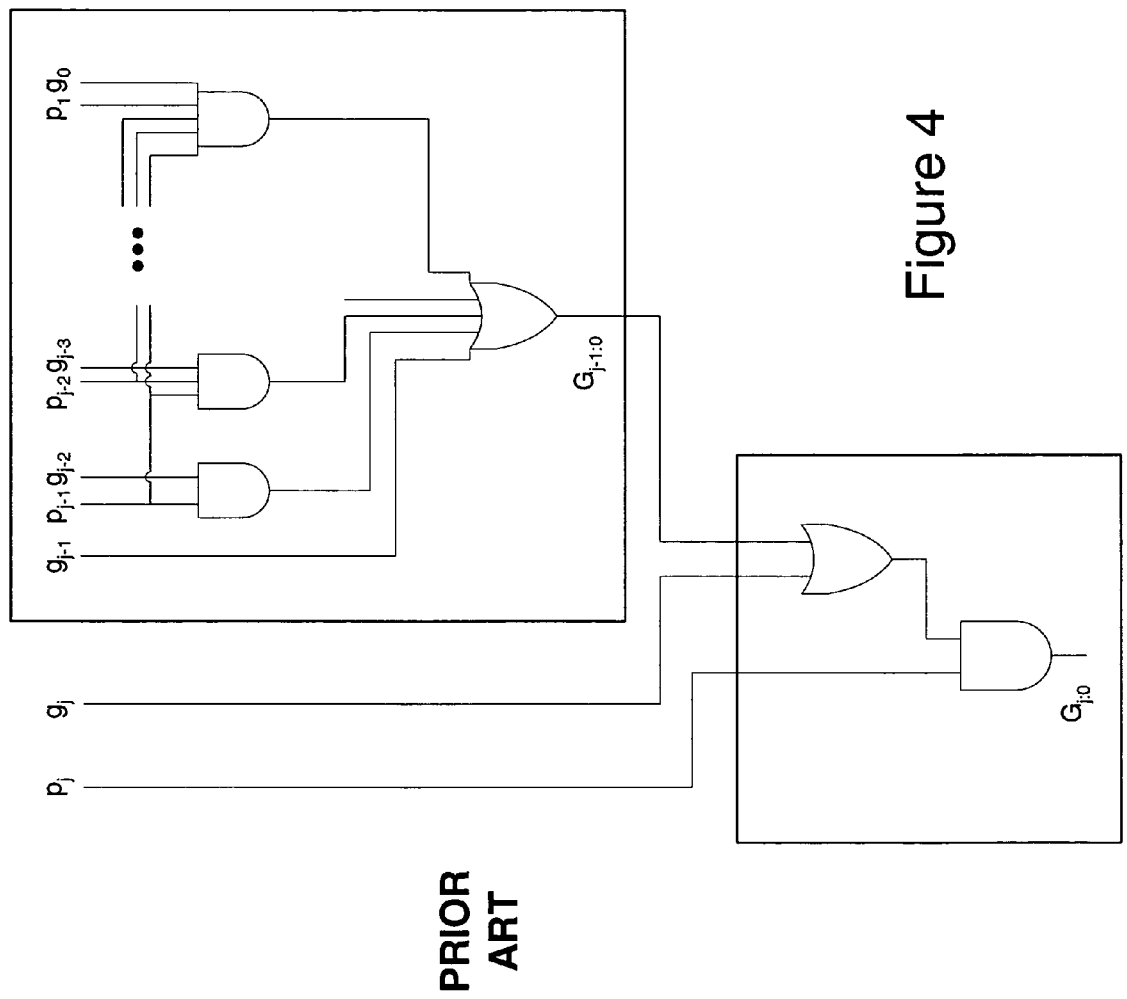
FIG. 4 shows a prior art logic circuit for generating a carry bit using the Ling method.
Figure 5A:
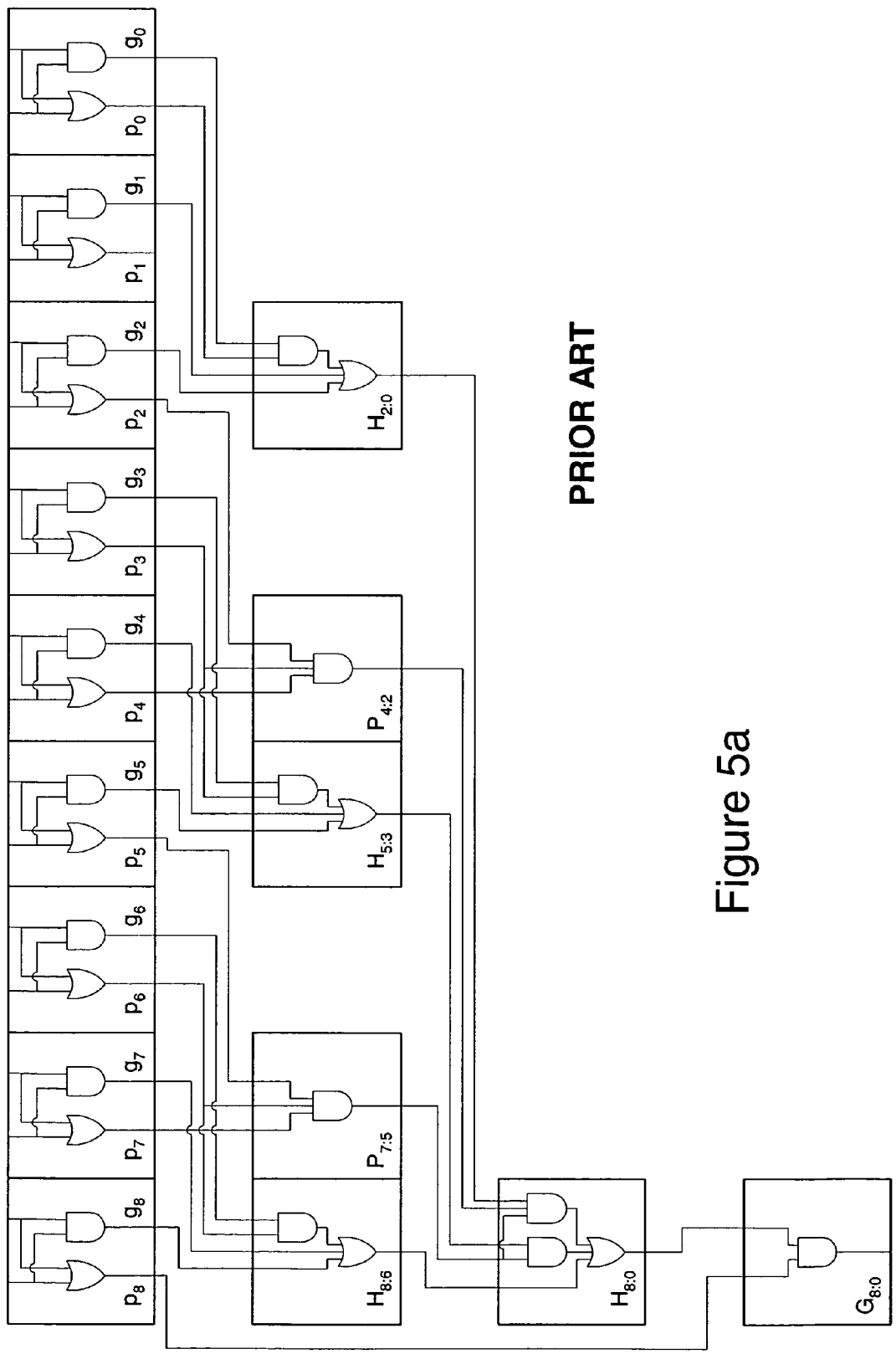
FIG. 5a shows a prior art logic circuit for generating the most significant carry bit in a 9 bit addition, using the Ling method combined with the base 3 Parallel Prefix method.
Figure 5B:
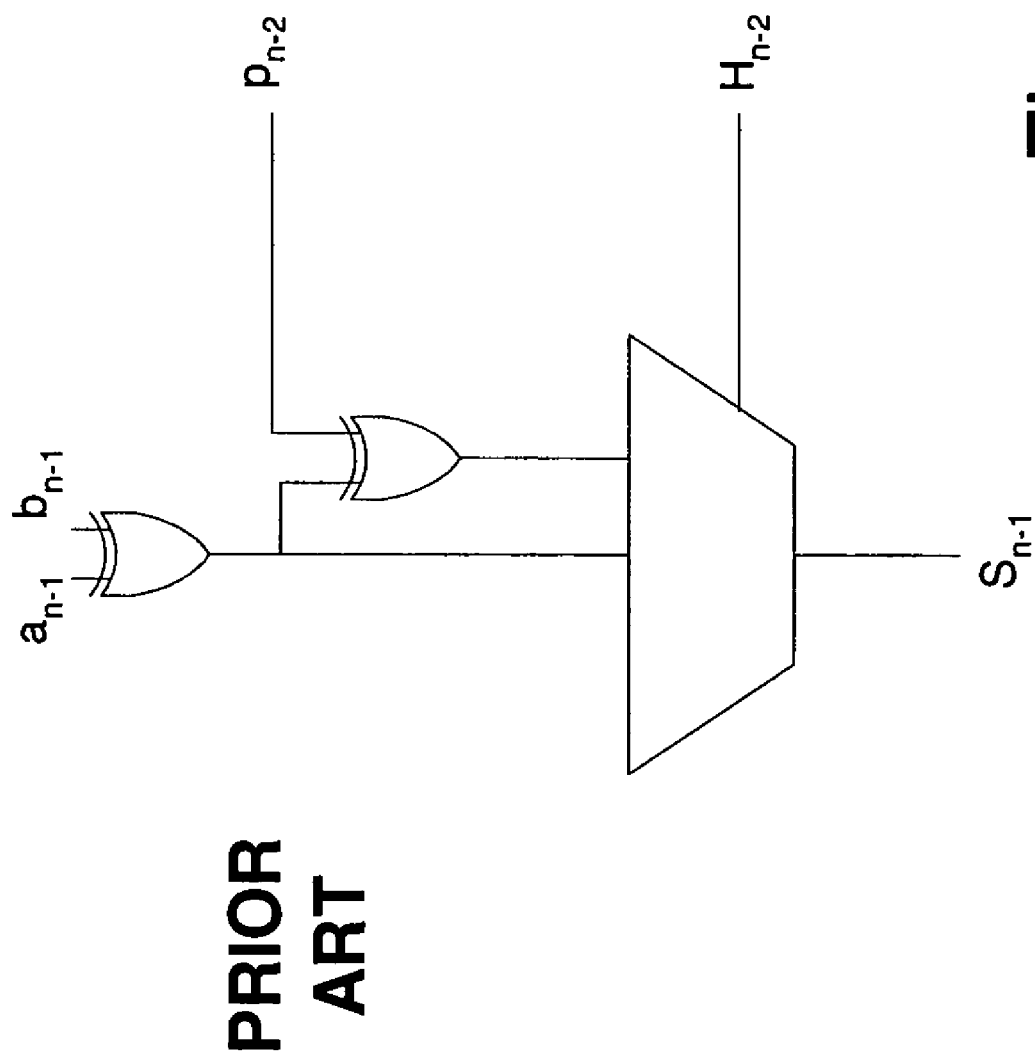
FIG. 5b shows a prior art logic circuit in which the Ling method is used to move an XOR gate off the critical path.
Figure 6:
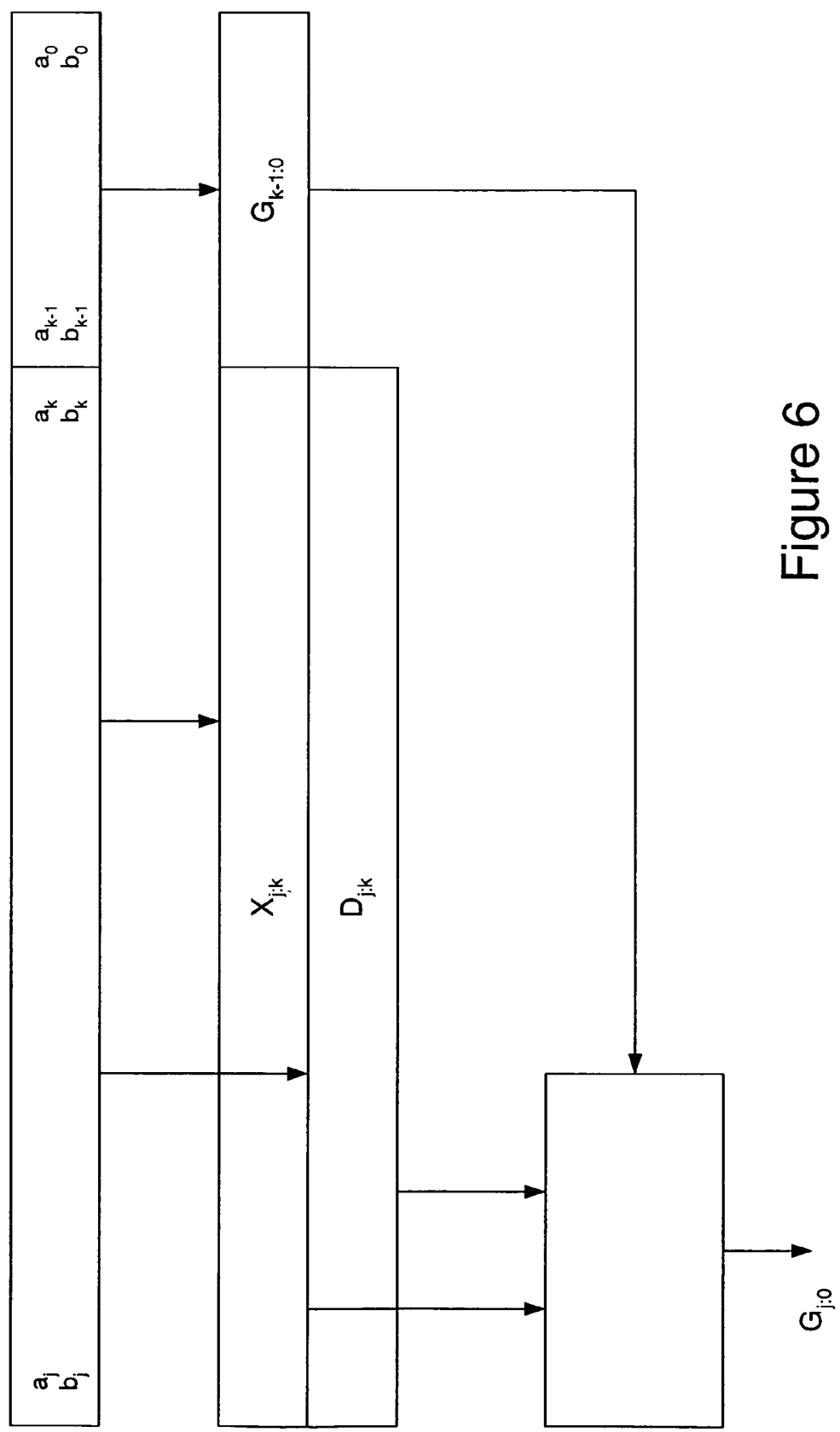
FIG. 6 shows a representation of the data structure of a j+1 bit addition, and the derivation of intermediate functions $X_{j:k}$, $D_{j:k}$, $G_{k-1:0}$ and output $G_{j:0}$.

Thus a method and apparatus are disclosed, as shown in FIG. 6, for a Logic unit indicating carry generation of addition, the input bits being divided into two groups, least significant and most significant bits, in which:

$G_{k-1:0}$ denotes a logic unit indicating carry generation from addition of least significant bits.

$D_{j:k}$ denotes a logic unit indicating carry generation from addition of most significant bits plus 1.

$X_{j:k}$ denotes a logic unit which is high when a carry is generated out of the most significant bits, and is low if no carry is generated at any bit position in the most significant bits. The unit is in a don't care state if a carry is generated at some bit position but no carry is generated out of the most significant bits.

The outputs of the above three logic units are combined in a logical unit for generating $G_{j:0}$.

For 2-bit addition, the following Karnaugh maps respectively illustrate the logic unit X, logic when a carry is generated, and logic when no carry is generated at any bit position.

| $a_1b_1/a_0b_0$ | 00 | 01 | 11 | 10 |
|---|---|---|---|---|
| 00 | 0 | 0 | Don't care | 0 |
| 01 | 0 | 0 | 1 | 0 |
| 11 | 1 | 1 | 1 | 1 |
| 10 | 0 | 0 | 1 | 0 |
| 00 | 0 | 0 | 0 | 0 |
| 01 | 0 | 0 | 1 | 0 |
| 11 | 1 | 1 | 1 | 1 |
| 10 | 0 | 0 | 1 | 0 |
| 00 | 0 | 0 | 1 | 0 |
| 01 | 0 | 0 | 1 | 0 |
| 11 | 1 | 1 | 1 | 1 |
| 10 | 0 | 0 | 1 | 0 |

The inventors have observed that the simplest implementation of the $X_{j:i}$ unit is $$B_{j:i}=g_j+g_{j-1}+\ldots+g_{i+1}+g_i$$

Figure 7:
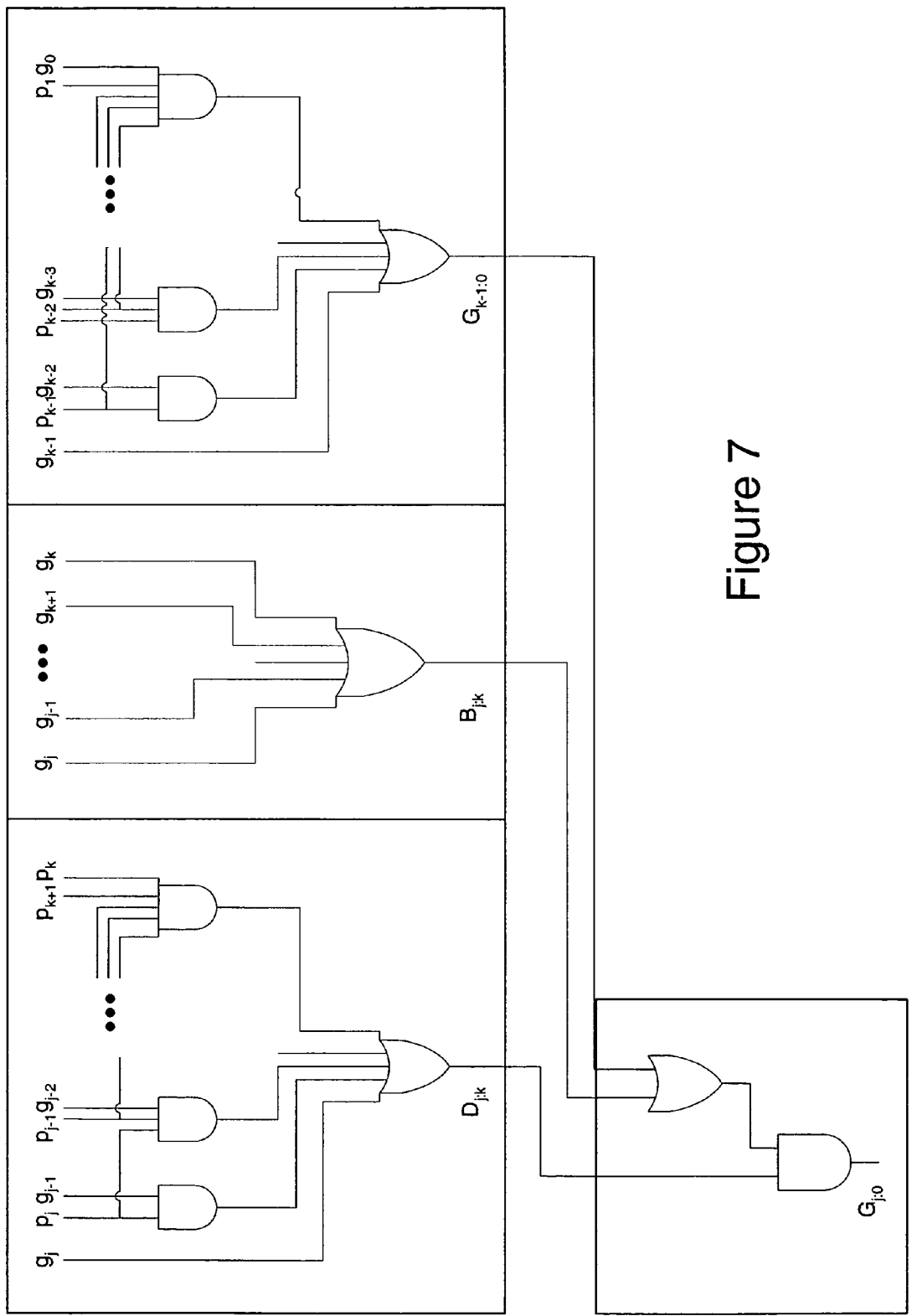
FIG. 7 shows a logic circuit according to an embodiment of the invention in which the functions $X_{j:k}$, $D_{j:k}$, $G_{k-1:0}$ are implemented using logic gates and combined to produce an output of $G_{j:0}$.

Thus, as illustrated in FIG. 7:

$$G_{j:0}=D_{j:k}[B_{j:k}+G_{k-1:0}]$$

EXAMPLE $$G_{8:0}=D_{8:5}[B_{8:5}+G_{4:0}]$$

The inventors have observed that logic indicating carry generation of the addition of two numbers plus 1 can be parallelized as:

$$D_{j:0}=D_{j:k}[X_{j:k}+D_{k-1:0}]$$

Figure 8A:
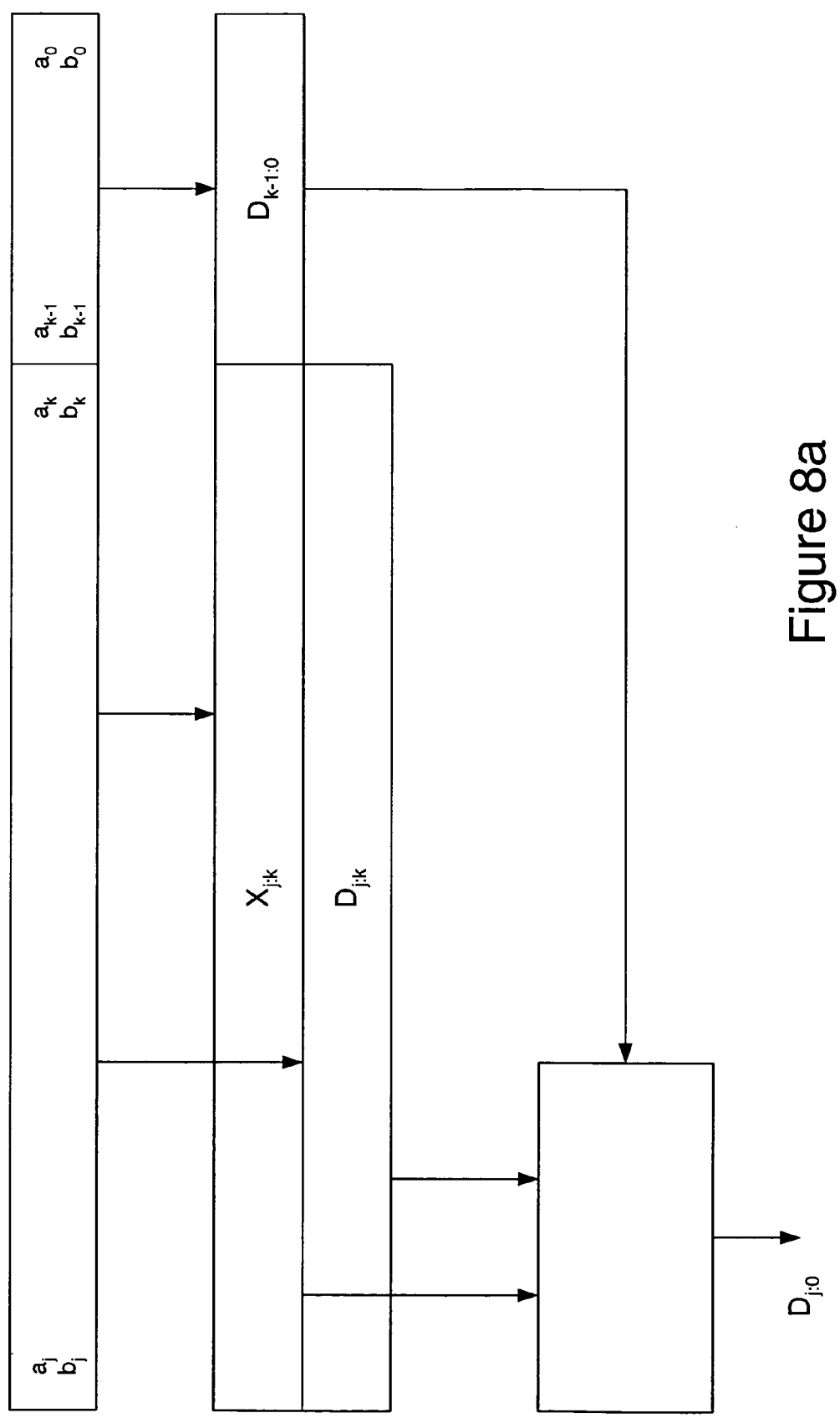
FIG. 8a shows a representation of the data structure of a j+1 bit addition, and the derivation of intermediate functions $X_{j:k}$, $D_{j:k}$, $D_{k-1:0}$ and $D_{j:0}$.

Thus a method and logic circuit are disclosed, and illustrated in FIG. 8a, for carry generation in for example addition, in which the input bits are divided into 2 groups, least significant and most significant bits. The logic circuit comprises:

A logic unit indicating carry generation from addition of least significant bits plus 1, denoted by $D_{k-1:0}$.
A logic unit indicating carry generation from addition of most significant bits plus 1, denoted by $D_{j:k}$.
A logic unit which is high when a carry is generated out of the most significant bits, and is low if no carry is generated at any bit position in the most significant bits. The unit is in a don't care state if a carry is generated at some bit position but no carry is generated out of the most significant bits, denoted by $X_{j:k}$.
A logical unit for combining outputs of the 3 logic units.

The inventors have observed that in such a parallelization the simplest implementation of the $X_{j:i}$ unit is $$B_{j:i}=g_j+g_{j-1}+\ldots+g_{i+1}+g_i$$

Thus $$D_{j:0}=D_{j:k}[B_{j:k}+D_{k-1:0}]$$

The inventors have further observed that further parallelization of carry generation can be achieved by repeated use of parallelizing D $$G_{j:0}=D_{j:k'}[X_{j:k'}+Dk'_{-1:k}][X_{j:k}+G_{k-1:0}]$$

EXAMPLE $$G_{15:0}=D_{15:8}[B_{15:8}+D_{7:4}][B_{15:4}+G_{3:0}]$$

An adder does have the problem that to produce the actual carry out the logical AND of D and X+G needs to be formed which would impact the delay. This extra delay can however be eliminated by noting that the critical path for the n th bit of an adder is:

$$S_{n-1} = a_{n-1} \oplus b_{n-1} \oplus G_{n-2:0}$$
$$= a_{n-1} \oplus b_{n-1} \oplus D_{n-2:k}[X_{n-2:k} + G_{k-1:0}]$$

Figure 8B:
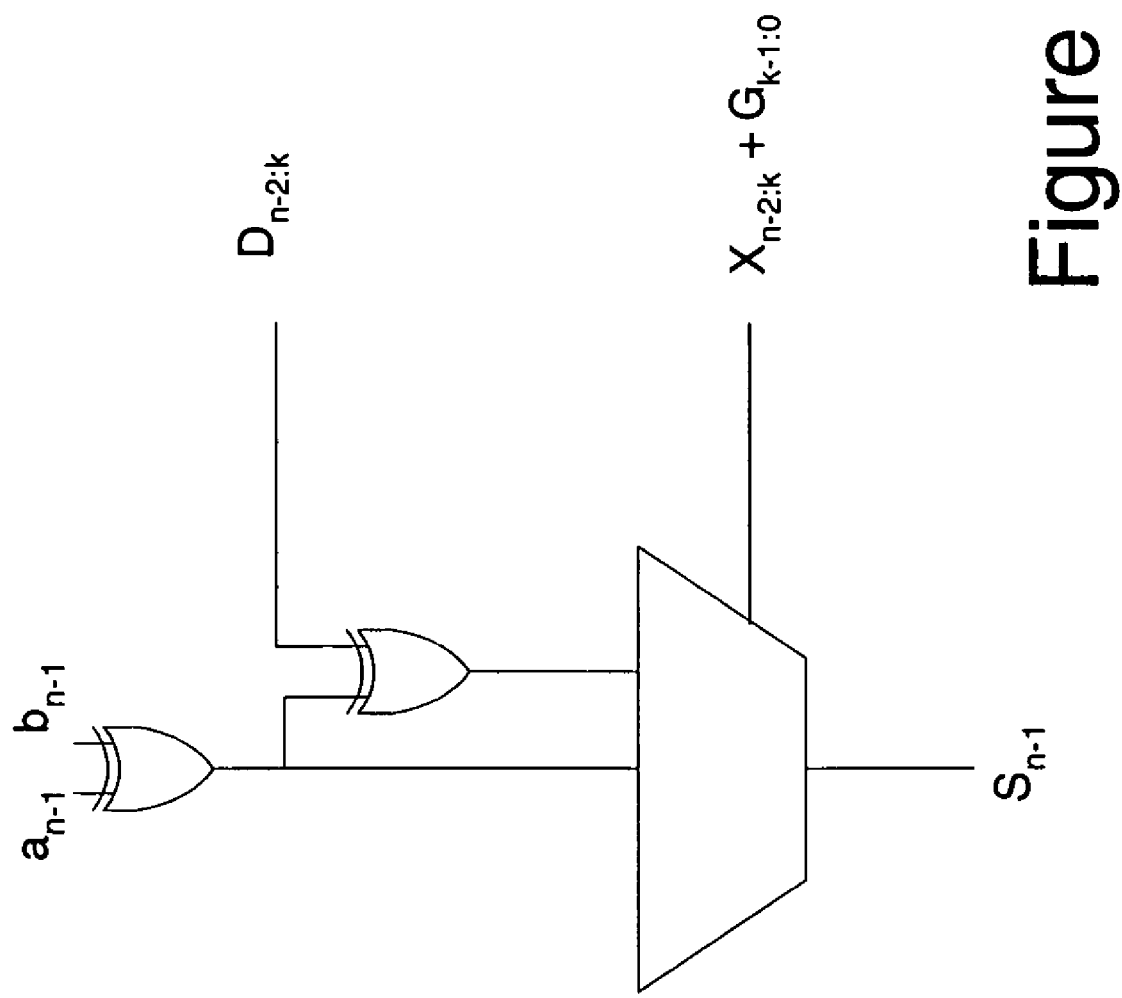
FIG. 8b shows a logic circuit in which the factorisation $D_{n-2:k}[X_{n-2:k}+G_{k-1:0}]$ is used to allow an XOR gate to be moved off the critical path.

By choosing an appropriate k, $D_{n-2:k}$ can be computed faster than $X_{n-2:k}+G_{k-1:0}$ and so a multiplexer can be used. This is illustrates in FIG. 8b.

$$S_{n-1}=(a_{n-1}\oplus b_{n-1}\oplus D_{n-2:k})[X_{n-2:k}+G_{k-1:0}]+$$
$$(a_{n-1}\oplus b_{n-1})[X_{n-2:k}+G_{k-1:0}]^c$$

Figure 8C:
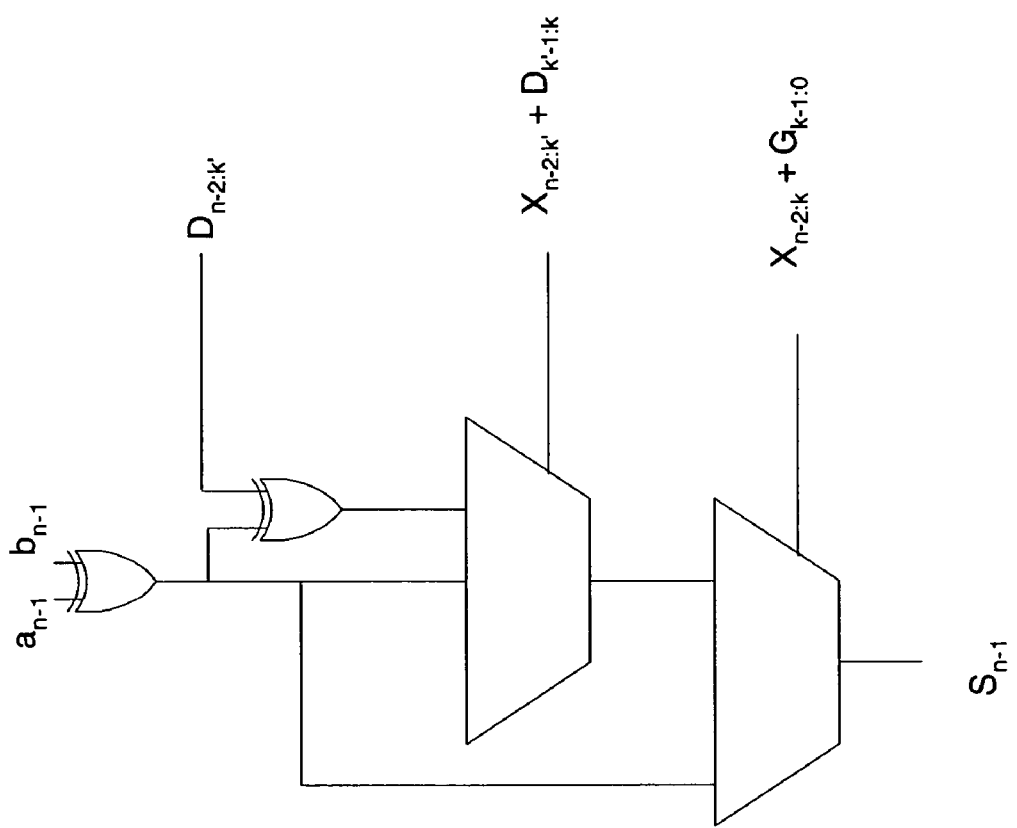
FIG. 8c shows a logic circuit in which the factorisation $D_{n-2:k}[X_{n-2:k}+D_{k'-1:k}][X_{n-2:k}+D_{k-1:0}]$ is used to allow an XOR gate to be moved off the critical path.

This method can be applied to the invention when G is produced as a combination of more than two functions, by using more than one multiplexer as illustrated in FIG. 8c.

$$S_{n-1}=((a_{n-1}\oplus b_{n-1}\oplus D_{n-2:k'})[X_{n-2:k'}+D_{k'-1:k}]+$$
$$(a_{n-1}\oplus b_{n-1})[X_{n-2:k'}+D_{k'-1:k}]^c)[X_{n-2:k}+G_{k-1:0}]+$$
$$(a_{n-1}\oplus b_{n-1})[X_{n-2:k}+G_{k-1:0}]^c$$

In another embodiment of the invention the inventors have realised that the parallelization of carry generation as disclosed above can be combined with the parallelization provided by the parallel prefix method to determine carries or building blocks in a tree like structure and provide further speed up of carry generation. The inventors have further realized that there are several methods for this combination, the best combination depending on type of technology being used, for example static CMOS and dynamic circuits among others. The best combination will become apparent to those skilled in the art.

This method of combining will now be illustrated.

The parallel prefix method provides the following parallelizations:

$$G_{j:i}=G_{j:k}+P_{j:k}G_{k-1:i}$$

$$D_{j:i}=G_{j:k}+P_{j:k}D_{k-1:i}$$

To implement $G_{n-1:0}$ we can first parallelize using the method disclosed above:

$$G_{n-1:0}=D_{n-1:k}[X_{n-1:k}+G_{k-1:0}]$$

The inventors have observed that since $X_{n-1:k}+G_{k-1:0}$ is an OR of two terms and the parallel prefix method provides a means of parallelizing $G_{k-1:0}$ also as an OR of two terms, it is well known that an OR-OR combination can be reduced to a single OR combination and in many technologies gates with 3 or 4 inputs can be implemented efficiently, the combination of the two methods results in:

$$X_{n-1:k}+G_{k-1:0}=X_{n-1:k}+G_{k-1:k'}+P_{k-1:k'}G_{k'-1:0}$$

The inventors have realized that further parallelization can be achieved by parallelizing $G_{k'-1:0}$ by the method of the current invention to get an AND-AND combination which can be reduced to a single AND combination and the efficiency of larger input gates can be used.

Thus parallelizing $G_{k'-1:0}$ as $$G_{k'-1:0}=D_{k'-1:k''}[X_{k'-1:k''}+G_{k''-1:0}]$$

We arrive at:

$$X_{n-1:k}+G_{k-1:0}=[X_{n-1:k}+G_{k-1:k'}]+$$
$$[P_{k-1:k'}D_{k'-1:k''}][X_{k'-1:k''}+G_{k''-1:0}]$$

Figure 8D:
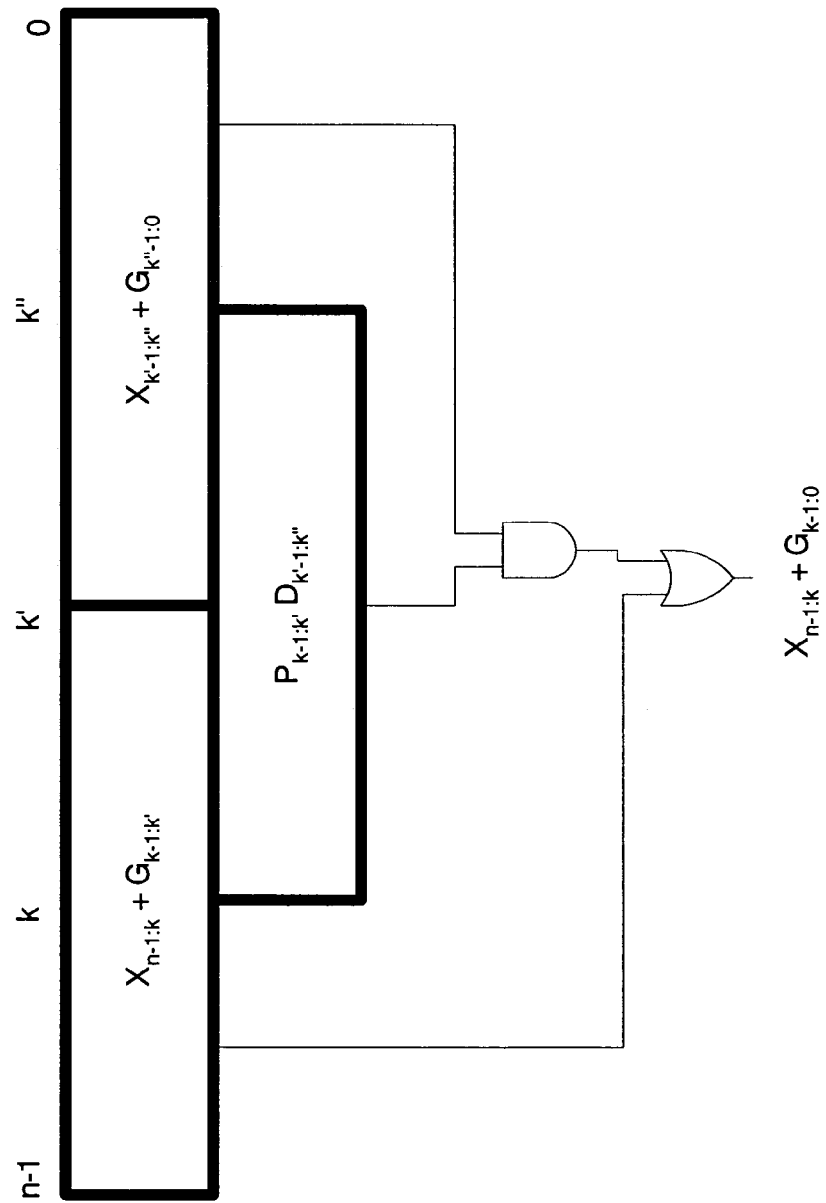
FIG. 8d shows a representation the data structure of a n bit addition, and the derivation of intermediate functions $X_{n-1:k}$, $X_{n-1:k}+G_{k-1:k'}$, $X_{n-1:k}+G_{k-1:k'}$, and $P_{k-1:k}D_{k'-1:k''}$ and $D_{n-1:k}$.
Figure 8D:
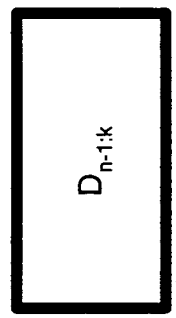

This is illustrate in FIG. 8d.

The benefits of this method will now be illustrated by way of example:

$$G_{7:0}D_{7:6}[B_{7:6}+G_{5:0}]$$

$$B_{7:6}+G_{5:0}=[B_{7:6}+G_{5:4}]+P_{5:4}G_{3:0}=[B_{7:6}+G_{5:4}]+$$
$$[P_{5:4}D_{3:2}][B_{3:2}+G_{1:0}]$$

The building blocks are given by:

$$D_{7:6}=g_7+p_7p_6$$

$$B_{7:6}+G_{5:4}=g_7+g_6+g_5+p_5g_4$$

$$B_{3:2}+G_{1:0}=g_3+g_2+g_1+p_1g_0$$

$$P_{5:4}D_{3:2}=p_5p_4[g_3+p_3p_2]=p_5p_4p_3[g_3+p_2]$$

We now compare this to Ling's method:

$$G_{7:0}=p_7H_{7:0}$$

$$H_{7:0}=H_{7:4}+P_{6:3}H_{3:0}$$

In which the building blocks are given by:

$$P_{6:3}=p_6p_5p_4p_3$$

$$H_{7:4}=g_7+g_6+p_6g_5+p_6p_5g_4$$

$$H_{3:0}=g_3+g_2+p_2g_1+p_2p_1g_0$$

Notice that $B_{3:2}+G_{1:0}$ is simpler than $H_{3:0}$, $B_{7:6}+G_{5:4}$ is simpler than $H_{7:4}$ but $P_{5:4}D_{3:2}$ and $D_{7:6}$ are more complex than $P_{6:3}$ and $p_7$ respectively. But the critical path of the current method is shorter. Moreover, the implementation according to this embodiment of the invention has less fan-out, $p_6$ has a fan-out of three in Ling's method but the maximum fan-out of a signal in the current embodiment is two.

The method disclosed above applies to binary trees. It will now be shown that further speed up of carry generation can be achieved by combining more that two terms. The method and apparatus will be illustrated by way of ternary trees.

We first illustrate Ling's method on ternary trees and point out the shortcomings.

The starting point of this method is to parallelize carry generation as:

$$G_{n-1:0}=p_{n-1}H_{n-1:0}$$

Then $$H_{n-1:0}=g_{n-1}+G_{n-2:0}=g_{n-1}+G_{n-2:k}+P_{n-2:k}G_{k'-1:k''}+P_{n-2:k}P_{k'-1:k''}G_{k''-1:0}$$

By applying $G_{j:i}=p_jH_{j:i}$ to $G_{k'-1:k}$ and $G_{k''-1:0}$ we have $$H_{n-1:0}=H_{n-1:k}+P_{n-2:k'-1}H_{k'-1:k''}+P_{n-2:k}P_{k'-1:k''-1}H_{k''-1:0}$$

This has the form A+BC+DEF

But notice that although H is a little simpler than G this method offers no advantage over the parallel prefix method when three of the H's are combined. Also note that although ternary trees have fewer levels than binary trees, in this method each level is much more complex then the binary tree parallel prefix method. Moreover very high fan-out results. Thus the ternary tree method offers little if any advantage over the prior art binary method.

Figure 8E:
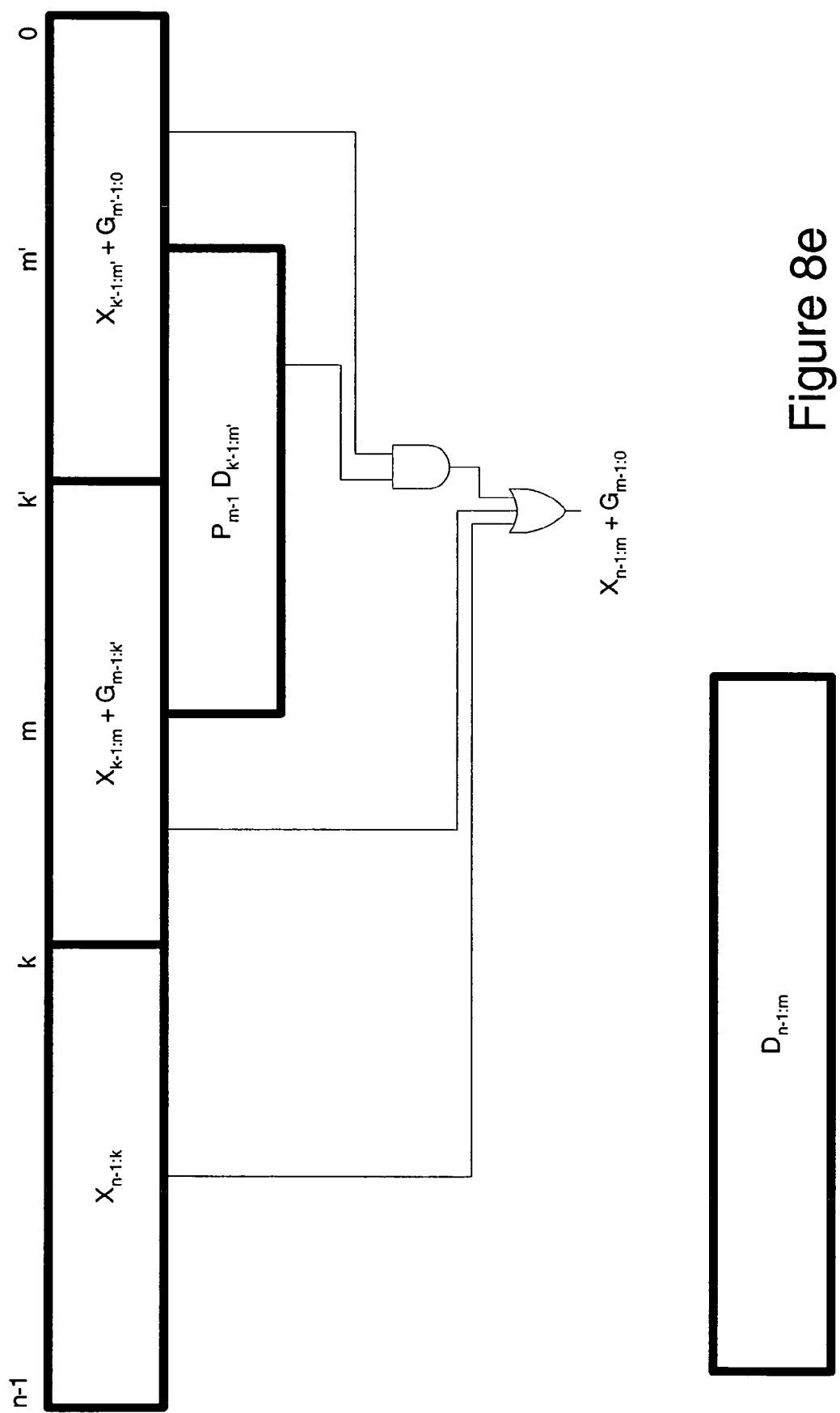
FIG. 8e shows a representation the data structure of a n bit addition, and the derivation of intermediate functions $X_{n-1:k}$, $X_{k-1:m}+G_{m-1:k'}$, $X_{k'-1:m'}+G_{m'-1:0}$, and $P_{m-1:k}D_{k'-1:m'}$ and $D_{n-1:k}$.

Method and apparatus are now disclosed which overcome these shortcomings. We divide the n input bits into three segments, as shown in FIG. 8e:
[n−1,k], [k−1,k'] and [k'−1,0].

By choosing an m lying in the middle segment we have:

$$G_{n-1:0}=D_{n-1:m}[X_{n-1:m}+G_{m-1:0}]$$

We now consider $$X_{n-1:m}+G_{m-1:0}=X_{n-1:m}+G_{m-1:k}+P_{m-1:k}G_{k'-1:0}$$

By choosing an m' lying in the third segment and parallelizing $G_{k'-1:0}$ as $D_{k'-1:m'}[X_{k'-1:m'}+G_{m'-1:0}]$ according to the method of one embodiment of the current invention we have computed $X_{n-1:m+Gm-1:0}$ in terms of three smaller terms of the same form.

$$X_{n-1:m}+G_{m-1:0}=X_{n-1:k}+[X_{k-1:m}+G_{m-1:k}]+[P_{m-1:k}D_{k'-1:m'}][X_{k'-1:m'}+G_{m'-1:0}]$$

Note that this logic combination is a simple $K_2+K_1+Q_0K_0$ compared to $H_2+P_2H_1+P_2P_1H_0$ for Ling's method. This has been achieved at the expense of a more complex D since it ranges from n−1 to m. Those skilled in the art can choose an appropriate m such that the critical path for the two units $D_{n-1:m}$ and $[X_{n-1:m}+G_{m-1:0}]$ is balanced in a manner that results in faster carry generation depending on the technology.

The inventors have observed that this method is very advantageous in Field Programmable Gate Array technology. It is known that in this technology LUTs (Look-Up Tables) (i.e. look-up table based FPGAs) are provided which can compute any logic function, a very common choice for the number of variables which can be input to an LUT is four variables. It is noted that $K_2+K_1+Q_0K_0$ is a function of four variables where as $H_2+P_2H_1+P_2P_1H_0$ is a function of five variables.

Notice that if m had been chosen to lie in the third segment, then $D_{n-1:m}$ would have become more complex still but resulting in simpler:

$$X_{n-1:m}+G_{m-1:0}=X_{n-1:k}+X_{k-1:k'}+[X_{k'-1:m}+G_{m-1:0}]$$

Figure 8F:
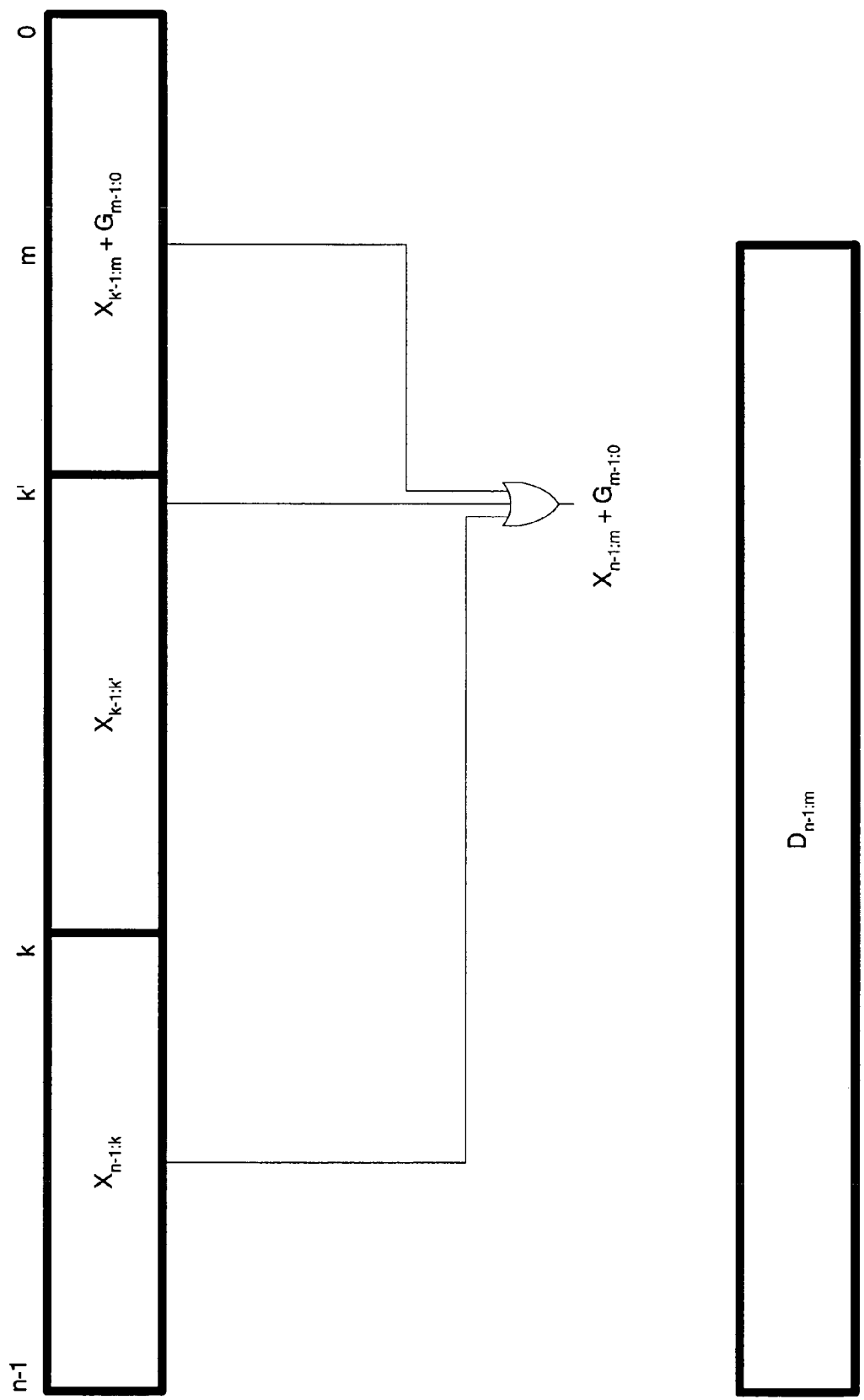
FIG. 8f shows a representation the data structure of a n bit addition, and the derivation of intermediate functions $X_{n-1:k}$, $X_{k-1:k'}$, $X_{k'-1:m}+G_{m-1:0}$ and $D_{n-1:m}$.

This is illustrated in FIG. 8f.

Note that the parallelization of $D_{n-1:m}$ can be carried out in a similar manner. This is illustrated in FIG. 8f.

Figure 9:
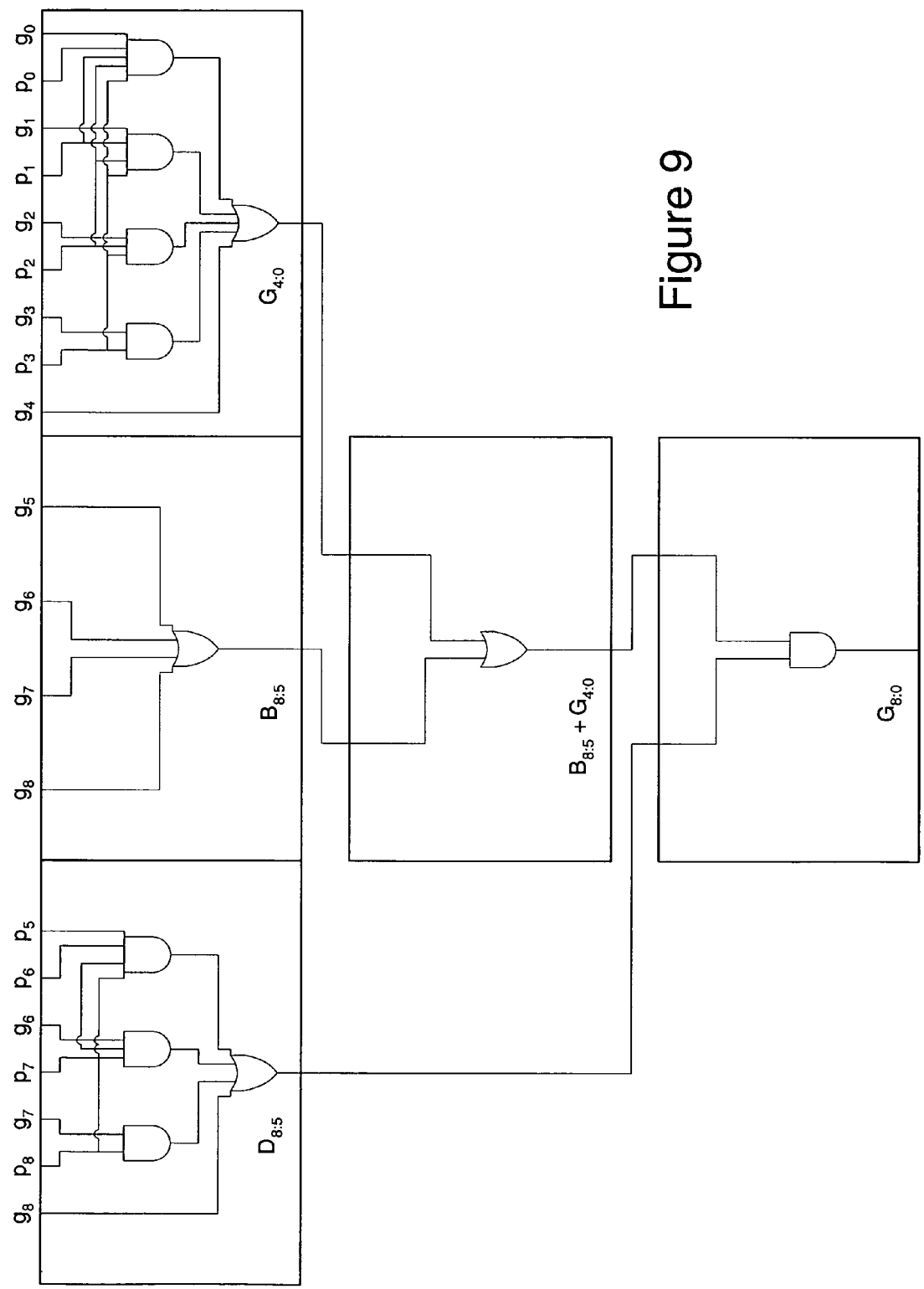
FIG. 9 shows a logic circuit according to an embodiment of the invention in which the functions $D_{8:5}$, $B_{8:5}$, $G_{4:0}$ are implemented using logic gates and combined to produce an output of $G_{8:0}$.
Figure 10:
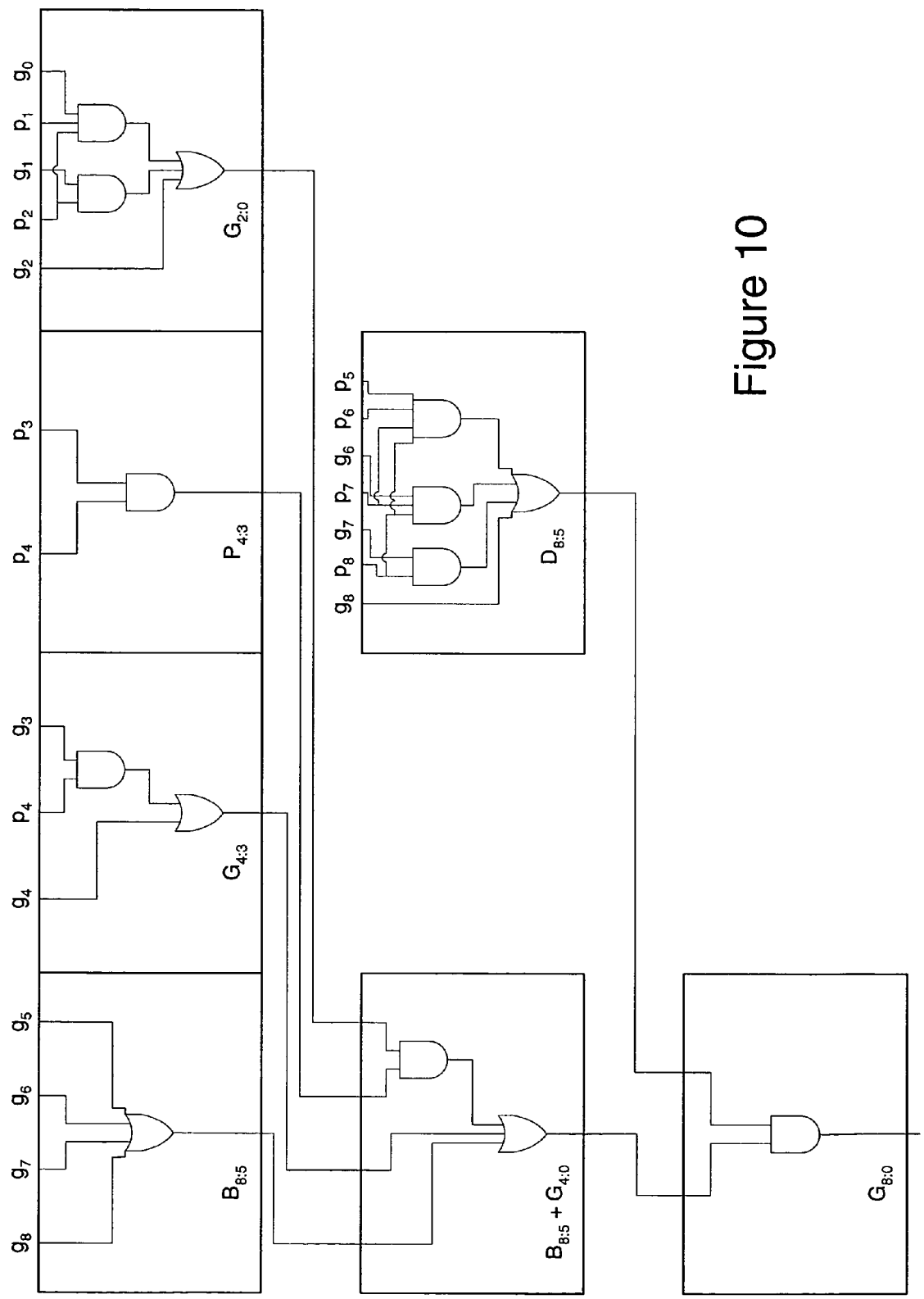
FIG. 10 shows a logic circuit according to an embodiment of the invention, in which the functions $B_{8:5}$, $G_{4:3}$, $P_{4:3}$, and $G_{2:0}$ are implemented using logic gates and combined to produce an output of $G_{8:0}$.
Figure 11:
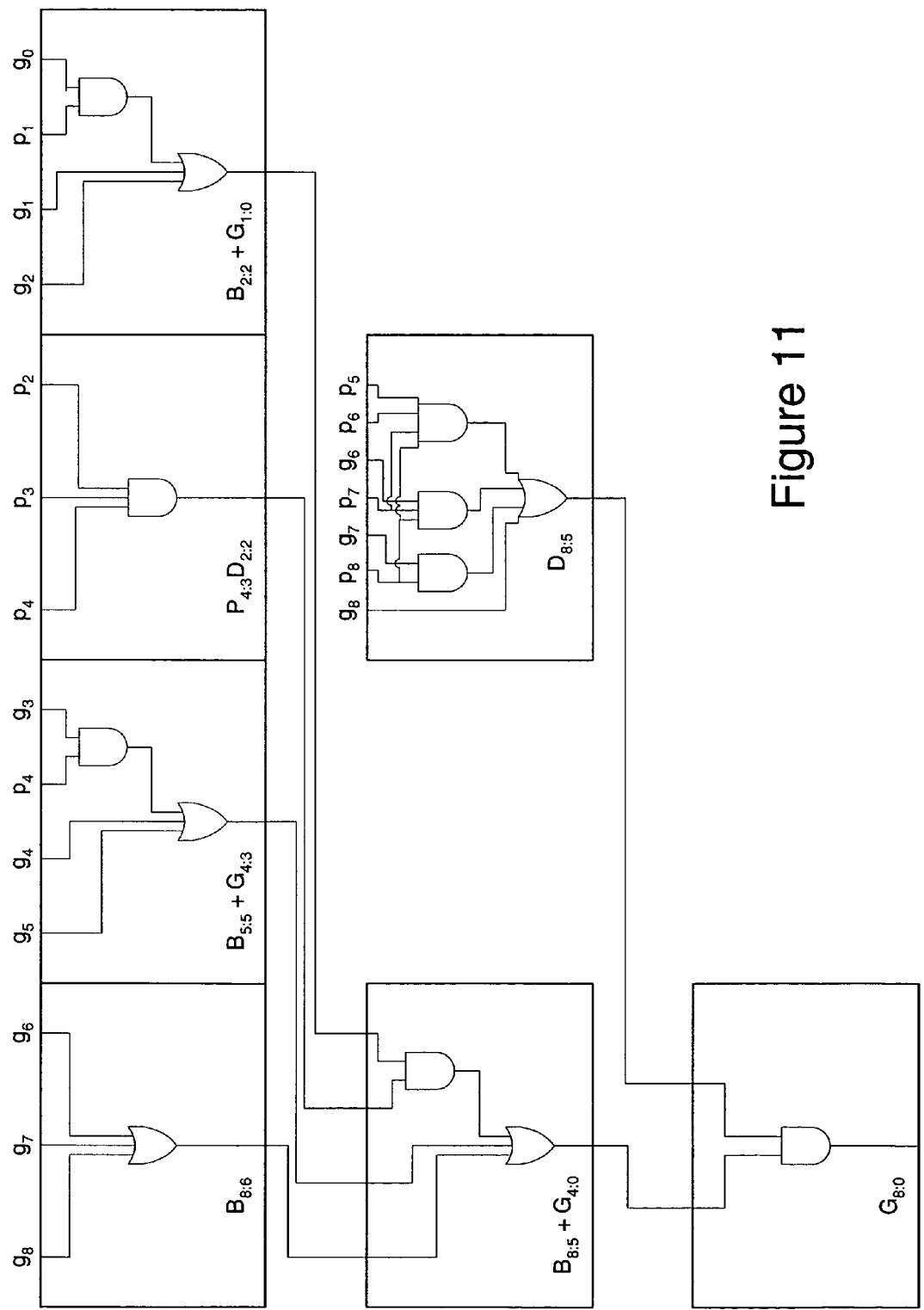
FIG. 11 shows a logic circuit according to an embodiment of the invention, in which the functions $B_{8:6}$, $B_{5:5}+G_{4:3}$, $P_{4:3}D_{2:2}$ and $B_{2:2}+G_{2:0}$ are implemented using logic gates and combined to produce an output of $G_{8:0}$.

FIGS. 9, 10 & 11 show a sequence of steps to derive the ternary tree implementation of the final carry generation in a 9-bit adder.

$$G_{8:0} = D_{8:5}[B_{8:5} + G_{4:0}] \quad \text{(FIG. 9)}$$
$$= D_{8:5}[B_{8:5} + G_{4:3} + P_{4:3}G_{2:0}] \quad \text{(FIG. 10)}$$
$$= D_{8:5}[B_{8:6} + [B_{5:5} + G_{4:3}] + P_{4:3}D_{2:2}[B_{2:2} + G_{1:0}]] \quad \text{(FIG. 11)}$$

Figure 12:
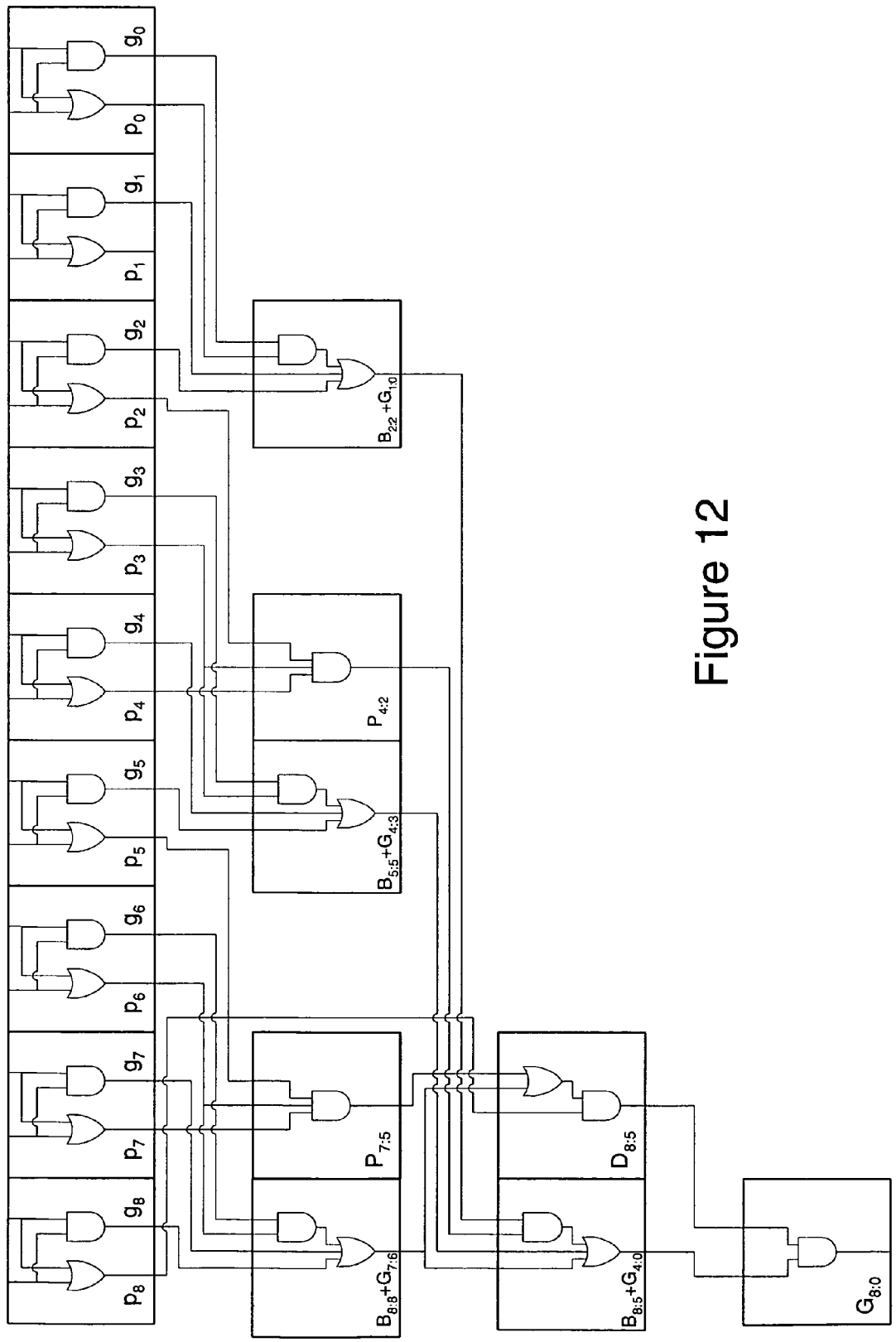
FIG. 12 shows a ternary tree implementation of a final carry generator on a 9-bit adder, in which the term $D_{8:5}$ is generated using already pre-formed building blocks.

The inventors have observed that logic can be shared in the implementations of $D_{n-1:m}$ and $[X_{n-1:m}+G_{m-1:0}]$. This is now illustrated by way of example.

$$D_{8:5} = G_{8:6} + P_{8:5}$$
$$= p_8[B_{8:8} + G_{7:6} + P_{7:5}]$$

and $B_{8:8}+G_{7:6}$ is a suitable $X_{8:6}$ which can replace $B_{8:6}$ in the above parallelization of $G_{8:0}$. This sharing of logic allows for the reduction of silicon area. The complete parallelization of $G_{8:0}$ according to the invention is shown in FIG. 12.

We have thus far disclosed how a term of the form $X_{n-1:m+Gm-1:0}$ can be constructed out of terms over a smaller range, for example in the ternary tree method.

$$X_{n-1:m}+G_{m-1:0}=X_{n-1:k}+[X_{k-1:m}+G_{m-1:k}]+[P_{m-1:k'}D_{k'-1:m'}+G_{m'-1:0}]$$

Note that each of the terms $X_{n-1:k}$, $X_{k-1:m}+G_{m-1:k}$, $X_{k'-1:m'}+G_{m'-1:0}$ can be constructed in the same manner from terms over even smaller ranges. We have disclosed a recursive method for forming X+G over a range in terms of X+G over a smaller range in a tree structure. However this involves the PD term. A method is now disclosed for forming the PD term over a range in terms of X+G and PD terms over a smaller range.

Before illustrating this method we fix some notation:

By underlining a logic unit we mean the non-underlined logic unit but with complemented inputs.

The inventors have observed the following relationships between $G_{j:i}$ and $D_{j:i}$.

$$G_{j:i}=\underline{D_{j:i}}^c$$

$$G_{j:i}^c=\underline{D_{j:i}}$$

$$\underline{G_{j:i}}^c=D_{j:i}$$

$$\underline{G_{j:i}}=D_{j:i}^c$$

Also it is easy to see that $$P_{j:i}=\underline{B_{j:i}}^c$$

$$P_{j:i}^c=\underline{B_{j:i}}$$

$P_{j:i}{}^c = B_{j:i}$ $P_{j:i} = B_{j:i}{}^c$

Thus $$P_{n-1:m}D_{m-1:0} = [B_{n-1:m} + G_{m-1:0}]^c$$
$$= (B_{n-1:k} + [B_{k-1:m} + G_{m-1:k'}] +$$
$$[P_{m-1:k'}D_{k'-1:m'}][B_{k'-1:m'} + G_{m'-1:0}])^c$$
$$= B_{n-1:k}^c[B_{k-1:m} + G_{m-1:k'}]^c([P_{m-1:k'}D_{k'-1:m'}]^c +$$
$$[B_{k'-1:m'} + G_{m'-1:0}]^c)$$
$$= P_{n-1:k}[P_{k-1:m}D_{m-1:k'}]([B_{m-1:k'} + G_{k'-1:m'}] +$$
$$[P_{k'-1:m'}D_{m'-1:0}])$$

Figure 13:
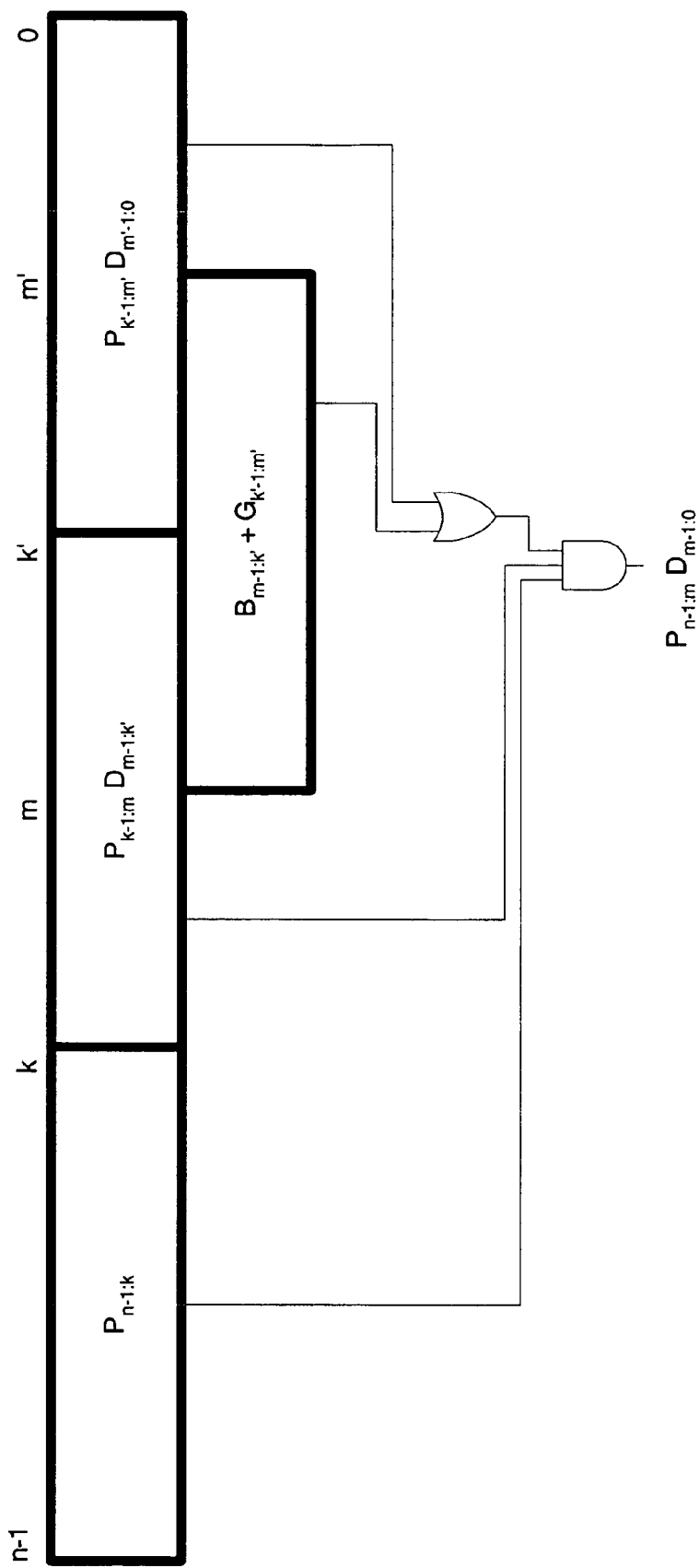
FIG. 13 shows a representation of the data structure of a n bit addition, and the derivation of intermediate functions $P_{n-1:k}$, $P_{k-1:m}D_{m-1:k'}$, $P_{k'-1:m}D_{m'-1:0}$, $B_{m-1:k}+G_{k-1:m'}$ and $D_{n-1:m}$.
Figure 14A:
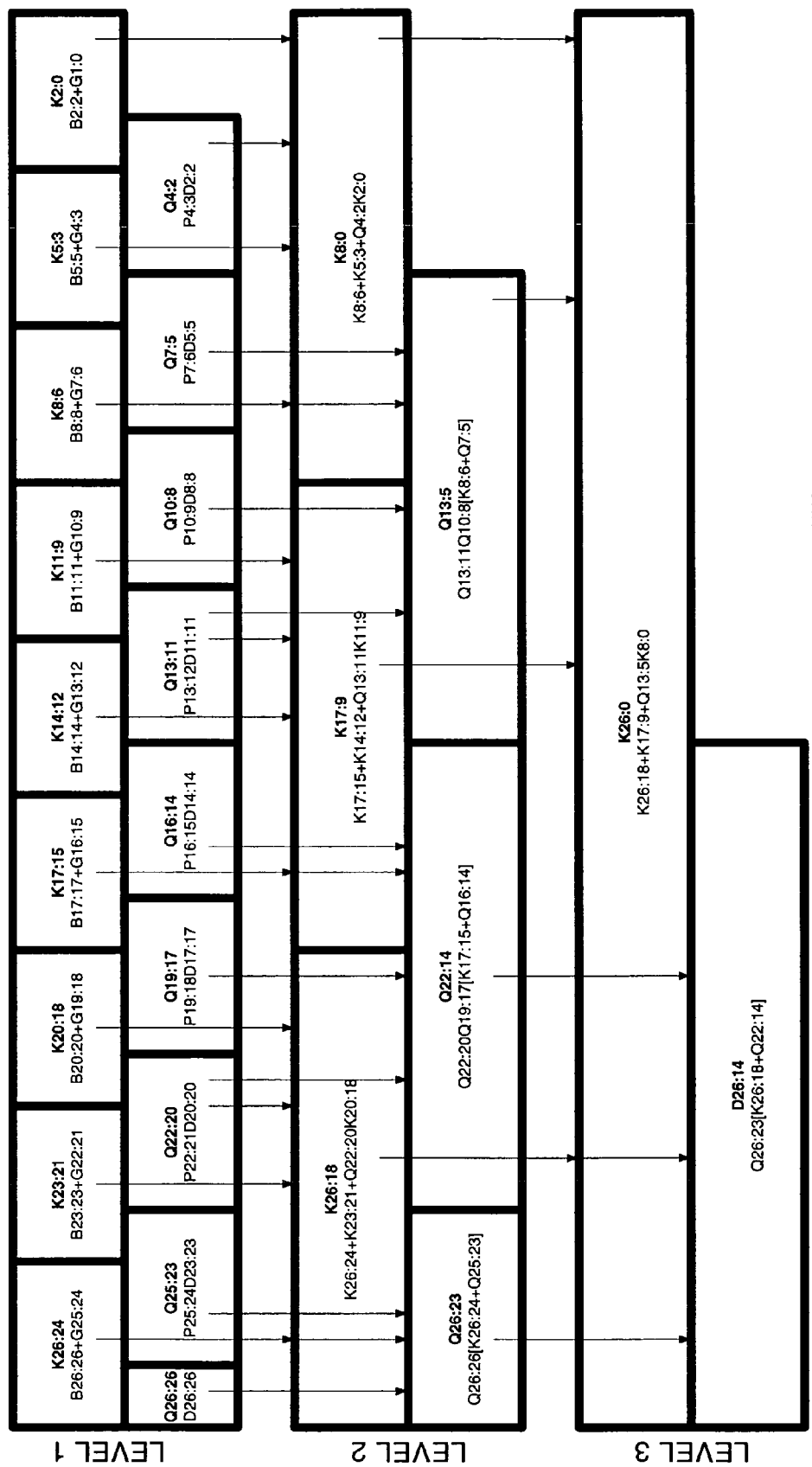
FIG. 14a shows a representation of the structure of functions calculated at different levels of an adder according to an embodiment of the invention.
Figure 14B:
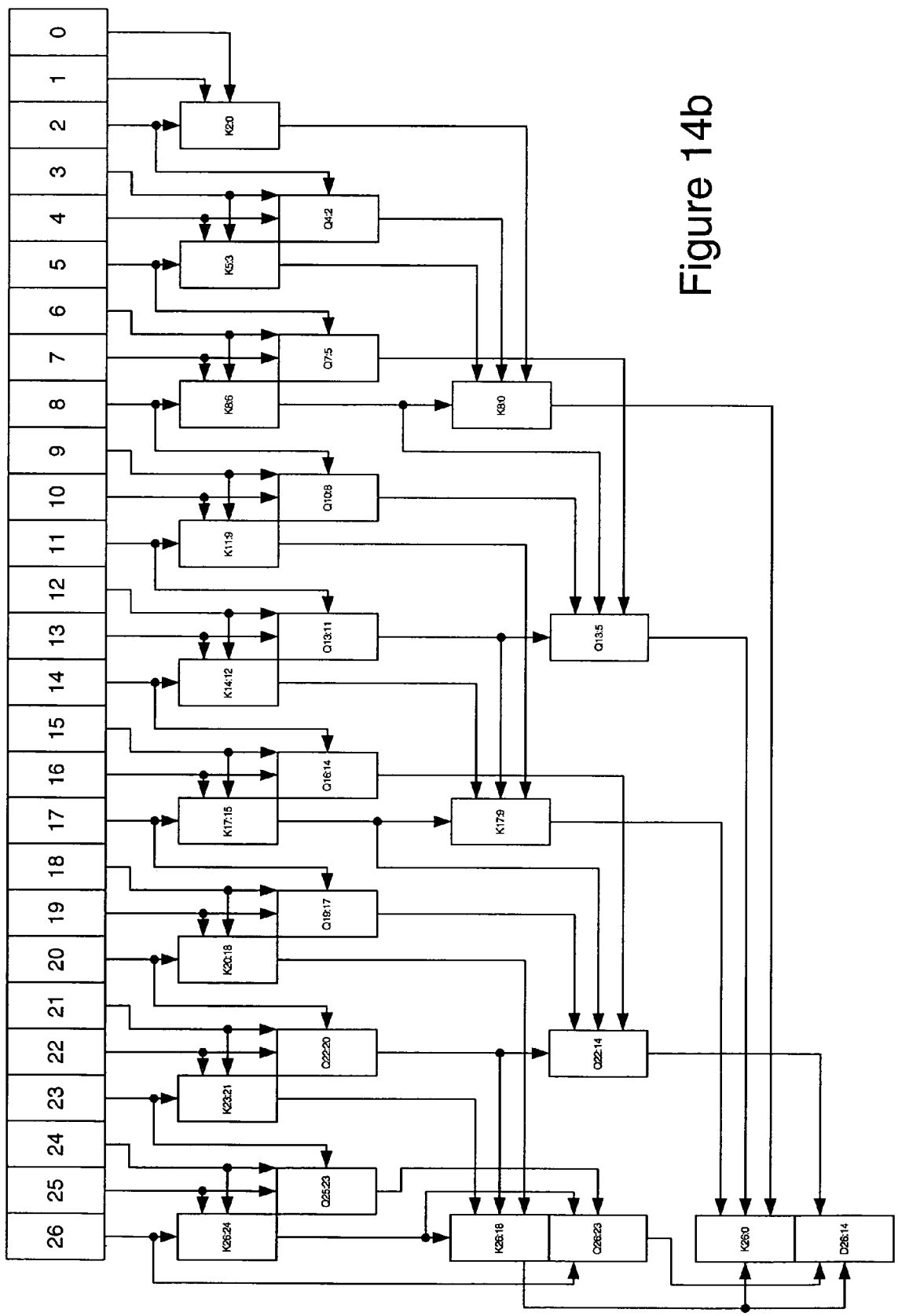
FIG. 14b shows a representation of the structure of functions calculated at different levels of an adder according to an embodiment of the invention.
Figure 14C:
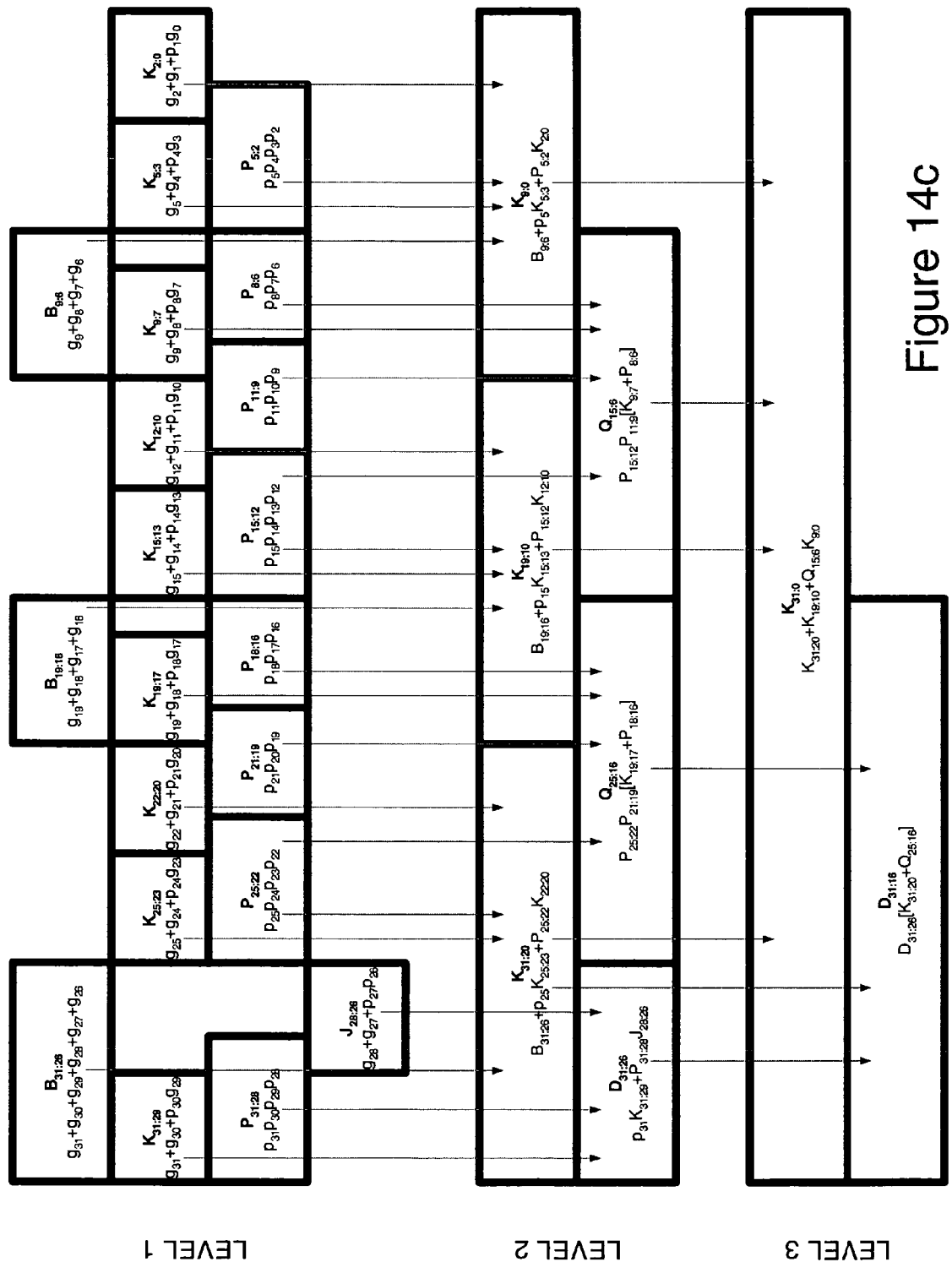
FIG. 14c shows a representation of the structure of functions calculated at different levels of an adder according to an embodiment of the invention.
Figure 14D:
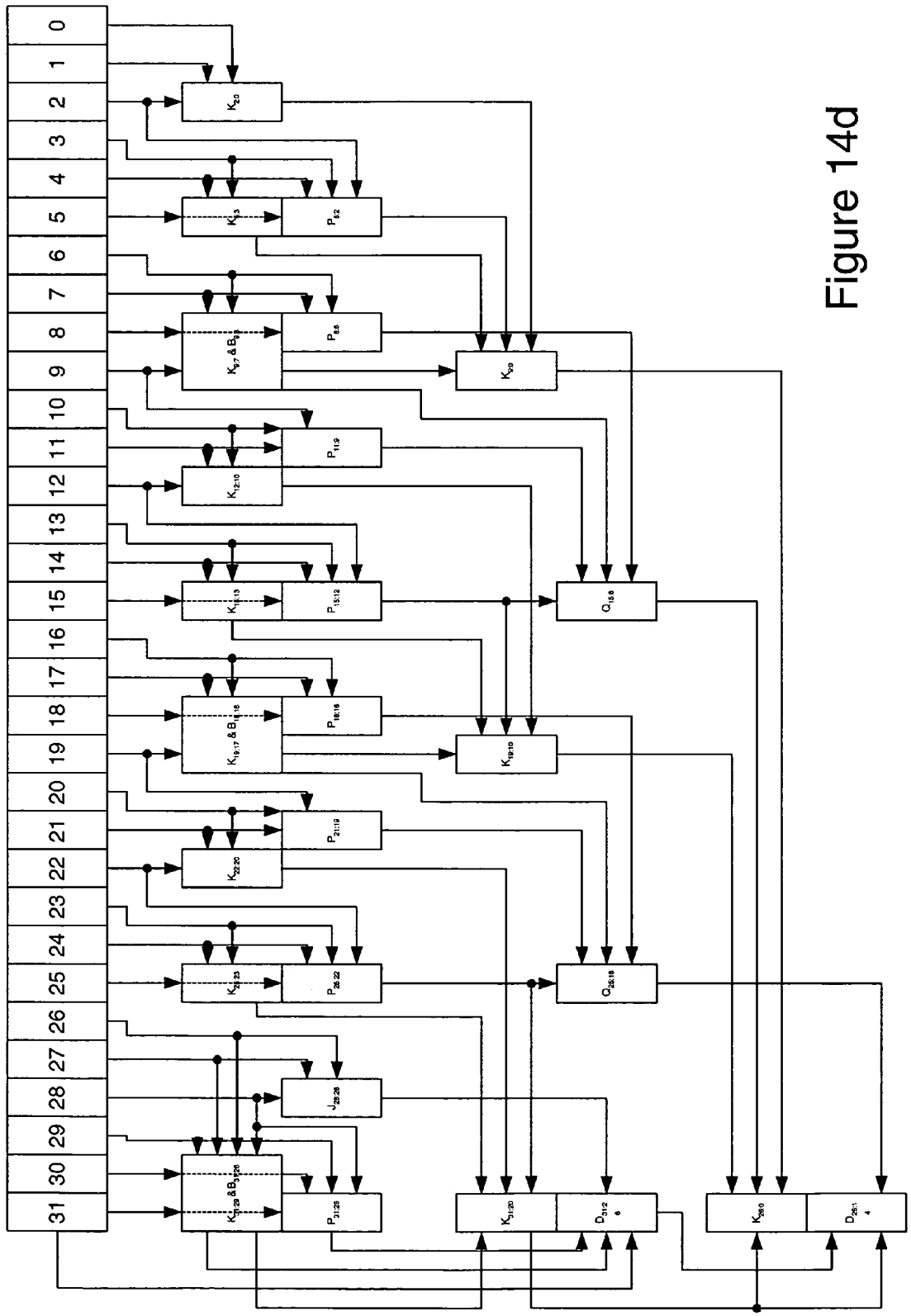
FIG. 14d shows a representation of the structure of functions calculated at different levels of an adder according to an embodiment of the invention.

Note that this logic combination is a simple $Q_2Q_1(K_0+Q_0)$. The process is illustrated in FIG. 13. We have now disclosed a method and apparatus for recursively constructing X+G and PD in a tree structure. FIG. 14a shows the tree structure for the carry out of a 27-bit adder. FIG. 14b shows the tree structure for the carry out of a 27-bit adder in a form from which those knowledgeable in the art can derive a silicon layout of an adder. FIG. 14c shows the tree structure for the carry out of a 32-bit adder according to the present invention. FIG. 14d shows the tree structure for the carry out of a 32-bit adder to aid the layout process.

The inventors have observed that this method is very advantageous in Field Programmable Gate Array technology. It is known that in this technology LUTs are provided which can compute any logic function, a very common choice for the number of variables which can be input to an LUT is four variables. It is noted that $Q_2Q_1(K_0+Q_0)$ is a function of four variables.

The inventors have observed that this method can be applied to higher order trees such as quaternary, quintic and so forth. The quaternary method will now be illustrated.

We divide the n input bits into three segments:
[n−1,k], [k−1,k'], [k'−1,k''] and [k''−1,0]. By choosing a suitable m in the second segment we can parallelize $G_{n-1:0}$ as $$G_{n-1:0}=D_{n-1:m}[K_{n-1:m}+G_{m-1:0}]$$

We now construct $X_{n-1:m}+G_{m-1:0}$ out of four smaller segments. Appropriate m' and m'' are chosen in the third and fourth segments respectively. The $G_{m-1:0}$ is parallelized according to the parallel prefix method.

$$X_{n-1:m}+G_{m-1:0}=X_{n-1:m}+G_{m-1:k}+P_{m-1:k}G_{k'-1:k''}+P_{m-1:k}P_{k'-1:k''}G_{k''-1:0}$$

The terms $G_{k'-1:k''}$ and $G_{k''-1:0}$ are now parallelized according to the method of the current invention.

$$X_{n-1:m}+G_{m-1:0}=X_{n-1:m}+[X_{k-1:m}+G_{m-1:k}]+$$
$$P_{m-1:k}D_{k'-1:m'}[X_{k'-1:m'}+G_{m'-1:k''}]+$$
$$P_{m-1:k}P_{k'-1:k''}D_{k''-1:m''}[X_{k''-1:m''}+G_{m''-1:0}]$$

Figure 15:
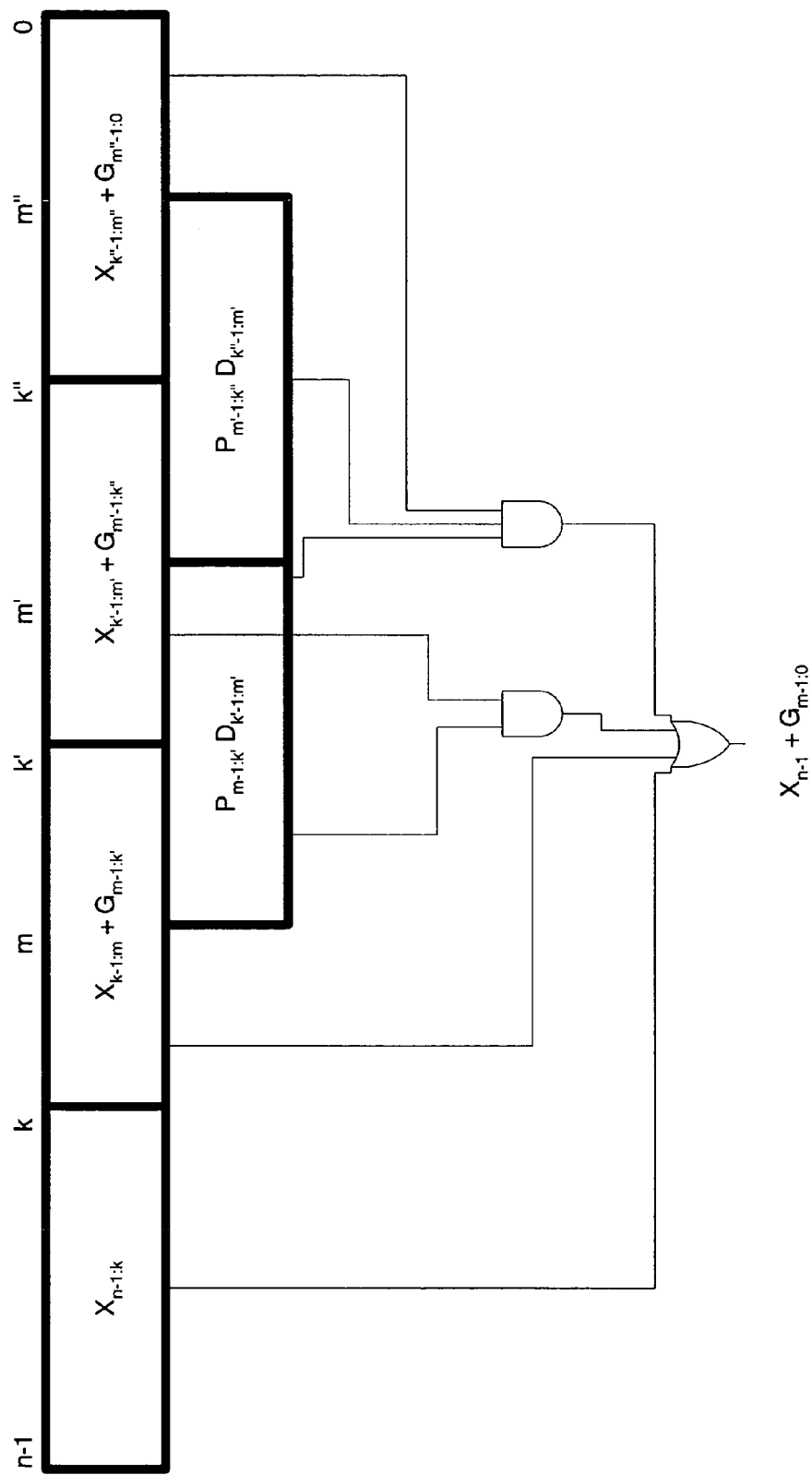
FIG. 15 shows a representation the data structure of a n bit addition, and the derivation of intermediate functions $X_{n-1:k}$, $X_{k-1:m}+G_{m-1:k'}$, $X_{k'-1:m'}+G_{m'-1:k''}$, $X_{k''-1:m''}+G_{m''-1:0}$, $P_{m-1:k'}D_{k'-1:m'}$, $P_{m'-1:k''}D_{k''-1:m'}$ and $D_{n-1:m}$.
Figure 15:
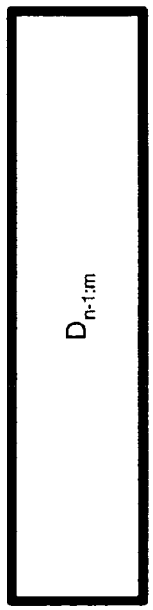

The inventors have further observed that $P_{m-1:k'}$ can be replaced by $P_{m-1:k}D_{k'-1:m'}$, thus allowing for sharing of logic and so reducing area. This is illustrated in FIG. 15.

The method of constructing PD in a quaternary tree can be derived as before $$P_{n-1:m}D_{m-1:0}=P_{n-1:k}[P_{k-1:m}D_{m-1:k'}][[B_{m-1:k'}+G_{k'-1:m'}]+[P_{k'-1:m}D_{m'-1:k''}]][[B_{m-1:k'}+[B_{k'-1:k''}+G_{k''-1:m''}][P_{k''-1:m''}D_{m''-1:0}]]$$

Figure 16:
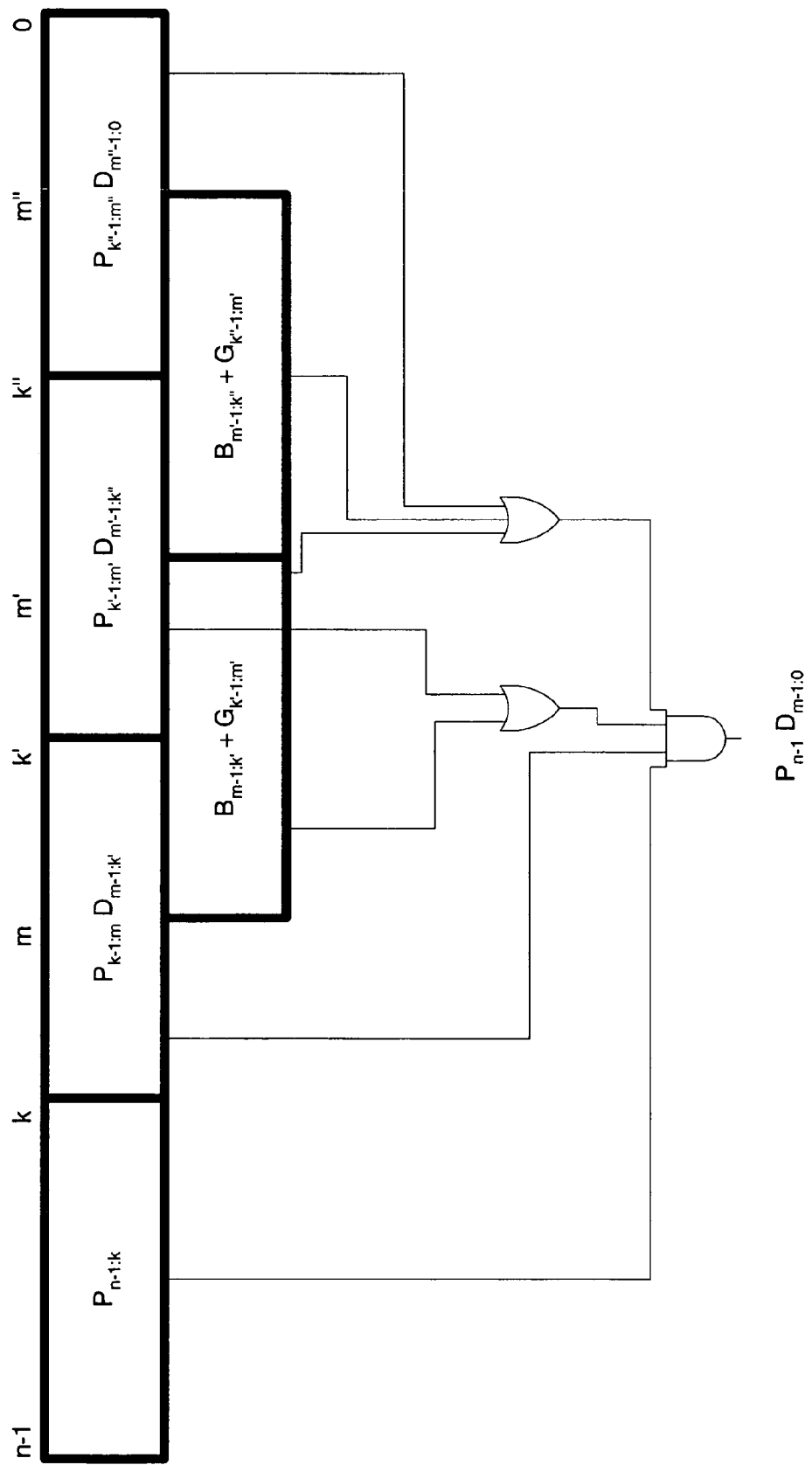
FIG. 16 shows a representation the data structure of a n bit addition, and the derivation of intermediate functions $P_{n-1:k}$, $P_{k-1:m}D_{m-1:k'}$, $P_{k'-1:m}D_{m'-1:k''}$, $P_{k''-1:m'}D_{m''-1:0}$, $B_{m-1:k}+G_{k'-1:m'}$ and $B_{m'-1:k''}+G_{k''-1:m'}$.

This is illustrated in FIG. 16 and has the form $Q_3Q_2[K_2+Q_1][K_2+K_1+Q_0]$

As with the ternary method, m can be chosen in different segments. The further to the least significant segment results in a less complex K=X+G but a more complex D. This aspect of the invention will now be illustrated. If for the quaternary method we choose m to lie in the third segment then:

$$X_{n-1:m}+G_{m-1:0}=X_{n-1:k}+X_{k-1:k'}+[X_{k'-1:m}+G_{m-1:k''}]+[P_{m-1:k'}D_{k''-1:m'}][X_{k''-1:m'}+G_{m'-1:0}]$$

Figure 17:
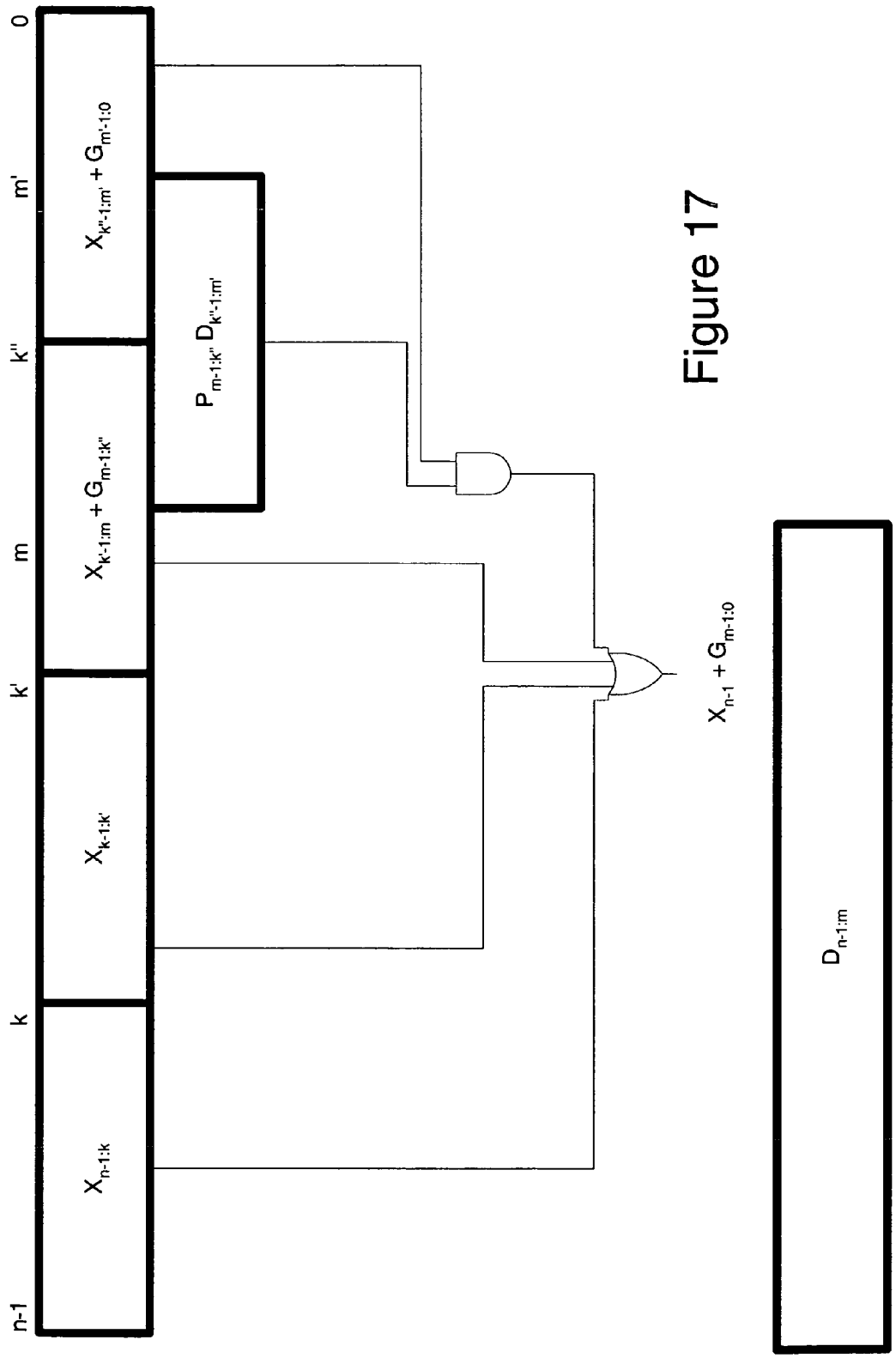
FIG. 17 shows a representation the data structure of a n bit addition, and the derivation of intermediate functions $X_{n-1:k}$, $X_{k-1:k'}$, $X_{k'-1:m}+G_{m-1:k''}$, $X_{k''-1:m'}+G_{m'-1:0}$, $P_{m-1:k''}D_{k''-1:m'}$, and $D_{n-1:m}$.
Figure 18:
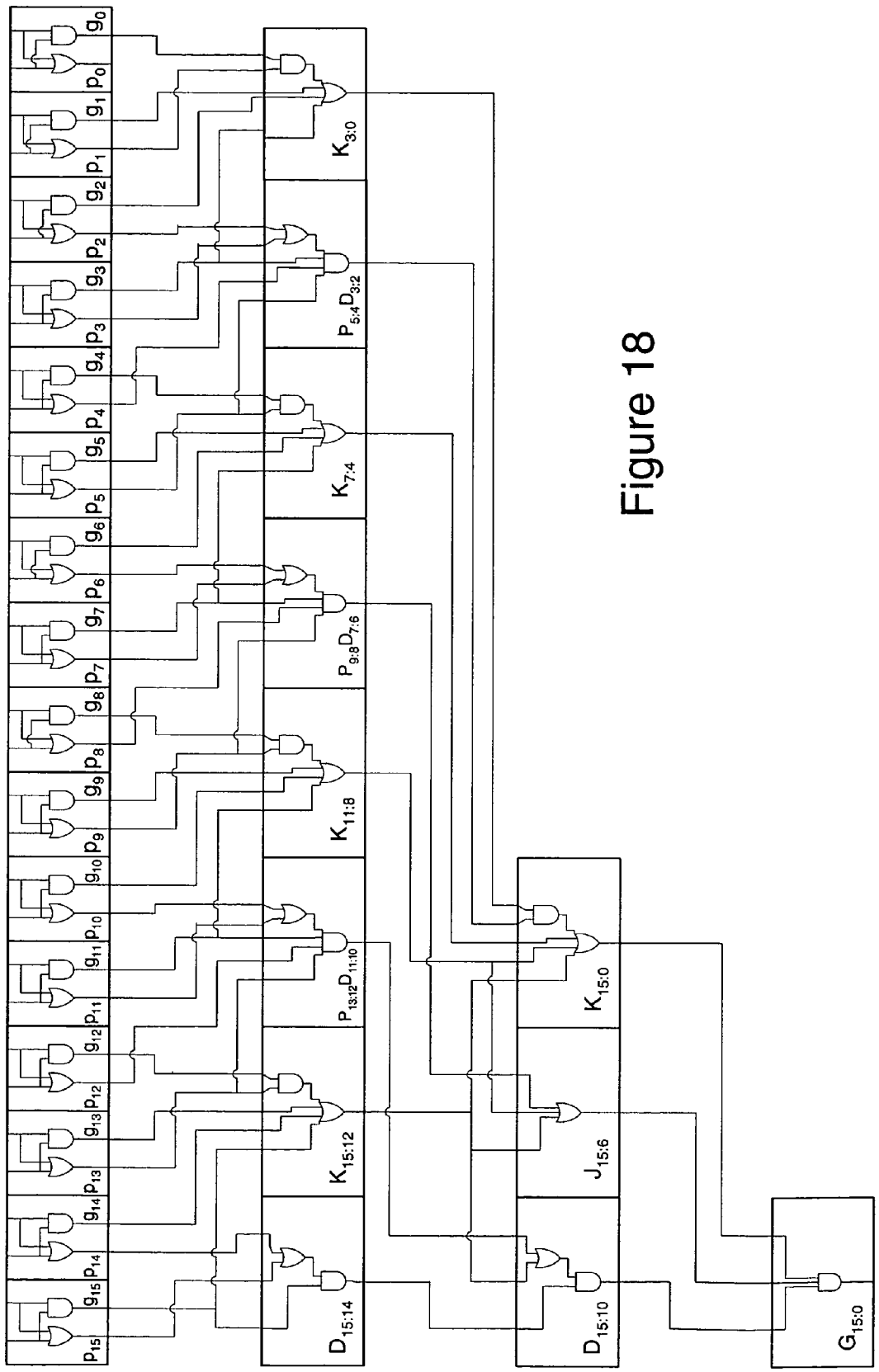
FIG. 18 shows a logic circuit according to an embodiment of the invention, for a 16 bit adder.

This is illustrated in FIG. 17 and has the form $K_3+K_2+K_1+Q_1K_0$. Notice that a PD term can also be constructed having the form $Q_3Q_2Q_1[K_1+Q_0]$ FIG. 18 shows a quaternary tree implementation of the final carry generation in a 16-bit adder. This example in particular illustrates that the final Generate function is AND of at least three terms and the first level is not Ling.

$$G_{15:0}=D_{15:6}K_{15:0}=D_{15:10}J_{15:6}K_{15:0}$$

The building blocks of the construction will now be considered.

It has been decided in this example that the sixteen bits be divided into 4 groups and it is decided that the maximum complexity of the functions at the first level should be $K_2+K_1+K_0+Q_1K_0$.

$$K_{3:0}=g_3+g_2+g_1+p_1g_0$$

$$K_{7:4}=G_7+g_6+g_5+p_5g_4$$

$$K_{11:8}=g_{11}+g_{10}+g_9+p_9g_8$$

$$K_{15:12}=g_{15}+g_{14}+g_{13}+p_{13}g_{12}$$

$$K_{15:0}=K_{15:12}+K_{11:8}+K_{7:4}'[P_{5:4}D_{3:2}]K_{3:0}$$

Note $K_{15:0}$ has the form $K_2+K_1+K_0+Q_1K_0$ $$P_{5:4}D_{3:2}=p_5p_4p_3[g_3+p_2]$$

Which has the form $Q_2Q_1Q_0[K_1+Q_0]$
We now construct the D term:

$$D_{15:6}=D_{15:10}J_{15:6}$$

$$J_{15:6}=K_{15:12}+K_{11:8}+P_{9:8}D_{7:6}$$

$$P_{9:8}D_{7:6}=p_9p_8p_7[g_7+p_6]$$

We need to construct the new term:

$$D_{15:10}=D_{15:14}[K_{15:12}+P_{13:12}D_{11:10}]$$

$$P_{13:12}D_{11:10}=p_{13}p_{12}p_{11}[g_{11}+p_{10}]$$

$$D_{15:14}=p_{15}[g_{15}+p_{14}]$$

The inventors have observed the parallelizations $G=D_2[X_2+G_1]$ and $G=G_2+P_2G_1$ can be used in many different combinations to derive optimal implementations depending on the type of technology e.g. Static CMOS, dynamic circuits etc.

The following 16-bit example shows a different logical combination, which is suitable for dynamic circuit techniques. It is known that in dynamic circuit implementations wide OR gates can be implemented efficiently but wide AND gates are slow in comparison. The inventors have further observed that the critical path of a 16-bit adder is in forming the $a_{14} \oplus b_{14} \oplus G_{14:0}$. The inventors have further observed that implementation of D results in a faster circuit than G. The inventors have further observed that if inverted primary inputs are available then $$a_{14} \oplus b_{14} \oplus G_{14:0} = a_{14} \oplus b_{14} \oplus \underline{D'_{14:0}} = a_{14} \oplus 'b_{14} \oplus \underline{D_{14:0}}$$

where $\oplus'$ denotes the Exclusive NOR operation. A method is now disclosed for constructing $D_{14:0}$ which is suitable for dynamic circuit techniques.

$$D_{14:0}=D_{14:9}[B_{14:12}+B_{11:9}+D_{8:7}[B_{8:7}+G_{6:5}]+P_{8:6}P_{5:5}D_{4:3}[B_{4:3}+D_{2:0}]]$$

The building blocks for the bracketed terms are:

$$B_{4:3}+D_{2:0}=g_4+g_3+g_2+p_2g_1+p_2p_1p_0$$

$$P_{5:5}D_{4:3}=p_5g_4+p_5p_4p_3$$

$$P_{8:6}=p_8p_7p_6$$

$$B_{8:7}+G_{6:5}=g_8+g_7+g_6+p_6g_5$$

$$D_{8:7}=g_8+p_8p_7$$

$$B_{11:9}=g_{11}+g_{10}+g_9$$

$$B_{14:12}=g_{14}+g_{13}+g_{12}$$

$D_{14:9}$ is derived as follows:

$$D_{14:9}=D_{14:12}[B_{14:12}+D_{11:9}]$$

Having building blocks:

$$B_{14:12}=g_{14}+g_{13}+g_{12}+g_{11}$$

$$D_{11:9}=p_{11}g_{10}+p_{11}p_{10}p_9$$

$$D_{14:12}=g_{14}+p_{14}g_{13}+p_{14}p_{13}p_{12}$$

Thus far we have disclosed method and apparatus for a single carry generation logic unit. Given two n-bit binary numbers $a=a_{n-1} \ldots a_1a_0$ and $b=b_{n-1} \ldots b_1b_0$, their sum is the n+1 bit number given by $s=s_n \ldots s_1s_0$ $$s_n=c_n$$

$$s_i=a_i\oplus b_i\oplus c_i$$

where $c_i$ is the carry into position i. Thus it is required that all the carries be generated. It is required that this be done with the highest speed circuit together with efficient silicon utilization. This will now be illustrated by way of example. We consider a 27-bit adder.

$$G_{26:0}=D_{26:14}K_{26:0}$$

$$K_{26:0}=B_{26:18}+K_{17:9}+[P_{13:9}D_{8:5}]K_{8:0}$$

$$K_{8:0}=B_{8:6}+K_{5:3}+P_{4:2}K_{2:0}$$

$$K_{17:9}=B_{17:15}+K_{14:12}+P_{13:11}K_{11:9}$$

$$K_{26:18}=B_{26:24}+K_{23:21}+P_{22:20}K_{20:18}$$

$$B_{26:18}=B_{26:24}+B_{23:21}+B_{20:18}$$

$$K_{2:0}=g_2+g_1+p_1g_0$$

$$K_{5:3}=g_5+g_4+p_4g_3$$

$$K_{8:6}=g_8+g_7+p_7g_6$$

$$K_{11:9}=g_{11}+g_{10}+p_{10}g_9$$

$$K_{14:12}=g_{14}+g_{13}+p_{13}g_{12}$$

$$K_{17:15}=g_{17}+g_{16}+p_{16}g_{15}$$

$$K_{20:18}=g_{20}+g_{19}+p_{19}g_{18}$$

$$K_{23:21}=g_{23}+g_{22}+p_{22}g_{21}$$

$$K_{26:24}=g_{26}+g_{25}+p_{25}g_{24}$$

$$B_{8:6}=g_8+g_7+g_6$$

$$B_{17:15}=g_{17}+g_{16}+g_{15}$$

$$B_{20:18}=g_{20}+g_{19}+g_{18}$$

$$B_{23:21}=g_{23}+g_{22}+g_{21}$$

$$B_{26:24}=g_{26}+g_{25}+g_{24}$$

$$D_{26:14}=D_{26:23}K_{26:18}+P_{26:18}D_{17:14}$$

$$D_{26:23}=p_{26}K_{26:24}+p_{26}P_{25:23}$$

$$D_{17:14}=p_{17}K_{17:15}+p_{17}P_{16:14}$$

$$P_{13:9}D_{8:5}=[P_{13:11}P_{10:8}][K_{8:6}+P_{7:5}]$$

$$P_{26:18}=P_{26:24}P_{23:21}P_{20:18}$$

$$P_{4:2}=p_4p_3p_2$$

$$P_{7:5}=p_7p_6p_5$$

$$P_{10:8}=p_{10}p_9p_8$$

$$P_{13:11}=p_{13}p_{12}p_{11}$$

$$P_{20:18}=p_{20}p_{19}p_{18}$$

$$P_{22:20}=p_{22}p_{21}p_{20}$$

$$P_{23:21}=p_{23}p_{22}p_{21}$$

$$P_{26:24}=p_{26}p_{25}p_{24}$$

This completes the circuit for $G_{26:0}$. We now present the remaining $G_{i:0}$.

$$G_{25:0}=D_{25:14}K_{25:0}$$

$$K_{25:0}=B_{25:18}+K_{17:9}+[P_{13:9}D_{8:5}]K_{8:0}$$

$$B_{25:18}=B_{25:24}+B_{23:21}+B_{20:18}$$

$$B_{25:24}=g_{25}+g_{24}$$

$$D_{25:14}=D_{25:23}K_{25:18}+P_{25:18}D_{17:14}$$

$$K_{25:18}=B_{25:24}+K_{23:21}+P_{22:20}K_{20:18}$$

$$D_{26:23}=p_{25}B_{25:24}+P_{25:23}$$

$$P_{25:18}=P_{25:24}P_{23:21}P_{20:18}$$

$$P_{25:23}=p_{25}p_{24}p_{23}$$

$$P_{25:24}=p_{25}p_{24}P_{4:2}=p_4p_3p_2$$

$$G_{24:0}=D_{24:14}K_{24:0}$$

$$K_{24:0}=K_{24:18}+K_{17:9}+[P_{13:9}D_{8:5}]K_{8:0}$$

$$K_{24:18}=g_{24}+K_{23:21}+P_{22:20}K_{20:18}$$

$$D_{24:23}K_{24:18}+P_{24:18}D_{17:14}$$

$$D_{24:23}=g_{24}+P_{24:23}$$

$$P_{24:18}=p_{24}P_{23:21}P_{20:18}$$

$$P_{24:23}=p_{24}p_{23}$$

$G_{23:0}=D_{23:14}K_{23:0}$ $K_{23:0}=K_{23:18}+K_{17:9}+[P_{13:9}D_{8:5}]K_{8:0}$ $K_{23:18}=K_{23:21}+P_{22:20}K_{20:18}$ $D_{23:14}=p_{23}K_{23:18}+P_{23:18}D_{17:14}$ $P_{23:18}=P_{23:21}P_{20:18}$ $G_{22:0}=D_{22:14}K_{22:0}$ $K_{22:0}=K_{22:18}+K_{17:9}+[P_{13:9}D_{8:5}]K_{8:0}$ $K_{22:18}=K_{22:21}+P_{22:20}K_{20:18}$ $K_{22:21}=g_{22}+g_{21}$ $D_{22:14}=p_{22}K_{22:18}+P_{22:18}D_{17:14}$ $P_{22:18}=P_{22:21}P_{20:18}$ $P_{22:21}=p_{22}p_{21}$ $G_{21:0}=D_{21:14}K_{21:0}$ $K_{21:0}=K_{21:18}+K_{17:9}+[P_{13:9}D_{8:5}]K_{8:0}$ $K_{21:18}=g_{21}+P_{21:20}K_{20:18}$ $D_{21:14}=p_{21}K_{21:18}+P_{21:18}D_{17:14}$ $P_{21:18}=p_{21}P_{20:18}$ $G_{20:0}=D_{20:14}K_{20:0}$ $K_{20:0}=K_{20:18}+K_{17:9}+[P_{13:9}D_{8:5}]K_{8:0}$ $D_{20:14}=p_{20}K_{20:18}+P_{20:18}D_{17:14}$ $G_{19:0}=D_{19:14}K_{19:0}$ $K_{19:0}=K_{19:18}+K_{17:9}+[P_{13:9}D_{8:5}]K_{8:0}$ $K_{19:18}=g_{19}+g_{18}$ $D_{19:14}=p_{19}K_{19:18}+P_{19:18}D_{17:14}$ $P_{19:18}=p_{19}p_{18}$ $G_{18:0}=D_{18:14}K_{18:0}$ $K_{18:0}=g_{18}+K_{17:9}+[P_{13:9}D_{8:5}]K_{8:0}$ $D_{18:14}=g_{18}+p_{18}D_{17:14}$ $D_{17:0}=D_{17:14}K_{17:0}$ $K_{17:0}=K_{17:9}+[P_{13:9}D_{8:5}]K_{8:0}$ $G_{16:0}=D_{16:14}K_{16:0}$ $K_{16:0}=K_{16:9}+[P_{13:9}D_{8:5}]K_{8:0}$ $K_{16:9}=K_{16:15}+K_{14:12}+P_{13:11}K_{11:9}$ $K_{16:15}=g_{16}+g_{15}$ $D_{16:14}=p_{16}K_{16:15}+P_{16:14}$ $P_{16:14}=p_{16}p_{15}p_{14}$ $G_{15:0}=D_{15:14}K_{15:0}$ $K_{15:0}=K_{15:9}+[P_{13:9}D_{8:5}]K_{8:0}$ $K_{15:9}=g_{15}+K_{14:12}+P_{13:11}K_{11:9}$ $D_{15:14}=g_{15}+p_{15}p_{14}$ $G_{14:0}=p_{14}K_{14:0}$ $K_{14:0}=K_{14:9}+[P_{13:9}D_{8:5}]K_{8:0}$ $K_{14:9}=K_{14:12}+P_{13:11}K_{11:9}$ $G_{13:0}=p_{13}K_{13:0}$ $K_{13:0}=K_{13:9}+[P_{13:9}D_{8:5}]K_{8:0}$ $K_{13:9}=K_{13:12}+P_{13:11}K_{11:9}$ $K_{16:12}=g_{13}+g_{12}$ $G_{12:0}=p_{13}K_{12:0}$ $K_{12:0}=K_{12:9}+[P_{12:9}D_{8:5}]K_{8:0}$ $P_{12:9}D_{8:5}=[P_{12:11}P_{10:8}]/[K_{8:6}+P_{7:5}]$ $K_{12:9}=g_{12}+P_{12:11}K_{11:9}$ $P_{12:11}=p_{12}p_{11}$ $G_{11:0}=p_{11}K_{11:0}$ $K_{11:0}=K_{11:9}+[P_{11:9}D_{8:5}]K_{8:0}$ $P_{11:9}D_{8:5}=[p_{11}P_{10:8}]/[K_{8:6}+P_{7:5}]$ $K_{11:9}=p_{11}K_{11:9}$ $G_{10:0}=p_{10}K_{10:0}$ $K_{10:0}=K_{10:9}+[P_{10:9}D_{8:5}]K_{8:0}$ $P_{10:9}D_{8:5}=P_{10:8}[K_{8:6}+P_{7:5}]$ $K_{10:9}=g_{10}+g_9$ $G_{9:0}=p_9K_{9:0}$ $K_{9:0}=g_9+[p_9D_{8:5}]K_{8:0}$ $p_9D_{8:5}=P_{9:8}[K_{8:6}+P_{7:5}]$ $P_{9:8}=p_9p_8$ $G_{8:0}=D_{8:5}K_{8:0}$ $D_{8:5}=p_8K_{8:6}+p_8P_{7:5}$ $G_{7:0}=D_{7:5}K_{7:0}$ $K_{7:0}=K_{7:6}+K_{5:3}+P_{4:2}K_{2:0}$ $D_{7:5}=K_{7:6}+P_{7:5}$ $K_{7:6}=g_7+g_6$ $G_{6:0}=D_{6:5}K_{6:0}$ $K_{6:0}\rightarrow g_6K_{5:3}+P_{4:2}K_{2:0}$ $D_{6:5}=g_6+P_{6:5}$ $P_{6:5}=p_6p_5$ $G_{5:0} = p_5 K_{5:0}$ $K_{5:0} = K_{5:3} + P_{4:2} K_{2:0}$ $G_{4:0} = G_{4:3} + P_{4:2} K_{2:0}$ $G_{4:3} = g_4 + p_4 g_3$ $G_{3:0} = g_3 + P_{3:2} K_{2:0}$ $P_{3:2} = p_3 p_2$ $G_{2:0} = p_2 K_{2:0}$ $G_{1:0} = g_1 + p_1 g_0$ $G_{0:0} = g_0$ The present invention is not limited to use for addition and subtraction, but may also have other applications. For example, two numbers may be compared by generating the most signifcant carry bit for the difference between the two numbers. It may not be necessary to generate the other carry bits of this subtraction, or to actually perform the subtraction. It may also not be necessary to take all of the least significant bits of the two numbers into account when performing a comparison—the number may, in effect, be rounded up or down before performing a comparison. Thus, it is not essential that a circuit according to the invention should input all of the least significant bits of the two input numbers, in order to generate a carry bit and perform a useful comparison of the numbers.

It is not essential that the two input numbers a and b have the same number of digits. If they do not, then either leading zeros may be added to the smaller number if necessary, or the hardware may be hardwired to set generate functions to zero for the most significant digits which are only present in one of the numbers, and set the propagate functions in the corresponding column to equal the value of the other input number bits.

The above generally describes a logic circuit for generation of a carry or sum bit output by combining two sets of binary inputs, the logic circuit comprises bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits of said binary input; and combining logic for generating the carry or sum bit output by combining outputs of said first and second logic.

Although the present invention has been described with reference to specific embodiments, it will be apparent to a skilled person in the art that modifications lie within the spirit and scope of the present invention. Any documents referred to above are hereby incorporated by reference for any purpose.

The invention claimed is:

1. A logic circuit for generation of a carry bit output by combining two sets of binary inputs, the logic circuit comprising first logic for receiving a plurality of bits of the binary inputs and for generating at least one intermediate output; final logic for receiving at least one intermediate output of the first logic and for generating the carry bit output; wherein said final logic is arranged to generate the carry bit output using a reduced generate function for a group of bits of the binary inputs and at least one intermediate output from said first logic at least one of which is generated as a reduced generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein first logic and/or said final logic is arranged to use a reduced generate function in which the group or sub-group of bits of the binary inputs is partitioned so that said at least one most significant bit comprises at least two most significant bits.

2. A logic circuit for generation of a sum bit output by combining two sets of binary inputs, the logic circuit comprising first logic for receiving a plurality of bits of the binary inputs and for generating at least one intermediate output; final logic for receiving at least one intermediate output of the first logic and for generating the sum bit output; wherein said final logic is arranged to generate the sum bit output using a reduced generate function for a group of bits of the binary inputs and at least one intermediate output from said first logic at least one of which is generated as a reduced generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein first logic and/or said final logic is arranged to use a reduced generate function in which the group or sub-group of bits of the binary inputs is partitioned so that said at least one most significant bit comprises at least two most significant bits.

3. A logic circuit according to claim 1 or claim 2, wherein the final logic includes at least one multiplexer.

4. A logic circuit for generation of a carry bit output by combining two sets of binary inputs, the logic circuit comprising a first level of logic comprising a plurality of logic units, each logic unit for receiving a plurality of bits of the binary inputs and for generating an intermediate output; at least one further level of logic including a final level of logic for receiving at least one intermediate output of at least one previous level of logic and comprising at least one logic unit for receiving at least one intermediate output from at least one logic unit of at least one previous level and for generating an intermediate output; and output logic for generating the carry bit output using at least one intermediate output from the final level of logic; wherein at least one logic unit of at least one level of logic is arranged to generate an intermediate output as a reduced generate function for a group of bits of the binary inputs using at least one intermediate output from at least one higher level at least one of which is generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one level of logic is arranged to generate an intermediate output as a reduced generate function in which the group or sub-group of bits of the binary inputs for said at least one logic unit is partitioned so that said at least one most significant bit comprises at least two most significant bits.

5. A logic circuit according to claim 4, including further logic for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and at least one intermediate output of said final level generated as a reduced generate function for a group of bits.

6. A logic circuit for generation of a sum bit output by combining two sets of binary inputs, the logic circuit comprising a first level of logic comprising a plurality of logic units, each logic unit for receiving a plurality of bits of the binary inputs and for generating an intermediate output; at least one further level of logic including a final level of logic for receiving outputs of at least one previous level of logic and comprising at least one logic unit for receiving at least one intermediate output from at least one logic unit of at least one previous level and for generating an intermediate output; and output logic for generating the sum bit output using at least at least one intermediate output from the final level of logic; wherein at least one logic unit of at least one level of logic is arranged to generate an intermediate output as a reduced generate function for a group of bits of the binary inputs using at least one intermediate output from at least one higher level at least one of which is generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one level of logic is arranged to generate an intermediate output as a reduced generate function in which the group or sub-group of bits of the binary inputs for said at least one logic unit is partitioned so that said at least one most significant bit comprises at least two most significant bits.

7. A logic circuit according to claim 6, wherein the output logic comprises a multiplexer.

8. A logic circuit according to claim 6 or claim 7, including further logic for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and at least one intermediate output of said final level generated as a reduced generate function for a group of bits.

9. A logic circuit for generation of a carry bit output by combining two sets of binary inputs, the logic circuit comprising a first level of logic comprising a plurality of logic units, each logic unit for receiving a plurality of bits of the binary inputs and for generating an intermediate output; at least one further level of logic for receiving outputs of at least one previous level of logic and comprising at least one logic unit for receiving the intermediate outputs from at least one logic unit of the at least one previous level and for generating an intermediate output; a final level of logic for receiving outputs of at least one previous level of logic and comprising at least one logic unit for receiving at least one intermediate output from at least one logic unit of the at least one previous level of logic and for generating the carry bit output; wherein at least one logic unit of at least one of said further levels of logic is arranged to generate an intermediate output as a reduced generate function for a group of bits of the binary inputs using at least one intermediate output from at least one higher level, at least one of said intermediate outputs being generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one of said first or further levels of logic is arranged to generate an intermediate output as a reduced generate function in which the group or sub-group of bits of the binary inputs for said at least one logic unit is partitioned so that said at least one most significant bit comprises at least two most significant bits.

10. A logic circuit for generation of a sum bit output by combining two sets of binary inputs, the logic circuit comprising a first level of logic comprising a plurality of logic units, each logic unit for receiving a plurality of bits of the binary inputs and for generating an intermediate output; at least one further level of logic for receiving at least one intermediate output of at least one previous level of logic and comprising at least one logic unit for receiving at least one intermediate output from at least one logic unit of the at least one previous level and for generating an intermediate output; a final level of logic for receiving at least one intermediate output of at least one previous level of logic and comprising at least one logic unit for receiving at least one intermediate output from at least one logic unit of the at least one previous level of logic and for generating the sum bit output; wherein at least one logic unit of at least one of said further levels of logic is arranged to generate an intermediate output as a reduced generate function for a group of bits of the binary inputs using intermediate outputs from at least one higher level, at least one of said intermediate outputs being generated as a reduced generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of at least one of said first or further levels of logic is arranged to generate an intermediate output as a reduced generate function in which the group or sub-group of bits of the binary inputs for said at least one logic unit is partitioned so that said at least one most significant bit comprises at least two most significant bits.

11. A logic circuit according to claim 10, wherein the final level of logic includes at least one multiplexer.

12. A logic circuit for generation of a carry bit output by combining two sets of binary inputs, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the carry bit output; wherein at least one logic unit of at least one of said first logic is arranged to generate an intermediate output as a reduced generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of said first logic is arranged to generate an intermediate output for receipt by said final logic as a reduced generate function in which the group of bits of the binary inputs for said at least one logic unit is partitioned so that said at least one most significant bit comprises at least two most significant bits.

13. A logic circuit for generation of a sum bit output by combining two sets of binary inputs, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the sum bit output; wherein at least one logic unit of at least one of said first logic is arranged to generate an intermediate output as a reduced generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; and wherein at least one of said at least one logic unit of said first logic is arranged to generate an intermediate output for receipt by said final logic as a reduced generate function in which the group of bits of the binary inputs for said at least one logic unit is partitioned so that said at least one most significant bit comprises at least two most significant bits.

14. A logic circuit according to claim 13, wherein the final logic includes at least one multiplexer.

15. A logic circuit for generation of a carry bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits of said binary input; and combining logic for generating the carry bit output by combining outputs of said first and second logic.

16. A logic circuit for generation of a sum bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits of said binary input; and combining logic for generating the sum bit output by combining outputs of said first and second logic.

17. A logic circuit according to claim 16, wherein the combining logic includes at least one multiplexer.

18. A logic circuit according to claim 16 or claim 17, wherein the first logic comprises a plurality of first logic modules each for receiving bit level carry generate and propagate function bits for subgroups of the first group of at least three most significant bits of the binary inputs to generate a high output if a carry is generated for the subgroup of most significant bits of the binary input or if the carry propagate function bits for the subgroup of most significant bits are all high.

19. A logic circuit according to claim 18, wherein the second logic comprises a plurality of logic modules for receiving subgroups of the second group of least significant bits of the binary input to generate a carry for each of the subgroups and combining logic for combining the generated carrys.

20. A logic circuit according to any one of claims 16 to 17, wherein the second logic comprises a plurality of logic modules for receiving subgroups of the second group of least significant bits of the binary input to generate a carry for each of the subgroups and combining logic for combining the generated carrys.

21. A logic circuit for generation of a carry bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits of said binary inputs and a function B which is high if a carry is generated at any bit position in the most significant bits; and combining logic for generating the carry bit output by combining outputs of said first and second logic.

22. A binary adder circuit comprising the logic circuit according to any one of claims 1, 4, 5, 9, 12, 15, or 21, including addition logic comprising exclusive OR logic and a multiplexer for determining an addition result including said carry bit for said binary inputs.

23. A comparison logic circuit for comparing two binary inputs comprising the logic circuit according to any one of claims 1, 4, 5, 9, 12, 15, or 21, including logic for using said carry bit to indicate whether one binary input represents a binary number less than or more than another binary number represented by the other binary input.

24. A logic circuit for generation of a sum bit output by combining two sets of binary inputs, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits of said binary inputs and a function B which is high if a carry is generated at any bit position in the most significant bits; and combining logic for generating the sum bit output by combining outputs of said first and second logic.

25. A logic circuit according to claim 24, wherein the combining logic includes at least one multiplexer.

26. A logic circuit for generation of a carry or sum bit output by adding two sets of binary inputs plus one, the logic circuit comprising first logic for receiving a plurality of bits of the binary inputs and for generating at least one intermediate output; final logic for receiving at least one intermediate output of the first logic and for generating the carry or sum bit output; wherein said final logic is arranged to generate the carry or sum bit output using a reduced modified generate function for a group of bits of the binary inputs and at least one intermediate output from said first logic at least one of which is generated as a reduced generate function or a reduced modified generate function of a sub-group of bits of the binary inputs; wherein a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; wherein said final logic is arranged to use a reduced modified generate function in which the group or sub-group of bits of the binary inputs is partitioned so that said at least one most significant bit comprises at least two most significant bits and/or said first logic is arranged to use a reduced generate function or a reduced modified generate function in which the group or sub-group of bits of the binary inputs is partitioned so that said at least one most significant bit comprises at least two most significant bits.

27. A logic circuit according to claim 26, wherein said reduced modified generate function uses a hyper propagate function for the group of bits, the hyper propagate function comprises a logical AND combination of the modified generate function for at least one least significant bit of the group of bits and a propagate function for at least one most significant bit of the group of bits, and the propagate function is high if a carry into a group of bits would be propagated out of the group of bits.

28. A logic circuit according to claim 27, wherein a hyper propagate function for a group of bits uses a hyper propagate function for a sub-group of bits.

29. A logic circuit for generation of a carry or sum bit output by adding two sets of binary inputs plus one, the logic circuit comprising a first level of logic comprising a plurality of logic units, each logic unit for receiving a plurality of bits of the binary inputs and for generating an intermediate output; at least one further level of logic including a final level of logic for receiving at least one intermediate output of at least one previous level of logic and comprising at least one logic unit for receiving at least one intermediate output from at least one logic unit of at least one previous level and for generating an intermediate output; and output logic for generating the carry or sum bit output using at least one intermediate output from the final level of logic; wherein at least one logic unit of at least one level of logic is arranged to generate an intermediate output as a reduced generate function or a for a reduced modified generate function group of bits of the binary inputs using at least one intermediate output from at least one higher level at least one of which is generated as a reduced generate function or reduced modified generate function group of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of at least one level of logic is arranged to generate an intermediate output as a reduced generate function or reduced modified generate function in which the group or sub-group of bits of the binary inputs for said at least one logic unit is partitioned so that said at least one most significant bit comprises at least two most significant bits.

30. A logic circuit according to claim 29, wherein said reduced modified generate function uses a hyper propagate function for the group of bits, the hyper propagate function comprises a logical AND combination of the modified generate function for at least one least significant bit of the group of bits and a propagate function for at least one most significant bit of the group of bits, and the propagate function is high if a carry into a group of bits would be propagated out of the group of bits.

31. A logic circuit according to claim 30, wherein a hyper propagate function for a group of bits uses a hyper propagate function for a sub-group of bits.

32. A logic circuit according to claim 31, including further logic for generating an output for a group of most significant bits of the binary inputs which is high if a carry is generated out of the group or if all of the bit level propagate bits for the group are high, wherein said output logic is arranged to generate the carry bit as a function of the logical AND of the output of said further logic and the intermediate output of said final level generated as a reduced modified generate function for a group of bits.

33. A logic circuit for generation of a carry or sum bit output by adding two sets of binary inputs plus one, the logic circuit comprising a first level of logic comprising a plurality of logic units, each logic unit for receiving a plurality of bits of the binary inputs and for generating an intermediate output; at least one further level of logic for receiving at least one intermediate output of at least one previous level of logic and comprising at least one logic unit for receiving at least one intermediate output from at least one logic unit of the at least one previous level and for generating an intermediate output; a final level of logic for receiving at least one intermediate output of at least one previous level of logic and comprising at least one logic unit for receiving at least one intermediate output from at least one logic unit of the at least one previous level of logic and for generating the carry or sum bit output; wherein at least one logic unit of at least one of said further levels of logic is arranged to generate an intermediate output as a reduced generate function or a reduced modified generate function for a group of bits of the binary inputs using at least one intermediate output from at least one higher level, at least one of said intermediate outputs being generated as a reduced generate function or a reduced modified generate function of a sub-group of bits of the binary inputs; wherein an intermediate output generated as a reduced generate function for a group or sub-group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of at least one of said first or further levels of logic is arranged to generate an intermediate output as a reduced generate function or reduced modified generate function in which the group or sub-group of bits of the binary inputs for said at least one logic unit is partitioned so that said at least one most significant bit comprises at least two most significant bits.

34. A logic circuit according to claim 33, wherein said reduced modified generate function uses a hyper propagate function for the group of bits, the hyper propagate function comprises a logical AND combination of the modified generate function for at least one least significant bit of the group of bits and a propagate function for at least one most significant bit of the group of bits, and the propagate function is high if a carry into a group of bits would be propagated out of the group of bits.

35. A logic circuit according to claim 34, wherein a hyper propagate function for a group of bits uses a hyper propagate function for a sub-group of bits.

36. A logic circuit for generation of a carry or sum bit output by adding two sets of binary inputs plus one, the logic circuit comprising first logic comprising a plurality of logic units, each logic unit for receiving a plurality of bits of the binary inputs and for generating an intermediate output; final logic for receiving at least one intermediate output of the first logic and comprising at least one logic unit for receiving at least one intermediate output from at least one logic unit of the first logic and for generating the carry or sum bit output; wherein at least one logic unit of at least one of said first logic is arranged to generate an intermediate output as a reduced generate function or a reduced modified generate function for a group of bits of the binary inputs; wherein an intermediate output generated as a reduced generate function for a group of bits, partitioned into at least one most significant bit and at least one least significant bit, is the logical OR of a generate function for the least significant bits and a function X for the most significant bits, where the generate function is high if a carry is generated out of the least significant bits and low if not, and X is a function which is high if a carry is generated out of the most significant bits, low if no carry is generated at any bit position in the most significant bits, and in a don't care state if a carry is generated at some bit position in the most significant bits but no carry is generated out of the most significant bits; wherein a reduced modified generate function is the logical OR of a modified generate function for the least significant bits and the function X for the most significant bits, where the modified generate function is high if a carry is generated on adding the least significant bits plus one and low if not; and wherein at least one of said at least one logic unit of said first logic is arranged to generate an intermediate output for receipt by said final logic as a reduced generate function or a reduced modified generate function in which the group of bits of the binary inputs for said at least one logic unit is partitioned so that said at least one most significant bit comprises at least two most significant bits.

37. A logic circuit according to claim 36, wherein said reduced modified generate function uses a hyper propagate function for the group of bits, the hyper propagate function comprises a logical AND combination of the modified generate function for at least one least significant bit of the group of bits and a propagate function for at least one most significant bit of the group of bits, and the propagate function is high if a carry into a group of bits would be propagated out of the group of bits.

38. A logic circuit according to claim 37, wherein a hyper propagate function for a group of bits uses a hyper propagate function for a sub-group of bits.

39. A logic circuit for generation of a carry or sum bit output by adding two sets of binary inputs plus one, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level carry generate and propagate function bits for a first group of at least three most significant bits of said binary inputs to generate a high output if a carry is generated out of the first group of most significant bits of said binary input or if said carry propagate function bits for the most significant bits are all high; second logic for receiving bit level carry generate and propagate function bits for said binary inputs to generate a high output if any of said carry generate function bits for the most significant bits are high or if a carry is generated out of a second group of least significant bits plus one of said binary input; and combining logic for generating the carry or sum bit output by combining outputs of said first and second logic.

40. A logic circuit according to claim 39, wherein the first logic comprises a plurality of first logic modules, each for receiving bit level carry generate and propagate function bits for subgroups of the first group of at least three most significant bits of the binary inputs to generate a high output if a carry is generated for the subgroup of most significant bits of the binary input or if the carry propagate function bits for the subgroup of most significant bits are all high.

41. A logic circuit according to claim 39 or claim 40, wherein the second logic comprises a plurality of logic modules for receiving subgroups of the second group of least significant bits of the binary input to generate a carry for each of the subgroups and combining logic for combining the generated carrys.

42. A logic circuit for generation of a carry or sum bit output by adding two sets of binary inputs plus one, the logic circuit comprising: bit level carry generate and propagate function logic for receiving the binary inputs and for generating bit level carry generate and propagate function bits for said binary inputs by respectively logically AND and OR combining respective bits of said binary inputs; first logic for receiving bit level generate and propagate function bits for a first group of at least three most significant bits of said binary inputs to generate an output as a function of a logical OR combination of a carry bit output for the first group of most significant bits of said binary input and a result of a logical AND combination of propagate function bits for the most significant bits; second logic for receiving bit level generate and propagate function bits for said binary inputs to generate an output as a function of a result of a logical OR combination of a carry bit output for a group of least significant bits plus one of said binary inputs and a function B which is high if a carry is generated at any bit position in the most significant bits; and combining logic for generating the carry or sum bit output by combining outputs of said first and second logic.

43. A logic circuit for generation of a carry bit output by combining two sets of binary inputs, the logic circuit comprising logic for receiving a plurality of bits of the binary inputs and for generating the carry bit output; wherein said logic is arranged to generate the carry bit output as the logical AND of a generate function for at least one most significant bit, a reduced modified generate function for the said at least one most significant bit and at least one middle bit of the binary inputs and a reduced generate function for said at least one middle bit and at least one least significant bit of the binary inputs; wherein said reduced generate function is the logical OR of a generate function for the at least one least significant bit and a function X for the at least one most significant bit and the at least one middle bit, where the generate function for the at least one least significant bit is high if a carry is generated out of the at least one least significant bit and low if not, and X is a function which is high if a carry is generated out of the at least one most significant bit and said at least one middle bit, low if no carry is generated at any bit position in the at least one most significant bit and said at least one middle bit, and in a don't care state if a carry is generated at some bit position in the at least one most significant bit and said at least one middle bit but no carry is generated out of the at least one most significant bit and said at least one middle bit; said reduced modified generate function is the logical OR of a modified generate function for the at least one middle bit and the function X for the most significant bits, where the modified generate function for the at least one middle bit is high if a carry is generated on adding the at least one middle bit plus one and low if not.

44. A logic circuit for generation of a carry bit output by combining two sets of binary inputs plus 1, the logic circuit comprising logic for receiving a plurality of bits of the binary inputs and for generating the carry bit output; wherein said logic is arranged to generate the carry bit output as the logical AND of a modified generate function for at least one most significant bit, a first reduced modified generate function for the said at least one most significant bit and at least one middle bit of the binary inputs and a second reduced modified generate function for said at least one middle bit and at least one least significant bit of the binary inputs; wherein said second reduced modified generate function is the logical OR of a modified generate function for the at least one least significant bit and a function X for the at least one most significant bit and the at least one middle bit, where the modified generate function for the at least one least significant bit is high if a carry is generated out of the at least one least significant bit plus one and low if not, and X is a function which is high if a carry is generated out of the at least one most significant bit and said at least one middle bit, low if no carry is generated at any bit position in the at least one most significant bit and said at least one middle bit, and in a don't care state if a carry is generated at some bit position in the at least one most significant bit and said at least one middle bit but no carry is generated out of the at least one most significant bit and said at least one middle bit; said first reduced modified generate function is the logical OR of a modified generate function for the at least one middle bit and the function X for the most significant bits, where the modified generate function for the at least one middle bit is high if a carry is generated on adding the at least one middle bit plus one and low if not.

45. A method of designing a logic circuit for generating a carry or sum bit from the combination of two j-bit binary inputs, the method comprising:

performing a first parallelisation of the function $G_{j-1:0}$ for generating the carry in accordance with a first relationship $G_{a:c}=D_{a:b}(X_{a:b}+G_{b-1:c})$ to generate a parallelised function $D_{j-1:k}(X_{j-1:k}+G_{k-1:0})$, where G represents a generate function for a group of bits from j−1 to 0 or from k−1 to 0, D represents a logical OR of a generate function and a propagate function for a group of bits from j−1 to k, and X represents a function which is high if a carry is generated out of the j−1 to k bits, low if no carry is generated at any bit position in the j−1 to k bits, and in a don't care state if a carry is generated at some bit position in the j−1 to k bits but no carry is generated out of the j−1 to k bits;

performing a second parallelisation of the generate function of the parallelised function using a parallel prefix method to generate a further parallelised function;

designing a logic circuit in accordance with the further parallelised function; and building a logic circuit in accordance with the design.

46. A method according to claim 45, including performing a further parallelisation of the further parallelised function using the first relationship to parallelise the generate function for a group of least significant bits.

47. A method according to claim 46, including performing a further parallelisation of the further parallelised function using a parallel prefix method to parallelise the further parallelised generate function for a group of least significant bits.

48. A method according to claim 45, including repeatedly performing further parallelisations of the further parallelised function using alternately the first relationship and a parallel prefix method to parallelise the generate function for a group of least significant bits.

49. A method according to any one of claims 45 to 48, including performing a parallelisation of D using a third relationship $D_{a:c}=D_{a:b}(X_{a:b}+D_{b-1:c})$ to generate a further parallelised function for use in the logic design.

50. A method according to claim 49, including performing a further parallelisation of D in the further parallelised function using a parallel prefix method.

51. A method according to claim 49, including repeatedly performing further parallelisations of D in the further parallelised function using alternately the third relationship and a parallel prefix method to parallelise D.

52. A method according to claim 50, including repeatedly performing further parallelisations of D in the further parallelised function using alternately the third relationship and a parallel prefix method to parallelise D.

* * * * *